US011459646B2

(12) United States Patent
Imaoka et al.

(10) Patent No.: US 11,459,646 B2
(45) Date of Patent: Oct. 4, 2022

(54) MAGNETIC MATERIAL AND METHOD FOR PRODUCING SAME

(71) Applicant: National Institute of Advanced Industrial Science and Technology, Tokyo (JP)

(72) Inventors: Nobuyoshi Imaoka, Nagoya (JP); Shinpei Yamamoto, Nagoya (JP); Kimihiro Ozaki, Nagoya (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 182 days.

(21) Appl. No.: 16/648,836

(22) PCT Filed: Sep. 20, 2018

(86) PCT No.: PCT/JP2018/034752
§ 371 (c)(1),
(2) Date: Mar. 19, 2020

(87) PCT Pub. No.: WO2019/059259
PCT Pub. Date: Mar. 28, 2019

(65) Prior Publication Data
US 2020/0248288 A1 Aug. 6, 2020

(30) Foreign Application Priority Data
Sep. 25, 2017 (JP) .............................. JP2017-183907
Nov. 17, 2017 (JP) .............................. JP2017-222150

(51) Int. Cl.
C22C 38/16 (2006.01)
C22C 38/10 (2006.01)
(Continued)

(52) U.S. Cl.
CPC ................ C22C 38/16 (2013.01); B22F 1/05 (2022.01); B22F 9/22 (2013.01); C22C 38/02 (2013.01);
(Continued)

(58) Field of Classification Search
None
See application file for complete search history.

(56) References Cited

U.S. PATENT DOCUMENTS 5,573,863 A    11/1996  Hayakawa et al.
2004/0238796 A1  12/2004  Abe
(Continued)

FOREIGN PATENT DOCUMENTS

EP    3096333 A1    11/2016
JP    H06-316748 A    11/1994
(Continued)

OTHER PUBLICATIONS

Bahgat, Journal of Alloys and Compounds, vol. 466, p. 59-66. (Year: 2008).*
(Continued)

Primary Examiner — Xiaowei Su
(74) Attorney, Agent, or Firm — Morgan, Lewis & Bockius LLP

(57) ABSTRACT

The purpose of the present invention is to provide: a new magnetic material which exhibits high magnetic stability and excellent oxidation resistance and which can achieve both significantly higher saturation magnetization and lower coercive force than a conventional ferrite-based magnetic material by using a magnetic material obtained by nanodispersing α-(Fe,M) phases and M component-enriched phases (here, the M component is at least one component selected from among Zr, Hf, V, Nb, Ta, Cr, Mo, W, Cu, Zn and Si); and a method for producing same. This magnetic material
(Continued)

powder exhibits high moldability, and is such that α-(Fe, M) phases and M-enriched phases are nanodispersed by chemically reducing M-ferrite nanoparticles, which are obtained by means of wet synthesis, in hydrogen and utilizing phase separation by means of a disproportionation reaction while simultaneously carrying out grain growth. Furthermore, a solid magnetic material is obtained by sintering this powder.

20 Claims, 6 Drawing Sheets

(51) Int. Cl.
    *C22C 38/08*     (2006.01)
    *C22C 38/04*     (2006.01)
    *C22C 38/02*     (2006.01)
    *B22F 1/00*     (2022.01)
    *B22F 9/22*     (2006.01)
    *H01F 1/34*     (2006.01)
    *H01F 1/36*     (2006.01)
    *B22F 1/05*     (2022.01)
    *H01F 1/055*     (2006.01)
    *H01F 1/22*     (2006.01)

(52) U.S. Cl.
    CPC .............. *C22C 38/04* (2013.01); *C22C 38/08* (2013.01); *C22C 38/10* (2013.01); *H01F 1/344* (2013.01); *H01F 1/36* (2013.01); *B22F 2301/35* (2013.01); *C22C 2202/02* (2013.01); *H01F 1/0553* (2013.01); *H01F 1/22* (2013.01)

(56) References Cited

U.S. PATENT DOCUMENTS

| | | |
|---|---|---|
| 2009/0174512 A1 | 7/2009 | Watanabe et al. |
| 2010/0261038 A1 | 10/2010 | Imaoka et al. |
| 2014/0138569 A1* | 5/2014 | Otsuka ................. H01F 27/255 252/62.54 |
| 2014/0251085 A1* | 9/2014 | Tsutsui ..................... H01F 3/08 75/246 |
| 2016/0336104 A1 | 11/2016 | Noguchi et al. |
| 2019/0051436 A1 | 2/2019 | Imaoka et al. |
| 2019/0105708 A1 | 4/2019 | Imaoka et al. |

FOREIGN PATENT DOCUMENTS

| | | |
|---|---|---|
| JP | H08-51010 A | 2/1996 |
| JP | 2000-156314 A | 6/2000 |
| JP | 2007-070719 A | 3/2007 |
| JP | 2007-231331 A | 9/2007 |
| JP | 2008-108760 A | 5/2008 |
| JP | WO2009/057742 A1 | 5/2009 |
| JP | 2010-229466 A | 10/2010 |
| JP | 2011-119298 A | 6/2011 |
| JP | 2011-208184 A | 10/2011 |
| JP | 2013-181193 A | 9/2013 |
| JP | 2016-127042 A | 7/2016 |
| WO | 03/015109 A1 | 2/2003 |
| WO | 2015/100244 A1 | 7/2015 |
| WO | 2015/108059 A1 | 7/2015 |
| WO | 2017/164375 A1 | 9/2017 |
| WO | 2017/164376 A1 | 9/2017 |

OTHER PUBLICATIONS

Extended European Search Report issued in corresponding European Patent Application No. 18859752.0 dated Jun. 10, 2021.
Fukamachi et al., "Preparation of Composite Nanoparticles Based on Cobalt Ferrite," The Journal of the Japan Institute of Metals, vol. 74, No. 6, 345-350. See English abstract.
Herzer, "Grain Size Dependence of Coercivity and Permeability in Nanocrystalline Ferromagnets," IEEE Transactions on Magnetics, 26 (5): 1397-1402 (1990).
Zhang et al., "Sintered powder cores of high B s and low coreloss Fe84.3Si4B8P3Cu0.7 nanocrystalline alloy," AIP Advances, 3 (6): 062118 (2013).
Imaoka et al., "High electrical resistance composite magnets of Sm 2 Fe 17 N 3 powders coated with ferrite layer for high frequency applications," Journal of Applied Physics, 103 (7): 07E129 (2008).
Abe, "Ferrite-Film Formation from an Aqueous Solution, and Its Applications," Journal of the Magnetics Society of Japan, 22 (9): 1225 (1998) (see partial English translation).
Zehani et al., "Structural magnetic and electronic properties of high moment FeCo nanoparticles", Journal of Alloys and Compounds, 591: 58-64 (2014).
International Search Report issued in corresponding International Patent Application No. PCT/JP2018/034752 dated Dec. 25, 2018.

* cited by examiner

MAGNETIC MATERIAL AND METHOD FOR PRODUCING SAME

TECHNICAL FIELD

The present invention relates to a magnetic material exhibiting a soft magnetic material or a semi-hard magnetic material, and in particular, a magnetic material exhibiting soft magnetism and a method for producing the same.

BACKGROUND ART

Global environmental problems, such as global warming and exhaustion of resources, are becoming more severe, and the social demands for energy saving and using less resources in various electronic and electric devices are increasing day by day. In such a situation, there is a need for further improvement in the performance of soft magnetic materials used in the drive unit of motors and the like and the transformer of voltage-conversion devices. Further, to solve various problems involved with manufacturing various compact and high-performance information communication devices, increasing calculation processing speeds, increasing recording storage capacity, as well as maintaining environmental sanitation in infrastructure, distribution systems that are becoming ever more complex, and strengthening the security that becomes increasingly diverse, there is a need to improve the electromagnetic properties, reliability, and sensitivity of various soft magnetic materials and semi-hard magnetic materials used for various elements, sensors, and systems.

Demand for next-generation automobiles equipped with large motors driven at high revolutions (hereinafter, this refers to revolution speeds exceeding 400 rpm) such as in electric automobiles, fuel cell automobiles, and hybrid automobiles, is expected to further increase in the future to meet the current calls to deal with environmental and energy problems. Among the various problems to be solved, better performance and lower costs for the soft magnetic material used for the stator in a motor are one of the important issues.

Existing soft magnetic materials used for the above applications are broadly divided into two types, namely, metallic magnetic materials and oxide-based magnetic materials.

Examples of the former, namely, metallic magnetic materials, include silicon steel (Fe—Si), which is a Si-containing crystalline material being a typical example of electromagnetic steels, as well as sendust (Fe—Al—Si), which is an intermetallic compound containing Al, electromagnetic soft iron (Fe), which is pure iron having a low carbon content of 0.3% by mass or less and a low impurity content, amorphous alloys such as permalloy, which contains Fe—Ni as a main component, and Metglas (Fe—Si—B), and a group of nanocrystalline soft magnetic materials (whose representative compositions include Fe—Cu—Nb—Si—B, Fe—Si—B—P—Cu, etc.), such as Finemet, which are nanocrystal-amorphous phase-separated materials obtained by precipitating microcrystals by applying an appropriate heat treatment to the amorphous alloy. The term "nano" as used here means a size of 1 nm or more and less than 1 μm. For magnetic materials other than nanocrystalline soft magnetic materials, in terms of reducing a coercive force and an iron loss, it is important to facilitate movement of the domain walls as a composition that is as uniform as possible. It should be noted that nanocrystalline soft magnetic materials are a heterogeneous system that includes a crystalline phase, an amorphous phase, a Cu-enriched phase, and the like, and magnetization reversal is considered to be mainly caused by magnetization rotation.

Examples of the latter, namely, oxide-based magnetic materials, include ferritic magnetic materials such as Mn—Zn ferrite and Ni—Zn ferrite.

Silicon steel has until now been the soft magnetic material that is most widely used in high-performance soft magnetic material applications, and is a high magnetization, low coercive force magnetic material having a saturation magnetization of 1.6 to 2.0 T and a coercive force of 3 to 130 A/m. This material is obtained by adding up to 4% by mass of Si to Fe, which lowers the magnetocrystalline anisotropy and the saturation magnetostriction constant and reduces the coercive force without significantly impairing the large magnetization of Fe. In order to improve the performance of this material, it is necessary to remove foreign substances that hinder the movement of domain walls while increasing the crystal grain size by appropriately combining composition-controlled materials with the appropriate hot and cold rolling and annealing. In addition to non-oriented steel sheets with a random orientation of the crystal grains, grain-oriented steel sheets in which the (100) direction of Fe—Si, which is an easily magnetized direction, is highly oriented in the rolling direction are widely used as a material that further reduces coercive force.

Since this material is a rolled material, it has a thickness of less than about 0.5 mm. Further, since this material is a homogeneous metal material, it has a low electric resistivity of about 0.5 μΩm. Generally, this material is used in large equipment applications by covering the surface of each silicon steel sheet with an insulating film, punching out with a die, and laminating and welding to provide thickness while suppressing an eddy current loss that occurs in high-rotation applications, such as next-generation automobiles. Therefore, the costs of the punching and lamination steps, and deterioration of the magnetic properties are serious problems.

A nanocrystalline soft magnetic material such as Fe—Cu—Nb—Si—B is a soft magnetic material having a nanocrystalline structure in which the amorphous grain boundary phases are randomly oriented, the soft magnetic material being obtained by subjecting an alloy which has become amorphous by rapid cooling to a heat treatment at a temperature higher than the crystallization temperature to cause crystal grains of about 10 nm to precipitate in the amorphous phase. The coercive force of this material is extremely low, namely, 0.6 to 6 A/m, and the saturation magnetization is 1.2 to 1.7 T, which is higher than that of an amorphous material. Hence, the market for such materials is expanding at present. This material is a relatively new material that was developed in 1988. The principle behind these magnetic properties is that by making the crystal grain size smaller than the ferromagnetic exchange length (also called the exchange coupling length) and by causing the randomly-oriented main phase, namely, the ferromagnetic phase, to undergo ferromagnetic coupling through an amorphous interface phase, the magnetocrystalline anisotropy is averaged, thereby reducing the coercive force. This mechanism is called a random magnetic anisotropy model, or a random anisotropy model (e.g., see Non-Patent Document 1).

However, this material is produced after first producing a thin ribbon by a liquid rapid-quenching method, and thus, has a product thickness of about 0.02 to 0.025 mm, and steps of insulation, cutting, alignment, lamination, welding, and annealing are more complicated than those of silicon steel, which cause problems in terms of workability and thermal stability. Furthermore, the electric resistivity is small at 1.2 µΩm, and a problem with the eddy current loss similar to other rolled materials and ribbons has been pointed out.

In order to overcome this, attempts have been made to prepare a bulk molding material by pulverizing the above-described ribbon-shaped nanocrystalline soft magnetic material using SPS (spark plasma sintering) (e.g., see Non-Patent Document 2). However, the magnetic properties are much worse than for a 0.02 mm ribbon, with a coercive force of 300 A/m and a saturation magnetization of 1 T. At present, there is no good method other than a lamination method for producing products thicker than 0.5 mm.

Among existing soft magnetic materials so far, ferrite oxide materials have the least problems with eddy current loss in high-rotation applications. The electric resistivity of such a material is $10^6$ to $10^{12}$ µΩm, and the material can be easily bulked to 0.5 mm or more by sintering. Further, such a material can also be formed into a molded body free from eddy current loss. Therefore, it is a material suitable for high-rotation, high-frequency applications. Further, since it is an oxide, this material does not rust and the stability of its magnetic properties is also excellent. However, the coercive force of this material is comparatively high, namely, 2 to 160 A/m, and in particular, the saturation magnetization is small at 0.3 to 0.5 T. Therefore, this material is not suitable for high-performance, high-speed motors for next-generation automobiles, for example.

In general, metallic soft magnetic materials such as silicon steel are rolled materials and the like and are used in a laminated form due to the thin thickness, but have a low electric resistance, and suffer from the occurrence of eddy current loss for high-rotation, high-performance motors. Consequently, lamination that can solve these problems needs to be carried out. Thus, the steps become complicated, an insulation treatment before lamination is necessary, and further, serious problems occur such as deterioration of magnetic properties due to punching and the like, and high cost required for the steps. On the other hand, oxide-based soft magnetic materials such as ferrite have a large electric resistance and no problems with eddy current loss, but they are unsuitable for high-performance motors for next-generation automobiles because they have a small saturation magnetization of 0.5 T or less. Further, from the perspective of oxidation resistance, oxide-based soft magnetic materials are superior to metallic soft magnetic materials in terms of having a high stability.

The upper limit of the thickness that can be used for the motor in the many non-oriented electromagnetic steel sheets of silicon steel that are produced for high-performance motors for next-generation automobiles using permanent magnets is, as shown in Patent Documents 1 and 2, a sheet thickness of about 0.3 mm. However, since the thickness of the next-generation automotive motor is, for example, 9 cm, when a thin silicon steel sheet having a thickness of 0.3 mm is used, about 300 sheets each have to be insulated and laminated. The steps of insulating, punching, aligning, welding, and annealing such a thin sheet are complicated and expensive. In order to make the laminated sheet thickness as thick as possible, it is more desirable to increase the electric resistivity of the material.

As described above, it has been desired to develop a magnetic material (especially a soft magnetic material) having both a high saturation magnetization and a low coercive force, excellent magnetic stability, and high oxidation resistance as compared to conventional oxide-based magnetic materials (particularly, ferrite-based magnetic materials). Furthermore, it has been desired to develop a soft magnetic material capable of exhibiting both advantages of an oxide-based magnetic material and a metallic magnetic material, specifically, a soft magnetic material capable of exhibiting advantages of having a higher electric resistance than a metallic silicon steel sheet or the like, a high saturation magnetization of the metallic magnetic material, and a small eddy current loss like the oxide-based magnetic material, and not requiring lamination and complicated steps involved in the lamination.

PRIOR ART DOCUMENTS

Patent Document
[Patent Document 1]
    WO 2017/164375 A1
[Patent Document 2]
    WO 2017/164376 A1

Non Patent Document

[Non Patent Document 1]
G. Herzer, IEEE Transactions on Magnetics, vol. 26, No. 5 (1990) pp. 1397-1402
[Non Patent Document 2]
Y Zhang, P. Sharma and A. Makino, AIP Advances, vol. 3, No. 6 (2013) 062118

SUMMARY OF INVENTION

Technical Problem

It is an object of the present invention to provide a novel magnetic material which exhibits high magnetic stability and excellent oxidation resistance and which can achieve both significantly higher saturation magnetization and lower coercive force than a conventional ferrite-based magnetic material by using a magnetic material obtained by nanodispersing an α-(Fe,M) phase (this phase is also referred to as an α-(Fe,M) component) and an M component-enriched phase (here, the M component is a component of one or more of Zr, Hf, V, Nb, Ta, Cr, Mo, W, Cu, Zn, and Si), and a method for producing same. Further, another object is to provide a novel magnetic material which is capable of solving the above-described problems such as the eddy current loss since the electric resistivity is higher than existing metallic magnetic materials and is capable of achieving various required performances such as high magnetic stability, a high magnetic saturation suppression performance, and a high frequency absorption performance, and a method for producing the same.

Also, it is an object of the present invention to provide a powder sintered magnetic material which is capable of producing a molded body having a thickness of 0.5 mm or more, further 1 mm or more, and even 5 mm or more, by simple steps without performing complicated steps such as lamination as well as which can reduce eddy current at the same time.

Solution to Problem

The present inventors have extensively studied a magnetic material having more excellent electromagnetic properties than conventional oxide-based magnetic materials (particularly, ferrite magnetic materials), a magnetic material with excellent electromagnetic properties that combines advantages of both a metallic magnetic material and the oxide-based magnetic material, and a magnetic material with stable magnetic properties even in air. As a result, the present inventors discovered that a magnetic material containing two or more of various crystalline phases, or one kind of crystalline phase and an amorphous phase, can be obtained through disproportionation during a reduction reaction of M-ferrite (in the present invention, also referred to as "M component-ferrite"), which is completely different from the conventionally-used uniform homogeneous crystalline and amorphous materials or, among amorphous materials, nanocrystalline soft magnetic materials in which uniform nanocrystals are precipitated, and completed the present invention by controlling the composition, the crystal structure, the crystal grain size, and the powder particle diameter of the magnetic material, establishing a method for producing the magnetic material, and establishing a method for solidifying the magnetic material without laminating.

In order to solve the above problems, a magnetic material whose saturation magnetization is similar to or higher than 0.3 T (this is 30 emu/g when calculated using the density of Fe because the magnetic material of the present invention has a density close to that of a metal-based material) of ferrite of an existing general material. In particular, just in terms of a soft magnetic material, the saturation magnetization needs to be preferably 100 emu/g or more, and more preferably 150 emu/g or more. At the same time, it is required that a coercive force of a soft magnetic region or a semi-hard magnetic region can be expressed. Further, it is required to have the excellent oxidation resistance.

Specifically, the present invention is as follows.

(1) A soft magnetic or semi-hard magnetic material, the magnetic material comprising:

a first phase having crystals with a bcc structure containing Fe and an M component (M is one or more of Zr, Hf, V, Nb, Ta, Cr, Mo, W, Cu, Zn, and Si); and a second phase containing the M component, wherein a content of the M component when a total of Fe and the M component contained in the second phase is 100 atom % is more than a content of the M component when a total of Fe and the M component contained in the first phase is 100 atom %.

(2) The magnetic material according to (1), which is soft magnetic.

(3) The magnetic material according to (1) or (2), wherein 0.001 atom % or more and less than 50 atom % of Fe is substituted with Co or Ni.

(4) The magnetic material according to any one of (1) to (3), wherein the first phase has a composition represented by a composition formula $Fe_{100-x}M_x$ (where x is $0.001 \leq x \leq 33$ in terms of atomic percentage and M is one or more of Zr, Hf, V, Nb, Ta, Cr, Mo, W, Cu, Zn, and Si).

(5) The magnetic material according to any one of (1) to (4), wherein the first phase has a composition represented by a composition formula $Fe_{100-x}(M_{100-y}TM_y)_{x/100}$ (where x and y are $0.001 \leq x \leq 33$ and $0.001 \leq y \leq 50$ in terms of atomic percentage, M is one or more of Zr, Hf, V, Nb, Ta, Cr, Mo, W, Cu, Zn, and Si, and TM is at least one of Ti and Mn).

(6) The magnetic material according to any one of (1) to (5), wherein the second phase is a phase having crystals with a bcc structure containing Fe and an M component, and wherein a content of the M component when a total of Fe and the M component contained in the second phase is 100 atom % is an amount of 1.5 times or more and $10^5$ times or less relative to a content of the M component when a total of Fe and the M component contained in the first phase is 100 atom % and/or is 2 atom % or more and 100 atom % or less.

(7) The magnetic material according to any one of (1) to (6), wherein the second phase comprises an M-component oxide phase.

(8) The magnetic material according to any one of (1) to (7), wherein the second phase comprises at least one of an M-ferrite phase and a wustite phase.

(9) The magnetic material according to any one of (1) to (8), wherein a phase having crystals with a bcc structure containing Fe and the M component has a volume fraction of 5% by volume or more based on the whole magnetic material.

(10) The magnetic material according to (7) or (8), comprising a composition in a range where Fe is 20 atom % or more and 99.998 atom % or less, an M component is 0.001 atom % or more and 50 atom % or less, and O is 0.001 atom % or more and 55 atom % or less, based on a composition of the whole magnetic material.

(11) The magnetic material according to any one of (1) to (10), wherein an average crystal grain size of the first phase, the second phase, or the whole magnetic material is 1 nm or more and less than 10 μm.

(12) The magnetic material according to any one of (1) to (11), wherein at least the first phase has a bcc phase represented using a composition represented by a composition formula $Fe_{100-x}M_x$ (where x is $0.001 \leq x \leq 1$ in terms of atomic percentage and M is one or more of Zr, Hf, V, Nb, Ta, Cr, Mo, W, Cu, Zn, and Si), and a crystallite size of the bcc phase is 1 nm or more and 300 nm or less.

(13) The magnetic material according to any one of (1) to (11), wherein at least the first phase has a bcc phase represented using a composition represented by a composition formula $Fe_{100-x}M_x$ (where x is $0.001 \leq x \leq 33$ in terms of atomic percentage and M is one or more of Zr, Hf, V, Nb, Ta, Cr, Mo, W, Cu, Zn, and Si), and a crystallite size of the bcc phase is 1 nm or more and 200 nm or less.

(14) The magnetic material according to any one of (1) to (13), which is a form of a powder, wherein an average powder particle diameter when the magnetic material is soft magnetic is 10 nm or more and 5 mm or less, and an average powder particle diameter when the magnetic material is semi-hard magnetic is 10 nm or more and 10 μm or less.

(15) The magnetic material according to any one of (1) to (14), wherein at least one of the first phase and the second phase is ferromagnetically coupled with an adjacent phase.

(16) The magnetic material according to any one of (1) to (15), wherein the first phase and the second phase are continuously bonded to each other directly or via a metal phase or an inorganic phase to form a massive state as the whole magnetic material.

(17) A method for producing the magnetic material according to (14) by reducing a M-ferrite powder having an average powder particle diameter of 1 nm or more and less than 1 μm in a reducing gas containing hydrogen gas at a reduction temperature of 400° C. or higher and 1500° C. or lower.

(18) A method for producing the magnetic material according to any one of (1) to (15) by reducing an M-ferrite powder having an average powder particle diameter of 1 nm or more and less than 1 μm in a reducing gas containing hydrogen gas, and forming the first phase and the second phase by a disproportionation reaction.

(19) A method for producing the magnetic material according to (16) by sintering the magnetic material produced by the method according to the above (17) or (18).

(20) A method for producing a soft magnetic or semi-hard magnetic material, comprising performing annealing at least once after a reduction step in the method according to (17), after a reduction step or a formation step in the method according to (18), or after a sintering step in the method according to (19).

Advantageous Effects of Invention

According to the present invention, there can be provided a magnetic material having a high saturation magnetization and a small eddy current loss, in particular a soft magnetic material that is suitably used even in high rotation motors and the like, and various soft magnetic materials and semi-hard magnetic materials having high oxidation resistance or can satisfy required performances such as a high magnetic saturation suppression performance and a high frequency absorption performance.

According to the present invention, because the magnetic material can be used in the form of a powder material like ferrite, it can easily be produced in bulk by sintering or the like, and hence the present invention can solve problems such as complicated steps like lamination and the like caused by the use of metallic soft magnetic materials known as thin sheets, as well as the high costs involved with such steps.

DESCRIPTION OF EMBODIMENTS

Figure 1:
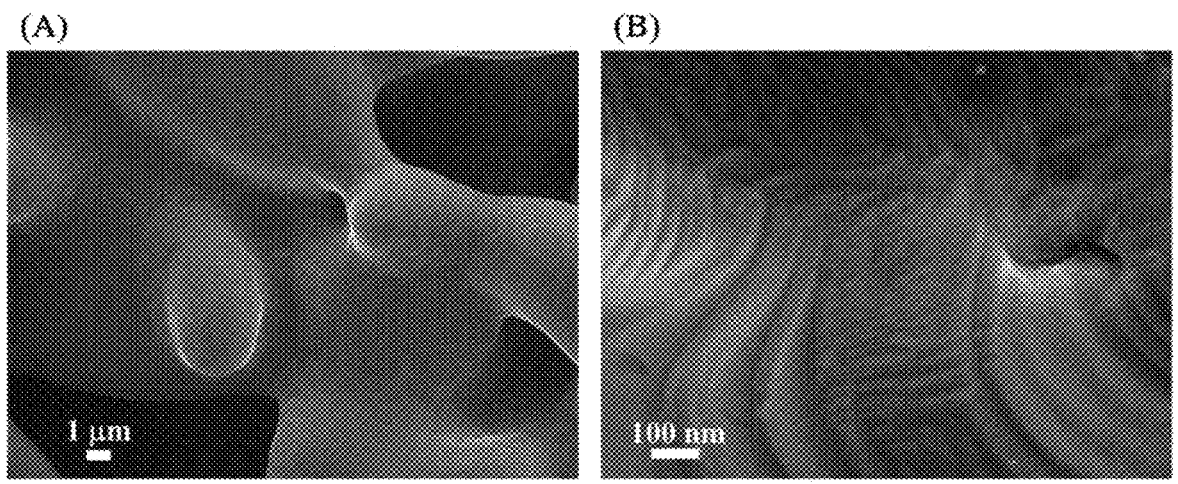
FIG. 1 is an SEM image of a powder (Example 46) obtained by reducing a $(Fe_{0.9}Zn_{0.1})_{43}O_{57}$ ferrite nanopowder in hydrogen gas at 1100° C. for 1 hour ((A) and (B) are SEM images obtained by photographing different locations of the same powder).

The present invention will now be described in detail.

In the present invention, the term "magnetic material" refers to magnetic materials referred to as "soft magnetic" (i.e., "soft magnetic material") and magnetic materials referred to as "semi-hard magnetic" (i.e. "semi-hard magnetic material"). Here, a "soft magnetic material" refers to a magnetic material having a coercive force of 800 A/m (≈10 Oe) or less, and a "semi-hard magnetic material" refers to a magnetic material having a coercive force of more than 800 A/m and 40 kA/m (≈500 Oe) or less. In order to obtain an excellent soft magnetic material, it is important to have a low coercive force, a high saturation magnetization or permeability, and low iron loss. The causes of iron loss are mainly hysteresis loss and eddy current loss. In order to reduce the former, it is necessary to make the coercive force smaller. In order to reduce the latter, it is important to increase the electric resistivity of the material itself or to increase the electric resistance of the whole molded body to be subjected to practical use. The semi-hard magnetic material needs to have an appropriate coercive force according to the application, and have high saturation magnetization and high residual magnetic flux density. Among magnetic materials, soft magnetic or semi-hard magnetic materials used for high frequency generate a large eddy current, and hence it is important for the material to have a high electric resistivity and that the powder particle diameter is small, or the sheet thickness is a thickness of a thin sheet or ribbon.

The term "ferromagnetic coupling" as used in the present invention refers to a state in which adjacent spins in a magnetic material are strongly bound by exchange interaction. In particular, in the present invention, this term refers to state in which the spins of two adjacent crystal grains (and/or amorphous grains) are strongly bound to each other by exchange interaction across the crystal boundary. As used herein, the "grains" such as crystal grains are masses that can be recognized as being composed of one or more "phases" and that have boundaries that separate them in three-dimensional space. Since exchange interaction is an interaction that only reaches a distance based on the short range order of the material, when a nonmagnetic phase is present at the crystal boundary, exchange interaction does not work on the spins in the region on either side thereof, and hence ferromagnetic coupling does not occur between the crystal grains (and/or amorphous grains) on either side. In the present application, the term "crystal grain" may include amorphous grains. Further, the characteristics of the magnetic curve of the material in which ferromagnetic coupling has occurred between different adjacent crystal grains having different magnetic properties will be described later.

The term "disproportionation" as used in the present invention means that phases having two or more different compositions or different crystal structures are produced from a phase in a homogeneous composition by a chemical reaction. In the present invention, disproportionation is caused as a result of a reducing substance such as hydrogen being involved in a phase of the homogeneous composition leading to the occurrence of a reduction reaction. Although the chemical reaction that leads to this "disproportionation" is referred to herein as a "disproportionation reaction", water is often produced as a byproduct during this "disproportionation" reaction.

The "M-ferrite" referred to in the present invention is a material in which a Fe component of magnetite $Fe_3O_4$ is substituted with an M component, and the M component is one or more of Zr, Hf, V, Nb, Ta, Cr, Mo, W, Cu, Zn, and Si, and the M component may be simply described as M. Further, an M component oxide is a substance or material in which the M component and oxygen O are bonded, and refers to one that is nonmagnetic among them (including one having extremely low magnetism in the present application). Further, the term described as a "TM component" or "TM" refers to one or more of Ti and Mn.

In the present invention, the expression "containing Fe and an M component" means that the magnetic material of the present invention always contains Fe and the M component as components, and optionally the M component may be substituted with a certain amount of other atoms (specifically, at least one of Ti and Mn that is referred to as the TM component in the present application). Further, oxygen (O component) may be contained, and when an O component or iron oxide hydroxide, or the like is present as a minor phase, H may be contained mainly as an OH group, and other unavoidable impurities as well as Cl or alkali metals such as K derived from raw materials may also be included. Alkali metals such as K are suitable components in that they may exert an effect of promoting the reduction reaction.

The term "magnetic powder" generally refers to a powder having magnetism, but in the present application a powder of the magnetic material of the present invention is referred to as "magnetic material powder". Therefore, the term "magnetic material powder" is included in the term "magnetic powder".

The present invention relates to a magnetic material comprising a phase (first phase) containing an M component in an α-Fe phase and an M component-enriched phase (second phase) having an M component content higher than the first phase. The best mode of the present invention is a "powder" in which the two phases are mixed and bonded at the nano level.

These magnetic material powders are used for various devices by directly compacting or sintering. Further, depending on the application, an organic compound such as a resin, an inorganic compound such as glass or ceramic, a composite material thereof, or the like may be added and the resultant mixture may be molded.

Hereinafter, the composition, crystal structure and morphology, crystal grain size and powder particle diameter, and the production method of the first phase containing Fe and the M component and the second phase enriched with the M component will be described. In particular, a method for producing a nanocomposite oxide powder as a precursor of the magnetic material of the present invention, a method for reducing the powder, a method for solidifying the reduced powder, and a method for annealing in each step of these production methods, will be described.

<First Phase>

In the present invention, the first phase is a crystal having a bcc structure cubic crystal (space group Im-3m) containing Fe and the M component as a crystal structure. A content of the M component in this phase is preferably 0.001 atom % or more and 33 atom % or less when a total (total content) of Fe and the M component contained in the phase is 100 atom %. Specifically, the composition of the first phase may be represented by the composition formula $Fe_{100-x}M_x$ (where x is 0.001≤x≤33 in terms of atomic percentage).

Here, the M component content and the Fe content are, unless stated otherwise, respectively the value of the atomic ratio of the M component and Fe relative to the total (in the present application, referred to as the total content or total amount) of Fe and the M component contained in the phase. In the present invention, this is also sometimes represented by an atomic percentage with the total (total content) of Fe and the M component contained in the phase as 100 atom %.

As a property common to each of the M components, it is preferable to set the M component content to 33 atom % or less in order to suppress a decrease in magnetization. Further, the M component content is more preferably 20 atom % or less as this means that, depending on the production method and conditions, a magnetization exceeding 1 T can be realized. Further, the M component content is particularly preferably 10 atom % or less as this means that a magnetic material having a saturation magnetization of more than 1.6 T can be produced. Further, the M component content is preferably 0.001 atom % or more, as this means that, unlike when Fe is used alone, the magnetic properties in the soft magnetic region can be adjusted, for example, a magnetic saturation suppression performance can be added, by the effect of the addition of the M component. Accordingly, the particularly preferable range of the M component content is 0.01 atom % or more and 10 atom % or less, and in this region, soft magnetic to semi-hard magnetic materials can be prepared depending on the production conditions. In particular, it is possible to obtain a soft magnetic or semi-hard magnetic material having a high frequency absorption performance, and it is possible to produce a magnetic material having more preferable electromagnetic properties. When it is desired to obtain a soft magnetic material having higher magnetization even at the slight expense of coercive force, it is preferable to set the M component content in the first phase to 5 atom % or less.

The first phase having a Fe—M composition having this bcc structure is also referred to as an "α-(Fe,M) phase" in the present application, since the symmetry of the crystal is the same as the α-phase, which is the room temperature phase of Fe.

When the M component content of the first phase of the present invention is 100 atom %, the M component of 0.001 atom % or more and less than 50 atom % can be substituted with the TM component (i.e., at least one of Ti and Mn). Therefore, in the present invention, when the M component contained in the first phase has a composition substituted with the TM component, the combination of M and the TM component in the composition corresponds to the "M component" described above, and the M component content thereof (specifically, the total of the M component content and a content of the TM component in the composition) is 100 atom %. Among these M components, adding a large number of elemental species to the soft magnetic material of the present invention is effective in increasing the entropy of the magnetic material and reducing the coercive force.

When the M component contains Cr, a soft magnetic material or a semi-hard magnetic material having particularly high saturation magnetization is obtained. The use of V, Cr, and Mo as the M component is advantageous in terms that nanocrystals of the present invention can be easily produced without greatly depending on a temperature decreasing rate in the reduction treatment or the annealing treatment. Since Zr, Hf, Cr, V, Zn, Ta, Cu, or Si used as the M component decreases the anisotropic magnetic field, and thus, is preferable as a component of the soft magnetic material of the present invention.

If one or more of Zr, Hf, V, Nb, Ta, Mo, and W are used as the M component, it is possible to suppress "improper grain growth" in the reduction step even with the addition of 1 atom % or less in terms of atomic percentage with the M component content in the first phase as 100 atom %.

It is preferable to use Cu, Zn, or Si as the M component as oxidation resistance and moldability are improved.

Further, when the TM component is co-added, not only the above-described effects but also a unique synergistic effect in which low coercive force and high magnetization are compatible can be exhibited. For example, when assuming that the first phase has a composition formula of $Fe_{100-x}M_x$ (x is 0.001≤x≤33 in terms of atomic percentage) and the M component thereof is substituted with the TM component in the range of 0.01 atom % or more and less than 50 atom %, a composition formula is represented by $Fe_{100-x}(M_{100-y}TM_y)_{x/100}$ (x and y are 0.001≤x≤33 and 0.001≤y<50 in terms of atomic percentage, M is one or more of Zr, Hf, V, Nb, Ta, Cr, Mo, W, Cu, Zn, and Si, and TM is at least one of Ti and Mn). For any of the TM components, from the perspective of the co-addition effect described above, the added amount is preferably 0.001 atom % or more in terms of atomic percentage when the TM component content of the first phase is taken to be 100 atom %, and from the perspective of preventing inhibition of the various effects of the M component in the magnetic material of the present invention, the added amount is preferably less than 50 atom %.

Here, 0.001 atom % or more and less than 50 atom % of Fe may be substituted with Co and/or Ni to be "homogeneous". The term "homogeneous" is generally a state where a content of a component in a phase falls within a fluctuation of +4.76% (i.e., for example, in a material having a Co content of 10 atom %, the Co content of each phase falls in the range of 9.524 to 10.476 atom %). The coexistence of Co not only increases the saturation magnetization but also is effective in reducing the coercive force. Ni is preferable since the saturation magnetization is improved with the addition of about 5 atom % or less, and the coercive force is reduced with the substitution of 0.001 atom % or more and less than 50 atom %. In consideration of the balance between the saturation magnetization and the coercive force, Co and Ni can be co-added such that a ratio therebetween can be adjusted in the range of 0:100 to 100:0 as appropriate.

In the present application, note that "improper grain growth" means that the nano-microstructure of the magnetic material of the present invention collapses and crystal grains grow with a homogeneous crystal structure. On the other hand, "suitable grain growth" in the present invention is growth in which the powder particle diameter grows to be large while maintaining the nano-microstructure that is a characteristic of the present invention, or growth in which a nano-microstructure appears in the crystal due to a disproportionation reaction, phase separation, or the like after the powder particle diameter has grown to be large, or both of these cases. Unless otherwise noted, the term "grain growth" in the present invention refers to the grain growth which is not the above-described "improper grain growth" and that can generally be said to be suitable. Even when the grain growth, either "proper grain growth" or "improper grain growth" occurs, the surface area of the magnetic material per unit mass or per unit volume becomes small, and hence oxidation resistance generally tends to be improved.

In the present invention, when expressed as the "M component", or when expressed as "M" or the "M component" in the context of discussing formulas such as "α-(Fe, M)" phase or the composition of the magnetic material, the present invention includes not only cases in which the M component is used alone, but also compositions in which 0.001 atom % or more and less than 50 atom % of the M component content is substituted with a TM component. Therefore, in the present application, when expressed as "total of Fe and the M component", when the components other than Fe are the M components alone, it means the total of the Fe content and the M component content, and for a composition in which 0.001 or more and less than 50 atom % of the M component content is substituted with the TM component, means the total of the Fe content, the M component content, and the content of the TM component. Further, although it is necessary to remove as much as possible impurities mixed in during the steps, unavoidable impurities such as elements such as H, C, Al, S, and N or alkali metals such as Li, K, and Na, alkaline earth metals such as Mg, Ca, and Sr, rare earth metals, and halogens such as Cl, F, Br, I, or the like may be included. However, the content of such impurities is to be 5 atom % or less, preferably 2 atom % or less, more preferably 0.1 atom % or less, and particularly preferably 0.001 atom % or less, of the whole (i.e., total of Fe and the M component contained in the first phase). This is because the greater the content of these impurities, the lower the magnetization, and in some cases, the coercive force is also adversely affected, which depending on the application may deviate from the target range. On the other hand, when some components, such as alkali metals like K, which act as reducing aids if contained to some extent, are contained in the range of 0.001 atom % or more and 5 atom % or less of the total (i.e., total of Fe and the M component contained in the first phase), a magnetic material having a higher saturation magnetization may be obtained. Therefore, when the above-described impurities hinder the object of the present invention, it is most desirable not to include such impurities.

The α-Fe phase not containing the M component is not included in the first phase or the second phase. The reason for this is that if the content of elements other than the M component is also extremely small, the α-Fe phase not containing the M component is expected to have saturation magnetization like electromagnetic soft iron, but even if the α-Fe phase is a powder in the nano region, the effect on electric resistivity is poor, oxidation resistance is poor, and the material is inferior in cutting processability. However, the α-Fe phase not containing the M component may exist as a separate phase as long as it does not hinder the object of the present invention. When the present invention is a soft magnetic material, the volume fraction of the α-Fe phase is preferably less than 50% by volume based on the whole magnetic material of the present invention.

The volume fraction referred to here is the ratio of the volume occupied by the target component based on the total volume of the magnetic material.

<Second Phase>

In the present invention, the second phase is a phase in which the M component content relative to the total of Fe and the M component contained in the phase is larger than the M component content relative to the total of Fe and the M component contained in the first phase. In other words, in the present invention, the second phase is a phase in which the atomic percentage of the M component relative to the total of Fe and the M component contained in the phase is larger than the atomic percentage of the M component relative to the total of Fe and the M component contained in the first phase. Examples of the second phase include: a cubic crystal such as an α-$(Fe_{1-y}M_y)$ phase (space group Im3m, a phase which is the same crystalline phase as the first phase but has a higher M component content than the first phase), a SiFe phase (space group P213), a γ-(Fe,M) phase (space group Fm3m), a wustite phase (whose representative composition is a $(Fe_{1-z}M_z)_aO$ phase, a is usually 0.85 to less than 1, and this phase is sometimes simply referred to as an (M,Fe)O phase or a (Fe,M)O phase in the present specification), an M component-ferrite phase (whose representative composition is $(Fe_{1-w}M_w)_3O_4$ phase, 0<w<⅓), a Cu phase (space group Fm3m), a Nb phase (space group Im3m), a Ta phase (space group Im3m), a β-cristobalite phase ($SiO_2$), and an α-FeV phase; a hexagonal crystal such as a Laves phase (whose representative composition examples are a $WFe_2$ phase and a $MoFe_2$ phase), an α-Hf phase (may contain O at up to about 20 atom %), ZnO (a wurtzite type, space group P63mc), and β-tridymite ($SiO_2$); a trigonal crystal system such as α-quartz ($SiO_2$); a rhombohedral crystal such as an M-hematite phase (whose representative composition is $(Fe_{1-u}M_u)_2O_3$ phase, u depends on a kind of an M component and 0<u<1, for example, when the M component is Cr) and a $Cr_2O_3$ phase; a tetragonal crystal such as a β-cristobalite phase ($SiO_2$), an σ-FeV phase, a $Cr_5Si_3$ phase, and a $NbO_2$ phase; a monoclinic system such as a $ZrO_2$ phase and α-tridymite ($SiO_2$); an orthorhombic crystal such as a $V_2O_5$ phase and a $Ta_2O_5$ phase; a $Zr_{25}Fe_{75}$ eutectoid point composition phase (whose composition ratio is described to two significant digits); and a mixture thereof. It should be noted that the amorphous phase, the eutectic point composition phase, and the eutectoid point composition phase (in the present application, also referred to as the "amorphous phase and the like") differ depending on the M component content and reduction conditions. When the amorphous phase and the like are present, microcrystals such as the existing nanocrystal-amorphous phase separation type material described above do not form a fine structure being in the form of islands and floating in an amorphous sea, but often exist in an island shape in the state of being separated from the first phase. The content of the amorphous phase or the like is between 0.001 and 10% by volume, and is preferably not more than this from the viewpoint of suppressing the reduction in magnetization. Further, in order to confer high magnetization to the magnetic material, this content is preferably 5% by volume or less. The amorphous phase and the like may be contained in order to control the disproportionation reaction itself, but in this case, it is preferable to set the content to more than 0.001% by volume from the perspective of controlling this reaction.

The volume fraction referred to here is the ratio of the volume occupied by the target component based on the total volume of the magnetic material.

The second phase described above has an inferior saturation magnetization to that of the first phase, but the coexistence of these phases results in a large increase in electric resistivity. Further, the coercive force is improved when forming a semi-hard magnetic material in the present invention. Conversely, in the present invention, when forming a soft magnetic material, depending on the crystal structure, composition, microstructure, interface structure, and the like of the phases, it is possible to realize a small coercive force by ferromagnetically coupling with the phases. Further, in the second phase as well, similarly to the first phase, it is possible to substitute less than 50 atom % of the M component content (wherein the M component content in the second phase is taken to be 100 atom %) with a TM component. Here, in the present invention, the "M component" of the second phase also means a combination of an M component and a TM component in a composition in the case of having the composition in which the M component contained in the second phase is substituted with the TM component, which is similar to the "M component" of the first phase described above.

<Minor Phase, Other Phases>

A phase that does not contain Fe or an M component, and that is mixed with only a TM component compound, is not included in the first phase or the second phase. However, there are cases where such a phase contributes to improving properties of electric resistivity, oxidation resistance, sinterability, and electromagnetic characteristics of the semi-hard magnetic material of the present invention. In the present application, a phase that does not contain an M component, such as a compound phase of the above-described TM component or an Fe compound phase, and a phase in which the content of the TM component is equal to or more than a content of an M component element, is referred to as a "minor phase".

Other than the first phase and the second phase, the magnetic material may also contain a minor phase that does not contain an M component, such as a wustite phase, a magnetite phase ($Fe_3O_4$), a maghemite phase (γ-$Fe_2O_3$), a hematite phase (α-$Fe_2O_3$), an α-Fe phase, and a γ-Fe phase, an iron oxide hydroxide phase that may or may not contain an M component, such as goethite, akagenite, lepidocrocite, feroxyhyte, ferrihydrite, and green rust, a hydroxide such as potassium hydroxide and sodium hydroxide, a chloride such as potassium chloride and sodium chloride, a fluoride, a carbide, a nitride, a hydride, a sulfide, a nitrate, a carbonate, a sulfate, a silicate, a phosphate, and the like. The volume of the above minor phase or the like needs to be smaller than the volume of the first phase in order for the magnetic material of the present invention to have a high saturation magnetization and also to exhibit stable magnetic properties and high magnetization over time. From the perspective of suppressing a decrease in the saturation magnetization, the preferable range of the content of these phases is 50% by volume or less based on the volume of the whole magnetic material.

The content of the TM component in all of the phases, including the first phase, the second phase, and the minor phase, must not exceed the M component content contained in the first phase and the second phase based on all the phases. This is because the effects on the electromagnetic properties unique to the M component, for example, magnetocrystalline anisotropy reduction and electric resistivity improvement, oxidation resistance improvement due to passivation of the powder surface, and the like, which are peculiar characteristics of the M component may be lost when the TM component is contained exceeding the M component content. In the present application, the M component content of the first phase and/or the second phase is an amount that includes the TM component.

<Case in which Second Phase has Same Crystal Structure as First Phase>

The second phase may have the same crystal structure as the first phase, but it is desirable that there is a sufficient difference in composition therebetween. For example, it is preferable that the M component content of the second phase relative to the total of Fe and the M component in the second phase be larger than the M component content of the first phase relative to the total of Fe and the M component in the first phase. Further, the difference therebetween is preferably 1.5 times or more, and/or that the M component content in the second phase relative to the total of Fe and the M component in the second phase is preferably 2 atom % or more.

The M component content of the second phase itself does not exceed 100 atom %. When the lower limit of the M component content of the first phase is 0.001 atom %, the M component content of the second phase does not exceed $10^5$ times the M component content of the first phase. The M component content of the second phase is preferably 90 atom % or less of the M component content of the first phase. This is because when the M component content exceeds 90 atom % (i.e., when the M component content of the second phase exceeds $9 \times 10^4$ times the M component content of the first phase) while the second phase maintains the same crystal structure as that of the first phase at ordinary temperature, the thermal stability of the whole magnetic material of the present invention may deteriorate.

In the above, the case described as the "M component content" of the second phase being "1.5 times or more" that of the first phase refers to a case in which, when the M component content of each phase is calculated to one significant digit or more, the M component content of the second phase is 1.5 times or more the M component content of the first phase.

The present invention aims to lower the coercive force by utilizing the above-described random magnetic anisotropy model or the magnetic anisotropy fluctuations in accordance with the model. Therefore, it is important either that the first phase and the second phase, which are crystallographically independent, are magnetically coupled at the nano level by exchange coupling, or that the M component content in the bcc phase including the first phase and the second phase has a spatial change at the nanoscale (this is sometimes referred to in the present invention as a "concentration fluctuation"). However, if the M component composition ratio of these two phases is too close, there are cases where the crystal orientations of the crystalline phases are aligned in the same direction, and further, the magnitude of the magnetocrystalline anisotropy constant is often smaller in the second phase. However, when the M component content is less than 2 atom % relative to the total of Fe and the M component in the second phase, the crystalline magnetic anisotropy increases and the value of the fluctuations averaged in crystalline magnetic anisotropy is not sufficiently small. As a result, a sufficiently low coercive force is not realized. Therefore, the preferable M component content of the second phase is 2 atom % or more relative to the total of Fe and the M component in the second phase, and more preferably 5 atom % or more. In the latter case, the magnetocrystalline anisotropy of the two phases is reduced to less than half as compared with that in the case where the M component is not contained. The M component content is more preferably 8 atom % or more since the magnetocrystalline anisotropy becomes extremely small.

If there is a phase (first phase) in which the M component content is lower than the M component content of the whole magnetic material of the present invention, this means that in the same magnetic material there will be a phase (second phase) in which the M component content is higher than that of the magnetic material of the present invention. Therefore, if isotropy is realized as a result of those phases ferromagnetically coupling, the material will be the magnetic material of the present invention, specifically a soft magnetic material. Further, if the material is interposed at the interface of the first phase, has a coercive force within the appropriate range, and has an action of increasing electric resistance, then the material will be the magnetic material of the present invention, specifically a semi-hard magnetic material. Even when the material is not sufficiently isotropic, if there is spatial concentration fluctuation of the M component content in a given crystalline phase, there will be fluctuation in the magnetic anisotropy, and the coercive force may decrease by a mechanism that is slightly different from the random anisotropy model. In general, the magnetic material of the present invention, in which the coercive force decreases by such a mechanism often has a content of the M component relative to the total of M component and Fe in the magnetic material of 10 atom % or less. The above is one characteristic of the magnetic material of the present invention that is not seen in most existing soft magnetic materials such as electromagnetic steel sheets and sendust, which have highly homogenous compositions designed to thoroughly eliminate heterogeneity so as not to inhibit domain wall movement. This characteristic can be said to be common with magnetic materials in which magnetization reversal occurs due to the rotation of magnetization.

It should be noted that a state where only the first phase or only the second phase is magnetically coupled at the nano level by exchange coupling may be included in the present invention. Even in this case, it is important for the crystal axis directions of adjacent nanocrystals not to be aligned, to be isotropic, and/or for there to be a nanoscale spatial distribution of the M component content in the bcc phases including the first phase and the second phase. However, in the present invention, it is impossible to achieve a magnetic material composed of microcrystals of only the first phase or a magnetic material composed of microcrystals of only the second phase, and even when such a structure is included, in the present invention, the first phase and the second phase always exist in the magnetic material. The reason for this is that the formation of the nanocrystals per se plays a large role in the disproportionation reaction in each of the processes of the reduction step that kicks off with reduction of the nanoscale ferrite powder containing the M component that is used for producing the magnetic material of the present invention (in the present application, also referred to as "M-ferrite nanopowder" or "M component-ferrite nanopowder"). In the present application, a nanoscale ferrite powder is also referred to as a "ferrite nanopowder", and the term "nanoscale" means, unless defined otherwise, a scale of 1 nm or more and less than 1 µm.

<Specification of Second Phase>

How to specify the second phase will now be described. First, as described above, the first phase is an α-(Fe,M component) phase, which is mainly to guarantee a high saturation magnetization. The second phase is a phase in which the M component content relative to the total of Fe and the M component contained in the phase is larger than the M component content relative to the total of Fe and the M component contained in the first phase. In the present invention, the second phase may be an α-(Fe,M component) phase whose M component content is higher than the M component content of the whole magnetic material, or may be another crystalline phase, an amorphous phase, or a mixed phase thereof. In any case, the soft magnetic material of the present invention has the effect of keeping the coercive force low, and there is the effect of imparting the oxidation resistance and improving the electric resistivity even if the semi-hard magnetic material is included. Therefore, since the second phase is an aggregate of phases having these effects, if the M component content is higher than that of the first phase, and it is possible to show the presence of any of the phases exemplified above, that material can be understood as being the magnetic material of the present invention. If such a second phase does not exist and there is only the first phase, the magnetic material is inferior in any of magnetic properties such as coercive force, oxidation resistance, and electric conductivity, or has poor workability so that the molding step inevitably becomes complicated.

If the second phase is an α-(Fe,M component) phase, the M component composition may continuously change from that of the first phase. Alternatively, depending on the method for identifying the material, it may appear as if the M component composition of the second phase continuously changes from the first phase. Even in such a case, it is desirable that the M component content of the second phase (i.e., the M component content in the second phase relative to the total of Fe and the M component contained in the second phase) be 1.5 times or more the M component content of the first phase (i.e., the M component content in the first phase relative to the total of Fe and the M component contained in the first phase), that the M component content of the second phase be 2 atom % or more and larger than the M component content of the first phase, or that the M component content of the second phase be 1.5 times or more the M component content of the first phase and 2 atom % or more. When Cr is mainly contained as the M component, the M component content of the second phase is 1.5 times or more the M component content of the first phase so that the electromagnetic properties such as coercive force can be adjusted. The M component content of the second phase is more desirably twice or more when an M component other than Cr is mainly contained. Even when Cr is mainly contained, the M component content of the second phase being twice or more the M component content of the first phase is a preferable range in terms of obtaining a soft magnetic material having small coercive force.

The composition ratio of Fe and the M component is desirably 1:1 or less when the first phase and the second phase are combined. In other words, the M component content relative to the content of Fe and the M component of 100 atom % is desirably 0.01 atom % or more and 50 atom % or less.

The M component content including the first phase and the second phase together is preferably 50 atom % or less in order to avoid a reduction in the saturation magnetization, and is preferably 0.01 atom % or more in order to avoid having no effect of adding the M component on oxidation resistance and to avoid the coercive force becoming so high that it does not correspond to the intended use. Further, from the perspective of a good balance between oxidation resistance and magnetic properties, the M component content when the first phase and the second phase are combined is preferably 0.05 atom % or more and 33 atom % or less, and a particularly preferable range is 0.1 atom % or more and 25 atom % or less.

Although the volume ratio of the first phase and the second phase is arbitrary, the total of the volume of the α-(Fe,M component) phase in the first phase, or the α-(Fe,M component) phase in the first phase and the second phase based on the volume of the whole magnetic material of the present invention including the first phase, the second phase, and the minor phase is preferably 5% by volume or more. Since the α-(Fe,M component) phase is responsible for the main magnetization of the magnetic material of the present invention, the α-(Fe,M component) phase volume is preferably 5% by volume or more in order to avoid a reduction in magnetization. Further, the α-(Fe,M component) phase volume is preferably 25% by volume or more, and more preferably 50% by volume or more. In order to realize a particularly high magnetization without substantially reducing the electric resistivity, it is desirable to set the total of the α-(Fe,M component) phase volume to 75% by volume or more.

In the second phase of the soft magnetic material of the present invention, it is preferable that there is a ferromagnetic phase or an antiferromagnetic phase (in the present application, feebly magnetic phase is also included therein) because there is an effect of reducing the magnetocrystalline anisotropy of the first phase.

<Example of Preferable Second Phase>

In the magnetic material of the present invention, a representative example of a preferable second phase for ferromagnetism is, first, an α-(Fe,M component) phase in which a content of an M component of the second phase relative to the total of Fe and the M component in the second phase is larger than a content of an M component of the first phase relative to the total of Fe and the M component in the first phase, and the M component content is preferably 0.1 atom % or more and 20 atom % or less, more preferably 2 atom % or more and 15 atom % or less, and particularly preferably 5 atom % or more and 10 atom % or less, relative to the total of Fe and the M component in the second phase.

A low coercive force is realized when the M component content of the first phase relative to the total of Fe and the M component in the first phase is 5 atom % or more and 10 atom % or less. However, when the M component content is increased to such a degree, a saturation magnetization of close to 2 T cannot be exhibited. Therefore, it is preferable to realize a magnetic material having large saturation magnetization and small coercive force by combining the first phase having the M component content of less than 5 atom % and the second phase having the M component content of 5 atom % or more.

Next, examples of a preferable second phase include the M-ferrite phase and the wustite phase. The former is ferromagnetic and the latter is antiferromagnetic, but either of them can promote ferromagnetic coupling if it is in the first phase. These oxide phases may have an extremely fine structure at nanosize, and particularly in the wustite phase, may be finely dispersed in the bcc phase or may be present in a layer between bcc microcrystalline phases with a thickness of several atom layers. When such an oxide layer is present, crystal orientations of the bcc phase may be aligned in the region of several hundred nm to several tens m, and even such a fine structure is included in the magnetic material of the present invention if falling within the range of the crystal grain size of the present invention. In particular, when the magnetic material having the above structure is a soft magnetic material, the coercive force is reduced by a mechanism slightly different from the random anisotropy. It is assumed that the mechanism is as follows.

If there is a difference between the M component content of the first phase relative to the total of Fe and the M component in the first phase and the M component content of the second phase relative to the total of Fe and the M component in the second phase and there is a concentration fluctuation in the M component content spatially at a fine nanoscale due to disproportionation, spatial fluctuations of the magnetic anisotropy occur, and as a result, magnetization reversal occurs all of a sudden (as if a resonance phenomenon has occurred) when an external magnetic field is applied. The above concentration fluctuation has the same effect of reducing coercive force when the second phase is not only an oxide phase but also an α-(Fe,M component) phase.

Although examples in which the ferrite phase promotes ferromagnetic coupling are also known (see "WO 2009/057742 A1" (hereinafter, referred to as "Patent Document 3"), and N. Imaoka, Y. Koyama, T. Nakao, S. Nakaoka, T. Yamaguchi, E. Kakimoto, M. Tada, T. Nakagawa, and M. Abe, J. Appl. Phys., vol. 103, No. 7 (2008) 07E129 (hereinafter, referred to as "Non-Patent Document 3")), in all of those cases, a ferrite phase is present between $Sm_2Fe_{17}N_3$ phases of a hard magnetic material, and those phases are ferromagnetically coupled to constitute an exchange spring magnet.

However, the present invention relates to a soft magnetic material or a semi-hard magnetic material, and exhibits completely different functions from those of the above-described hard magnetic exchange spring magnet. In the present invention, if such a second phase is present so as to surround the first phase through an exchange interaction between first phases due to the presence of the second phase, which is an M-ferrite phase or a wustite phase, electric resistance is also high, and coercive force is also reduced. Therefore, this is a particularly preferable second phase for the soft magnetic material of the present invention.

On the other hand, it is preferable that the nonmagnetic M-component oxide phase exist in the second phase since the electric resistance is particularly improved. Even if the M component oxide exists between the first phases, ferromagnetic coupling such as the M-ferrite phase occurs and there is no direct effect on magnetic properties. However, if the M component oxide exists to cover the surface of these ferromagnetically coupled powders, not only are the electric resistance and oxidation resistance improved but also the effect of reducing the coercive force may be obtained.

In the magnetic material of the present invention, when the second phase is any one kind of an M-ferrite phase, a wustite phase, or an M-component oxide phase or a mixed phase thereof, a volume fraction of such a mixed oxide phase is preferably 95% by volume or less of the whole magnetic material, more preferably 75% by volume or less, and still more preferably 50% by volume or less. For example, the M-ferrite phase is ferromagnetic, but has lower magnetization than the α-(Fe,M) phase, and the wustite phase is antiferromagnetic but is feebly magnetic. Thus, there is magnetization to some extent, but the magnetization is lower than the M-ferrite phase. Further, the M-component oxide phase is nonmagnetic. Therefore, the magnetization of the magnetic material of the present invention becomes extremely low in any combination of the above oxide phases when the volume thereof exceeds 95% by volume of the whole magnetic material, and it is preferable to set the volume to 95% by volume or less of the whole magnetic material in order to avoid the problem. In the case where the wustite phase or the M-component oxide phase is mainly contained, the magnetization becomes lower when the content of these three oxide phases exceeds 75% by volume, and it is preferable to set the volume to 75% by volume or less of the whole magnetic material in order to avoid the problem. In the case where the M-component oxide phase is mainly contained, the characteristics of the magnetic material of the present invention having high magnetization are lost at the volume exceeding 50% by volume, and it is preferable to set the volume to 50% by volume or less of the whole magnetic material in order to avoid the problem. In the case of producing a magnetic material having particularly high magnetization while maintaining electric resistivity to a certain extent, it is preferable to set the volume of the oxide phases to 25% by volume or less.

On the other hand, when the M-component oxide phase is present, the electric resistivity increases. Therefore, when the M-component oxide phase or the like is intentionally contained, the volume fraction is preferably 0.001% by volume or more. In order to effectively improve the electric resistivity particularly when the M component oxide is made present without excessively decreasing the magnetization, the volume fraction is more preferably set to 0.01% by volume or more, and particularly preferably to 0.1% by volume or more. Here, for example, whether the oxide phase is the M-component oxide phase or the mixture of M-ferrite and wustite, the above preferable range of the volume fraction is the same.

As described above, the α-(Fe,M) phase, the M-ferrite phase, the wustite phase, and the M-component oxide phase each having a higher M component content than the first phase have been exemplified as preferable phases of the second phase. Among them, the three phases other than the M-component oxide phase are ferromagnetic or antiferromagnetic. Therefore, if these phases are separated without ferromagnetic coupling, since the magnetic curve has additivity, the magnetic curves of these mixed materials are simply the total of the respective magnetic curves, and a smooth step is produced on the magnetic curve of the whole magnetic material. For example, by observing the shape of the ¼ major loop (the magnetic curve when swept from 7.2 MA/m to the zero magnetic field is called the ¼ major loop) of the magnetic curve of the whole magnetic material, which is obtained by measuring the magnetization over a wide magnetic field range of 0 to 7.2 MA/m of an external magnetic field, it can be inferred that the smooth step on the ¼ major loop is due to the above-described circumstances or that there is certainly an inflection point based thereon. On the other hand, when these dissimilar magnetic materials are formed as one body by ferromagnetic coupling, a smooth step or an inflection point is not seen on the major loop in the range of 7.2 MA/m to the zero magnetic field, but a monotonically increasing magnetic curve with a convex portion at the top is produced. In order to estimate the existence of ferromagnetic coupling, in addition to observing the fine structure at the grain boundary region as described above, the above-described detailed observation of the magnetic curve is also one measure.

<Composition Distribution>

In the examples of the present application, local composition analysis of the metal elements of the magnetic material of the present invention is mainly carried out by EDX (energy dispersive X-ray spectroscopy), and the composition analysis of the whole magnetic material is carried out by XRF (X-ray fluorescence elemental analysis). Generally, the M component content of the first phase and the second phase is measured by an EDX apparatus attached to an SEM (scanning electron microscope), an FE-SEM, a TEM (transmission electron microscope), or the like (in the present application, this FE-SEM, etc. equipped with an EDX is also referred to as an "FE-SEM/EDX", for example). Depending on the resolution of the apparatus, if the crystal structure of the first phase and the second phase is a fine structure of 300 nm or less, accurate composition analysis cannot be performed with an SEM or FE-SEM. However, to detect only the difference in the M components or Fe components of the magnetic material of the present invention, those apparatuses can be utilized in a supplementary manner. For example, in order to find a second phase that is less than 300 nm and has an M component content of 5 atom % or more, a certain point in the magnetic material is observed, and if the quantitative value of that point can be confirmed as having an M component content of 5 atom % or more, then that means that a structure having an M component content of 5 atom % or more or a part of such a structure is present within a diameter of 300 nm centered on that one point. Conversely, to find a first phase having an M component content of 2 atom % or less, a certain point is observed in the magnetic material, and if the quantitative value of that point can be confirmed as having an M component content of 2 atom % or less, then that means that a structure having an M component content of 2 atom % or less or a part of such a structure is present within a diameter of 300 nm centered on that one point.

When the composition is analyzed using the EDX apparatus attached to the TEM, for example, an electron beam can be reduced to 0.2 nm, so that extremely fine composition analysis can be performed. Conversely, in order to uniformly examine a certain area and obtain an overall image of the material of the present invention, it is necessary to handle a large amount of data such as 60,000 pieces.

That is, it is necessary to appropriately select the above composition distribution measurement method and specify compositional and structural characteristics of the magnetic material of the present invention, such as each composition of the first phase and the second phase and the crystal grain size.

Further, the composition of the α-(Fe,M) phase can also be determined by confirming a position of a diffraction peak with an XRD (X-ray diffractometer). The diffraction peak of the α-(Fe,M) phase generally tends to shift to a low angle as the M component content increases, and it is also possible to know an M component content of α-(Fe,M) phase to one significant digit or more by observing the behavior of (110) and (200) peaks and comparing the peaks with a diffraction position of α-Fe (preparing and comparing Fe-ferrite nanopowder that does not contain the M component or the TM component as a comparative example with reference to the method of the present invention).

This is useful for verifying that the M composition, which is the characteristic of the present invention, is disproportionated and various crystalline phases are present, and whether their crystal axes are randomly oriented. Further, to distinguish the α-(Fe,M) phase from the other oxide phases, it is convenient and effective to analyze the oxygen characteristic X-ray surface distribution map using, for example, SEM-EDX.

<Composition of Whole Magnetic Material>

The composition of the whole magnetic material (i.e., respective composition when the total of the component contents constituting the whole magnetic material is taken to be 100 atom %) in the present invention is in the range of, based on the composition of the whole magnetic material, 20 atom % or more and 99.999 atom % or less of the Fe component, 0.001 atom % or more and 50 atom % or less of the M component, and 0 atom % or more and 55 atom % or less of O (oxygen). Preferably, all of these ranges are simultaneously satisfied. Further, an alkali metal such as K may be contained in the range of 0.0001 atom % or more and 5 atom % or less. It is desirable that the minor phase including K and the like does not exceed 50% by volume of the whole.

It is preferable that Fe is 20 atom % or more because a reduction in the saturation magnetization can be avoided. It is preferable that Fe is 99.999 atom % or less because a reduction in the oxidation resistance and deterioration in workability can be avoided. Also, it is preferable that the M component is 0.001 atom % or more because a reduction in the oxidation resistance and deterioration in workability can be avoided. It is preferable that the M component is 50 atom % or less because a reduction in the saturation magnetization can be avoided. When O is an important element for forming the second phase, it is preferable that O is in a range of 55 atom % or less because not only a reduction in the saturation magnetization can be avoided, but a situation in which the disproportionation reaction in the first phase and the second phase by reduction of the M component-ferrite nanopowder does not occur, making it more difficult to develop to a low coercive force soft magnetic material can be avoided. Although the magnetic material of the present invention does not necessarily need to contain oxygen, it is desirable that even a slight amount be contained in order to obtain a magnetic material with remarkably high oxidation resistance and electric resistivity. For example, it is possible to passivate the surface of the metal powder reduced by the gradual oxidation step (described later), or to cause oxide layers of one atom layer to several atom layers mainly including the M component oxide as the center to be present at a part of the crystal grain boundary of the solid magnetic material by that passivation action. In this case, the respective composition ranges of the whole magnetic material of the present invention are desirably 20 atom % or more and 99.998 atom % or less of the Fe component, 0.001 atom % or more and 50 atom % or less of the M component, and 0.001 atom % or more and 55 atom % or less of O.

A more preferable composition of the magnetic material of the present invention is 50 atom % or more and 99.98 atom % or less of the Fe component, 0.01 atom % or more and 49.99 atom % or less of the M component, and 0.01 atom % or more and 49.99 atom % or less of O. In this range, the magnetic material of the present invention has a good balance between saturation magnetization and oxidation resistance.

Further, the magnetic material of the present invention having a composition in which the Fe component is in the range of 66.95 atom % or more and 99.9 atom % or less, the M component is in the range of 0.05 atom % or more and 33 atom % or less, and O is in the range of 0.05 atom % or more and 33 atom % or less is preferable from the perspective of having excellent electromagnetic properties and excellent oxidation resistance.

Within the above composition ranges, when the magnetic material of the present invention is to have an excellent performance, in particular, a magnetization of 1 T or more, a preferable composition range is 79.95 atom % or more and 99.9 atom % or less for the Fe component, 0.05 atom % or more and 20 atom % or less for the M component, and 0.05 atom % or more and 20 atom % or less for O.

Since it also depends on the M component content, and hence cannot be unconditionally stated, the semi-hard magnetic material tends to contain more oxygen than the soft magnetic material in the present invention.

<Magnetic Properties, Electrical Properties, and Oxidation Resistance>

One aspect of the present invention is a magnetic material having magnetic properties, electrical properties, and oxidation resistance suitable for soft magnetic applications with a coercive force of 800 A/m or less. This point is now described below.

The term "magnetic properties" as used herein refers to at least one of the magnetic material's magnetization J (T), saturation magnetization $J_s$ (T), magnetic flux density (B), residual magnetic flux density $B_r$ (T), exchange stiffness constant A (J/m), magnetocrystalline anisotropy magnetic field $H_a$ (A/m), magnetocrystalline anisotropy energy $E_a$ (J/m$^3$), magnetocrystalline anisotropy constant $K_1$ (J/m$^3$), coercive force $H_{cB}$ (A/m), intrinsic coercive force $H_{cJ}$ (A/m), permeability $\mu\mu_0$, relative permeability $\mu$, complex permeability $\mu_r\mu_0$, complex relative permeability $\mu_r$, its real term $\mu'$, imaginary term $\mu''$, and absolute value $|\mu_r|$. In the present specification, A/m from the SI unit system and Oe from the cgs Gauss unit system are both used as the units of the "magnetic field". The formula for conversing between those values is 1 (Oe)=1/(4π)×10$^3$ (A/m). More specifically, 1 Oe is equivalent to about 80 A/m. As the units for the "saturation magnetization" and "residual magnetic flux density" in the present specification, T from the SI unit system and emu/g from the cgs Gauss unit system are both used. The formula for converting between those values is 1 (emu/g)=4π×d/10$^4$ (T), where d (Mg/m$^3$=g/cm$^3$) represents density. Therefore, since d=7.87 for Fe, Fe having a saturation magnetization of 218 emu/g has a saturation magnetization value $M_S$ in the SI unit system of 2.16 T. In the present specification, unless stated otherwise, the term "coercive force" refers to the intrinsic coercive force $H_{cJ}$.

The term "electrical properties" used herein refers to the electric resistivity (=volume resistivity) ρ (Ωm) of the material. The term "oxidation resistance" used herein refers to a change over time in the magnetic properties in various oxidizing atmospheres, for example, a room-temperature air atmosphere.

The above-mentioned magnetic properties and electrical properties are collectively referred to as "electromagnetic properties".

In the magnetic material of the present invention, it is preferable that the magnetization, the saturation magnetization, the magnetic flux density, the residual magnetic flux density, and the electric resistivity are higher. For the saturation magnetization, a value as high as 0.3 T or 30 emu/g or more is desirable. For soft magnetic materials in particular, a value as high as 100 emu/g or more is desirable, and a value as high as 1.5 μΩm or more is desirable for the electric resistivity. Other magnetic properties of the present invention, for example, a magnetocrystalline anisotropy constant, coercive force, permeability, relative permeability, etc. are properly controlled according to the application by determining a semi-hard magnetic material or a soft magnetic material. In particular, depending on the application, the permeability and relative permeability do not always have to be high. As long as the coercive force is sufficiently low and the iron loss is suppressed to a low level, for example, the relative permeability may even be adjusted to a magnitude in the range of $10^{-1}$ to around $10^5$. In particular, by suppressing the magnetic saturation under a direct-current superimposed magnetic field, it is possible to suppress the deterioration in efficiency and facilitate linear control, or based on the relational expression (1), each time the permeability is reduced by one digit, the critical thickness at which eddy current loss occurs can be increased by a factor of about 3.2. One of the characteristics of the present invention lies in comprising a magnetization reversal mechanism that is based mainly on direct rotation of magnetization, and not on magnetization reversal due to domain wall movement. As a result, the coercive force is low, eddy current loss due to domain wall movement is small, and iron loss can be suppressed to a low level. Moreover, it is possible to generate some local magnetic anisotropy at the crystal boundary for suppressing magnetization rotation by the external magnetic field, and to reduce permeability.

Here, the major characteristic of the present invention is that the relative permeability can be controlled freely by using the M component of the present invention as compared to, for example, the case where there is no M component or the case where there is only the TM component, and the magnetic saturation suppression performance (function or property of the magnetic material that does not cause magnetic saturation) can be imparted according to the purpose. Examples of the M component that increases the relative permeability include Zn, Si, Cu, and Ta, and examples of the M component that decreases the relative permeability include Zr, Hf, V, Nb, Cr, Mo, and W. By appropriately mixing and adding the M component having both the properties, a magnetic material suitable for the required performance is supplied.

Meanwhile, in the present invention, the reason why such a permeability can be adjusted is that iron loss due to eddy current is small since the electric resistivity of the magnetic material is large even if the material is simply sintered as it is, and thus, the total iron loss can be kept small even if hysteresis loss is slightly increased by designing the material to suppress the permeability at the slight expense of the coercive force.

The soft magnetic material of the present invention can exhibit an electric resistivity of 1.5 μΩm or more, and the semi-hard magnetic material can exhibit an even higher electric resistivity.

In the soft magnetic material of the present invention having the electric resistivity of 10 μΩm or more, it is necessary to determine the composition of raw materials and the degree of reduction according to desired electromagnetic properties since the saturation magnetization tends to decrease as the electric resistivity increases. In particular, the electric resistivity less than 1000 μΩm is preferable in terms of obtaining the characteristic that the magnetization of the magnetic material of the present invention is high. Therefore, a preferable range of the electric resistivity is 1.5 μΩm or more and 1000 μΩm or less.

<Crystal Boundary>

Whether the magnetic material of the present invention becomes soft magnetic or semi-hard magnetic depends on the magnitude of coercive force as described above, and has a close relationship with its fine structure. Although an α-(Fe,M) phase may at a glance look as if they are a continuous phase, as shown in (A) and (B) of FIG. 1, the magnetic material contains many heterogenous phase interfaces and crystal grain boundaries. Further, the magnetic material contains crystals such as twin crystals including simple twins such as contact twins and penetrating twins, recurring twins such as polysynthetic twins, cyclic twins, and multiple twins, intergrowths, and skeleton crystals (in the present invention, when crystals are classified not only by the heterogenous phase interface and the polycrystalline grain boundary but also by the various crystal habits, tracht, intergrowth structures, dislocations, and the like described above, those boundary surfaces are collectively referred to as "crystal boundaries"). In many cases, unlike linear grain boundaries which are generally often seen, the crystal boundaries are often presented as a group of curves, and furthermore, in such a structure, there is seen a large difference in M component content depending on location. The magnetic material of the present invention having such a fine structure is often a soft magnetic material.

In the case where the magnetic material of the present invention is a soft magnetic material, when the second phase is an α-(Fe,M) phase, starting from an M-ferrite nanopowder, as the first phase and the second phase undergo grain growth, and as the reduction reaction progresses, the oxygen in the crystal lattice is lost in conjunction with the disproportionation reaction of the composition, in eventually causing a large reduction in volume of normally up to 52% by volume. As a result of this, the first phase and the second phase, which are α-(Fe,M) phases, have diverse microstructures, such as crystals that are observed in precious stones such as quartz and minerals and rocks such as pyrite and aragonite, and these phases are in a reduced form on a nanoscale and contain various phases and nanocrystals with various M component contents in their interior.

The structures seen at the crystal grain boundaries and in intergrowths may also exhibit a difference in M component content depending on the observed location, and hence are a heterogeneous phase interface in some cases.

<Random Magnetic Anisotropy Model and Coercive Force Reduction Mechanism Unique to Present Invention>

For the soft magnetic material of the present invention described by the random anisotropy model, it is important that the following three conditions are satisfied.

(1) The crystal grain size of the α-(Fe,M) phase is small;
(2) Ferromagnetic coupling is obtained by exchange interaction; and
(3) Orientations are random.

The condition (3) is not necessarily essential particularly in the region where the M component content of the bcc phase is 10 atom % or less. In this case, the reduction in coercive force is caused by a principle different from the random anisotropy model. Specifically, magnetic anisotropy fluctuations occur based on concentration fluctuations in the nanoscale M component content due to interactions between one or more of the first phase and the second phase, the first phases themselves, or the second phases themselves. This promotes magnetization reversal, and the coercive force is reduced. The magnetization reversal mechanism based on this mechanism is unique to the present invention, and has been found for the first time by the present inventors as far as the inventors are aware.

In cases of the grain growth during reduction, or where the grains do not fuse with each other so as to form a continuous ferromagnetic phase, or where there is phase separation in which grains separate, to bring the coercive force of the magnetic material of the present invention into the soft magnetic region, it is desirable to subsequently solidify the magnetic material by sintering or the like, namely, form the state that "the first phase and the second phase are continuously bonded to each other directly or via a metal phase or an inorganic phase to form a massive state as a whole".

In order to achieve the above item (2), namely, ferromagnetic coupling by exchange interaction, since the exchange interaction is an interaction or force that acts within a short range in the order of several nm, when first phases are coupled to each other, it is necessary for the phases are to be directly bonded, and when a first phase and a second phase or second phases are coupled to each other, it is necessary for the second phase to be ferromagnetic or antiferromagnetic in order to transmit the exchange interaction. Even if a part of the first phase and/or the second phase is in a superparamagnetic region, since the material itself is ferromagnetic or antiferromagnetic in the bulk state, as long as the surrounding ferromagnetic or antiferromagnetic phase is sufficiently exchange coupled, those phases may be able to transmit an exchange interaction.

In the case of the semi-hard magnetic material of the present invention, the above-described solidification is necessary to obtain the semi-hard magnetic material having a high residual magnetic flux density although not limited to above description.

<Average Crystal Grain Size of First Phase, Second Phase, and Whole Magnetic Material>

The average crystal grain size of the first phase or the second phase of the soft magnetic material of the present invention or the average crystal grain size of the whole magnetic material is preferably 1 nm or more and less than 10 μm. When the average crystal grain size of the first phase and the second phase is less than 10 μm, the average crystal grain size of the whole magnetic material is also less than 10 μm.

In particular, regarding the soft magnetic material of the present invention, in order to realize a low coercive force by the above random magnetic anisotropy model or the mechanism unique to the present invention, it is preferable that either the first phase or the second phase is in the nano region. When both the first phase and the second phase are ferromagnetic phases, it is preferable that the average crystal grain size of both phases is less than 10 μm, and preferably less than 1 μm in order to realize a low coercive force based on the random magnetic anisotropy model. This average crystal grain size is more preferably 500 nm or less, and particularly preferably 200 nm or less, because a remarkable reduction effect of the coercive force by the mechanism unique to the present invention can be realized, although this does depend on the M component content as well. In the above case, since the magnetic anisotropy energy of the first phase is larger than the second phase in many cases, particularly when the first phase is less than 10 μm, preferably 500 nm or less, and more preferably 200 nm or less, the coercive force becomes very small, and a soft magnetic material suitable for various transformers, motors, and the like is obtained.

On the other hand, if this average crystal grain size is less than 1 nm, superparamagnetism occurs at room temperature, and magnetization and permeability may become extremely small. Therefore, it is preferable that this average crystal grain size is 1 nm or more. As described above, if crystal grains smaller than 1 nm or amorphous phases are present, these need to be sufficiently coupled to crystal grains of 1 nm or more in size by exchange interaction.

When the second phase is not a ferromagnetic phase, the second phase is not involved in reducing the coercive force by the random anisotropy model or a mechanism unique to the present invention, but its presence increases the electric resistivity, and hence it is preferable for that component to be present.

In the case of the semi-hard magnetic material of the present invention, in order to express a coercive force, contrary to the above, it is effective to maintain the average crystal grain size of the first phase at the nano level, and either employ a suitable surface oxide layer as the second phase or cause a second phase having an average crystal grain size of several nm to be present at the grain boundary of the first phase to thereby maintain a high magnetization and impart oxidation resistance while maintaining the coercive force of the semi-hard magnetic region.

<Measurement of Crystal Grain Size>

Measurement of the crystal grain size of the present invention is carried out using an image obtained by SEM, TEM, or metallographic microscopy. The crystal grain size is obtained by, within an observed range, observing not only the heterogenous phase interfaces and crystal grain boundaries but all the crystal boundaries, and taking the diameter of the crystal region of the surrounded portion to be the crystal grain size. When the crystal boundary is difficult to see, the crystal boundary may be etched by a wet method using a Nital solution or the like, a dry etching method, or the like. The average crystal grain size is, in principle, obtained by selecting a representative portion and measuring a region containing at least 100 crystal grains. Although the number of grains may be less than this, in that case the measurement needs to be carried out on a portion that is statistically sufficiently representative of the whole. The average crystal grain size is obtained by photographing the observation area, defining an appropriate rectangular quadrilateral area on the photographic plane (the enlarged projection plane on the target photographic plane), and applying the Jeffry method to the interior of that defined area. When observing by an SEM or a metallurgical microscope, the crystal boundary width may be too small in relation to the resolution and may not be observed, but in that case the measured value of the crystal grain size gives the upper limit of the actual crystal grain size. Specifically, it is sufficient that the upper limit has a crystal grain size measurement value of 10 μm. However, there is a possibility that part or all of the magnetic material may be below 1 nm, which is the lower limit of the crystal grain size, due to phenomena such as having no clear diffraction peaks in XRD and superparamagnetism being confirmed on the magnetic curve. In such a case, the actual crystal grain size must be determined again by TEM observation. Further, there is a case where it is necessary to measure the crystal grain size irrespective of the crystal boundary in the present invention. In other words, there is a case where a crystal structure is finely modulated due to fluctuations in the concentration of the M component content, and the crystal grain size of the magnetic material of the present invention having such a fine structure has a modulation width of the M component content is defined as the crystal grain size. Although the crystal grain size is often determined by TEM-EDX analysis or the like, the size generally corresponds to a crystallite size to be described in the next section.

<Measurement of Crystallite Size>

The crystallite is a small single crystal constituting a crystalline substance at a microscopic level, and is smaller than individual crystals (so-called crystal grains) constituting a polycrystal.

In the present invention, phase separation occurs due to the disproportionation reaction, and a composition width occurs in the M component content of the bcc phase of the first phase and/or the second phase. Since an X-ray diffraction peak position changes depending on the M component content, for example, even if a line width of the diffraction line at (200) of the bcc phase is determined and a crystallite size is determined with the line width, an error increases. Therefore, there may be a case where the crystallite size obtained by this method is not recognized as significant in the case of a crystal having a bcc phase structure containing the M component. Since there may be the case where the crystallite size is not recognized as significant in this manner, a crystallite size obtained based on the diffraction line at (200) of the bcc phase is referred to as an "apparent crystallite size" as described above in the present application.

On the other hand, Ni and Co contained as being substituted for the Fe component have an atomic radius close to that of Fe, a small degree of disproportionation, and almost no size change in crystallite size due to composition distribution. Further, when the M component content in the bcc phase is 0.001 atom % to 1 atom %, the deviation of the diffraction line of (200) is very small, and thus, it is significant to measure the crystallite size to one significant digit in the range of 1 nm or more and 300 nm or less. Therefore, even if the apparent crystallite size of one significant digit is measured for crystals in which at least the first phase has a composition represented by a composition formula of $Fe_{100-x}M_x$ (x is 0.001≤x≤1 in terms of atomic percentage, M is one or more of Zr, Hf, V, Nb, Ta, Cr, Mo, W, Cu, Zn, and Si), for example, as the magnetic material, the apparent crystallite size can be substantially regarded as the "crystallite size" thereof. Therefore, the apparent crystallite size in such a case is simply referred to as the "crystallite size" in the present application.

In the present invention, the crystallite size of the bcc phase was calculated by using the (200) diffraction line width excluding the influence of the Kα2 diffraction line and the Scherrer equation, and taking the dimensionless shape factor to 0.9.

The bcc phase may be a phase in which at least the first phase has the bcc phase (i.e., a case in which only the first phase has the bcc phase and a case in which both the first phase and the second phase have the bcc phase), but a preferable crystallite size range of the bcc phase is 1 nm or more and 300 nm or less.

When the crystallite size is less than 1 nm, superparamagnetism occurs at room temperature, and magnetization and permeability may become extremely small. Therefore, it is preferable that this crystallite size is 1 nm or more.

The crystallite size of the bcc phase is preferably 200 nm or less because the coercive force enters the soft magnetic region and becomes extremely small, and a soft magnetic material suitable for various transformers, motors, and the like is obtained. Further, at 100 nm or less, not only a high magnetization exceeding 2 T, which is a low region of the content of the M component, can be obtained, but also a low coercive force can be achieved at the same time, and hence this is a very preferable range.

For general crystals, the apparent crystallite size has a risk of being measured to be smaller than a "crystallite size" of a material in which an M component content of a bcc phase is 0.001 atom % or more and 1 atom % or less. Therefore, in the present invention (for example, as a magnetic material, crystals in which at least the first phase has a composition represented by a composition formula of $Fe_{100-x}M_x$ (x is 0.001≤x≤33 in terms of atomic percentage, and M is one or more of Zr, Hf, V, Nb, Ta, Cr, Mo, W, Cu, Zn, and Si), it is possible to avoid the above risk, for example, if the apparent crystallite size is limited to 1 nm or more and 200 nm or less in the range of 1 nm or more and 300 nm or less. As a result, the above-described relationship between the crystallite size and the favorable magnetic properties is maintained. Therefore, in the magnetic material of the present invention, the "apparent crystallite size" limited to 1 nm or more and 200 nm or less is also simply referred to as the "crystallite size".

<Size of Soft Magnetic Material>

The size of the powder of the soft magnetic material of the present invention is preferably 10 nm or more and 5 mm or less. If this size is less than 10 nm, the coercive force does not become sufficiently small, and if the size exceeds 5 mm, a large strain is applied during sintering, and the coercive force conversely increases unless there is an annealing treatment after solidification. More preferably the size is 100 nm or more and 1 mm or less, and particularly preferably is 0.5 μm or more and 500 μm or less. If the average powder particle diameter is contained in this region, a soft magnetic material with a low coercive force is obtained. Further, the particle size distribution is preferably sufficiently wide within each average powder particle diameter range defined above because high filling is easily achieved with a relatively small pressure and the magnetization based on the volume of the solidified molded body is increased. When the powder particle diameter is too large, movement of the domain walls may be excited, and due to the heterogenous phases formed by the disproportionation reaction in the production process of the soft magnetic material of the present invention, that domain wall movement is hindered, which can conversely result in the coercive force becoming larger. Therefore, when molding the soft magnetic material of the present invention, it can be better for the surface of the magnetic material powder of the present invention having an appropriate powder particle diameter to be in an oxidized state. Since the alloy containing an M component may form a passive film of a nonmagnetic M-component oxide phase on the surface by oxidation, not only is oxidation resistance extremely excellent, but there is also an effect of reducing the coercive force and improving in electric resistivity. Performing appropriate gradual oxidation of the powder surface, carrying out each step in air, and performing the solidification treatment in an inert gas atmosphere or the like rather than only in a reducing atmosphere are also effective.

<Size of Semi-Hard Magnetic Material>

The average powder particle diameter of the magnetic powder of the semi-hard magnetic material of the present invention is preferably in a range of 10 nm or more and 10 μm or less. If this average powder particle diameter is less than 10 nm, molding is hard to carry out, and when the magnetic material is used dispersed in a synthetic resin or ceramic, dispersibility is very poor. Further, if the average powder particle diameter exceeds 10 μm, since the coercive force may reach the soft magnetic region, the magnetic material falls into the category of a soft magnetic material of the present invention. A more preferable average powder particle diameter is 10 nm or more and 1 μm or less. Within this range, the magnetic material is a semi-hard magnetic material with a balance between saturation magnetization and coercive force.

<Measurement of Average Powder Particle Diameter>

The powder particle diameter of the magnetic material of the present invention is mainly evaluated based on its median diameter calculated from a distribution curve obtained by measuring the volume-equivalent diameter distribution using a laser diffraction type particle size distribution meter. Alternatively, the powder particle diameter may also be calculated by choosing a photograph of the powder obtained by SEM or TEM, or a representative portion based on a metallographic micrograph, and measuring diameters of at least 100 particles. Although the number of grains may be less than this, in that case the measurement needs to be carried out on a portion that is statistically sufficiently representative of the whole. In particular, when measuring the particle size of a powder smaller than 500 nm or a powder exceeding 1 mm, priority is given to a method using SEM or TEM. Further, when a total number of measurements n is performed using N types (N≤2) of measurement method or measurement apparatus in combination (N≤n), the numerical values $R_n$ thereof needs to be within a range of $R/2 \leq R_n \leq 2R$. In that case, the average powder particle diameter is determined based on R, which is the geometric average of the lower limit and the upper limit.

As described above, the method for measuring the powder particle diameter of the magnetic material of the present invention, in principle, (1) preferentially adopts the laser diffraction type particle size distribution meter when the measured value is 500 nm or more and 1 mm or less, and (2) preferentially adopts the microscopy when the measured value is less than 500 nm or more than 1 mm. (3) When methods (1) and (2) are used in combination at 500 nm or more and 1 mm or less, the above-described R is used to determine the average powder particle diameter. In the present application, the powder particle diameter is expressed to one to two significant digits in the case of methods (1) or (2), and in the case of (3) is expressed to one significant digit. The reason why the methods for measuring the powder particle diameter are used together is that when the powder particle diameter is just above 500 nm or just below 1 mm, there is a possibility that with method (1) an inaccurate value is obtained even when expressed to one significant digit, while on the other hand, for method (2), it takes time and effort to confirm that the measurement value is not local information. Therefore, it is very rational to first obtain the value of the average powder particle diameter by method (1), then obtain the value easily by method (2), comparatively look at the two values and determine the average powder particle diameter by using the above-described R. In the present application, the average particle diameter of the powder of the magnetic material of the present invention is determined by the above method. However, if methods (1) and (3), or methods (2) and (3) do not match to one significant digit, R must be determined by precisely measuring using method (1) or (2) again based on the average powder particle diameter range. However, when there are obvious inappropriate reasons, such as when there is clearly strong agglomeration and it would be inappropriate to determine the powder particle diameter by method (1), or when the powder is too uneven and the powder particle diameter estimated from the sample image is clearly different and it would be inappropriate to determine the powder particle diameter by method (2), or when due to the specification of the measurement apparatus, classifying based on a size of 500 nm or 1 mm as the standard for determining the powder particle diameter measurement would be inappropriate, it is acceptable to disregard the above principle and re-select one of the methods (1), (2), or (3) for that particular case. If it is only necessary to distinguish the magnetic material of the present invention from other magnetic materials, it is sufficient for the average powder particle diameter to be determined to one significant digit.

For example, in the case of reducing an M-ferrite nanopowder having an M component content of 10 atom % or less at 1000° C. or higher, the macroscopic powder shape is a three-dimensional network structure in which many hollow portions, which are through-holes, are contained inside, and hence the powder may become sponge-like. These hollow portions are thought to be formed by large volume reductions caused by oxygen leaving the crystal lattice as grain growth progresses in the reduction reaction. The powder particle diameter in this case is measured including the volume of the interior hollow portions.

<Solid Magnetic Material>

The magnetic material of the present invention can be used as a magnetic material in which the first phase and the second phase are continuously bonded to each other directly or via a metal phase or an inorganic phase to form a massive structure as a whole (in the present application, also referred to as "solid magnetic material"). Further, as described above, when many nanocrystals are already bonded in the powder, the powder may be molded by mixing with an organic compound such as a resin, an inorganic compound such as glass or ceramic, a composite material thereof, or the like.

<Packing Factor>

The packing factor is not particularly limited as long as the objects of the present invention can be achieved. However, when the magnetic material of the present invention contains a small amount of the M component, from the perspective of oxidation resistance and a balance between electric resistivity and magnetization level, it is preferable to set the packing factor to 60% by volume or more and 100% by volume or less.

As used herein, the term "packing factor" refers to the ratio, expressed as a percentage, of the volume of the magnetic material of the present invention relative to the volume of the whole magnetic material of the present invention including voids (i.e., volume occupied only by the magnetic material of the present invention, excluding the portion that is not the magnetic material of the present invention, such as voids and resin).

A more preferable range of the packing factor is 80% or more, and particularly preferable is 90% or more. Although the magnetic material of the present invention has high oxidation resistance to begin with, as the packing factor is increased, the oxidation resistance further increases, and there is a wider range of applications that the magnetic material of the present invention can be applied to. Further, the saturation magnetization is also improved, and a high performance magnetic material can be obtained. Further, in the soft magnetic material of the present invention, there is also an effect of increasing the bonding between the powders and reducing the coercive force.

<Characteristics of Magnetic Powder and Solid Magnetic Material of Present Invention>

One of the major characteristics of the magnetic material powder of the present invention is that it is a sinterable powder material like ferrite. Various solid magnetic materials having a thickness of 0.5 mm or more can easily be produced. Even various solid magnetic materials having a thickness of 1 mm or more, and even 5 mm or more, can be produced comparatively easily by sintering or the like as long as the thickness is 10 cm or less.

Further, one characteristic of the magnetic material of the present invention is that the electric resistivity is high. Whereas other metallic rolling materials and ribbon materials are produced by a method that does not include crystal grain boundaries, heterophases, and defects, the magnetic material powder of the present invention contains many crystal boundaries and various phases, and has the effect of increasing the electric resistivity as it is. When solidifying the powder thereafter, the electric resistivity of a bulk body also increases since a surface oxide layer of the powder particularly before solidification (i.e., a layer having a high oxygen content, such as the M-component oxide phase, wustite, magnetite, M-ferrite, M-hematite, and amorphous, present on the surface of the first phase or the second phase, an oxide layer containing a lot of M components among them) and/or a metal layer (i.e., a metal layer containing a lot of M components) is interposed.

In particular, as a preferable constituent compound of the surface oxide layer for increasing the electric resistivity, at least one kind of the M-component oxide phase, wustite, and M-ferrite is exemplified.

The reason why the magnetic material of the present invention has the above characteristics is that the present invention mainly provides a build-up type bulk magnetic material by producing a magnetic material that has a high magnetization and that is formed by a method which is essentially different from other metallic soft magnetic materials for high frequency applications, namely, by first producing a metal powder having nanocrystals by reducing an M-ferrite nanopowder and then forming a solid magnetic material by molding the magnetic powder.

Further, since the electric resistance is higher than existing metallic soft magnetic materials represented by silicon steel as described above, it is possible to considerably simplify a lamination step or the like generally required when producing a rotating device or the like, for example. If the electric resistivity of the magnetic material of the present invention is about 30 times that of silicon steel, a limit of the thickness at which eddy current does not occur is about five times based on the relational expression (1), and thus, the number of laminated layers is ⅕ even when the lamination is required. For example, even when applied to a stator of a motor in a high-rotation region with a frequency of 667 Hz, the thickness is allowed to be up to 1.5 mm.

The solid magnetic material of the present invention does not contain a binder such as a resin, has high density, and can be easily processed into an arbitrary shape by an ordinary processing machine by cutting and/or plastic working. In particular, one of the major characteristics of the solid magnetic material is that it can be easily processed into a prismatic shape, a cylindrical shape, a ring shape, a disk shape, a flat sheet shape, or the like having high industrial utility value. It is also possible to process the solid magnetic material into those shapes and then subject to cutting and the like for processing into a roof tile shape or a prismatic shape having an arbitrary base shape. Specifically, it is possible to easily perform cutting and plastic working into an arbitrary shape or any form surrounded by flat surfaces or curved surfaces, including cylindrical surfaces. Here, the term "cutting" refers to cutting general metal materials. Examples include machine processing by a saw, a lathe, a milling machine, a drilling machine, a grinding stone, and the like. The term "plastic working" refers to a process such as die cutting by a press, molding, rolling, explosion forming, and the like. Further, in order to remove distortion after cold working, annealing can be performed in the range of the ordinary temperature to 1500° C.

<Production Method>

Next, the method for producing the magnetic material of the present invention will be described, but the present invention is not particularly limited thereto.

The method for producing the magnetic material of the present invention includes two steps of:

(1) an M-ferrite nanopowder producing step; and
(2) a reduction step, and, may optionally further include any one or more of the following steps:

(3) a gradual oxidation step;
(4) a molding step; and
(5) an annealing step.

Each step is now described in more detail.

(1) M-Ferrite Nanopowder Production Step (in the present application, also referred to as "step (1)")

Examples of a preferable step of producing the nanomagnetic powder, which is a raw material of the magnetic material of the present invention, include a method of synthesizing at room temperature using a wet synthesis method.

Examples of known methods for producing a ferrite fine powder include a dry bead mill method, a dry jet mill method, a plasma jet method, an arc method, an ultrasonic spray method, an iron carbonyl vapor phase cracking, and the like. Any of these methods is a preferable production method, as long as the magnetic material of the present invention is formed. However, to obtain nanocrystals having a disproportionated composition, which is the essence of the present invention, it is preferable to mainly employ a wet method using an aqueous solution because it is the simplest.

This production step is carried out by applying the "ferrite plating method" described in Patent Document 3 to the step for producing the M-ferrite nanopowder used for producing the magnetic material of the present invention.

The ordinary "ferrite plating method" is applied not only to powder surface plating but also to thin films and the like. The reaction mechanism and the like of the ferrite plating method have already been disclosed (e.g., see Masaki Abe, Journal of the Magnetic Society of Japan, Volume 22, No. 9 (1998), page 1225 (hereinafter, referred to as "Non-Patent Document 4") and "WO 2003/015109 A1" (hereinafter, referred to as "Patent Document 4")). However, unlike such a "ferrite plating method", in this production step, the powder surface, which serves as the base material of the plating, is not used. In this production step, the raw materials (e.g., chromium chloride and iron chloride) used for ferrite plating are reacted in solution at 100° C. or lower to directly synthesize the ferrous and crystalline M-ferrite nanopowder itself. In the present application, this step (or method) is referred to as "M-ferrite nanopowder production step" (or "M-ferrite nanopowder production method").

An "M-ferrite nanopowder production step" in which the nanopowder has a spinel structure is described below as an example.

An appropriate amount of an aqueous solution adjusted in advance to an acidic region is placed in a container (in the present application, also referred to as a "reaction field"), and while subjecting to ultrasonic wave excitation at room temperature under atmospheric pressure or mechanical stirring at an appropriate strength or revolution number, a pH adjusting solution is added dropwise simultaneously with a reaction solution to gradually change the pH of the solution from the acidic to the alkaline range, thereby forming M-ferrite nanoparticles in the reaction field. Then, the solution and the M-ferrite nanopowder are separated, and the powder is dried to obtain an M-ferrite powder having an average powder particle diameter of 1 nm or more to less than 1000 nm (1 μm). The above method is an example of an inexpensive method because the steps are simple. In particular, all of the steps in the working examples of the present invention are carried out at room temperature, and hence the burden of equipment costs and running costs in production steps is reduced due to the use of production step that does not use a heat source. Although the method for producing the M-ferrite nanopowder used in the present invention is of course not limited to the above-described production method, the initial liquid used in the above production method of the reaction field before the reaction starts (in the present application, this is also referred to as the "reaction field solution"), the reaction solution, and the pH adjusting solution are now described in more detail below.

As the reaction field solution, an acidic solution is preferable. In addition to inorganic acids such as hydrochloric acid, nitric acid, sulfuric acid, and phosphoric acid, a solution obtained by dissolving a metal salt, a double salt thereof, a complex salt solution, and the like in a hydrophilic solvent such as water (e.g., an iron chloride solution, an M component chloride solution, etc.), a solution of a hydrophilic solvent such as an aqueous solution of an organic acid (e.g., acetic acid, oxalic acid, etc.), and combinations thereof, may be used. As the reaction field solution, preparing the reaction solution in advance in the reaction field is effective for efficiently promoting the synthesis reaction of the M-ferrite nanopowder. If the pH is less than −1, the material providing the reaction field is restricted, and avoidable impurities may become mixed in the solution. Therefore, it is desirable to control the pH to between −1 or more and less than 7. To increase the reaction efficiency in the reaction field and minimize elution and precipitation of unnecessary impurities, a particularly preferable pH range is 0 or more and less than 7. As a pH range that provides a good balance between reaction efficiency and yield, the pH is more preferably 1 or more and less than 6.5. Although hydrophilic solvents among organic solvents and the like can be used as the solvent in the reaction field, it is preferable that water is contained so that the inorganic salt can be sufficiently ionized.

The reaction solution may be a solution of an inorganic salt in water as a main component, such as a chloride such as iron chloride or M component chloride, a nitrate such as iron nitrate, or a nitrite, a sulfate, a phosphate, or a fluoride containing an Fe component and/or a M component (optionally also containing a TM component). In some cases, a solution mainly comprising a hydrophilic solvent, such as organic acid salt in water may also be used as required. Also, a combination thereof may be used. However, it is essential that reaction solution contain iron ions and M component ions. Regarding the iron ions, the reaction solution may contain only divalent iron ($Fe^{2+}$) ions, a mixture with trivalent iron ($Fe^{3+}$) ions, or only trivalent iron ions. In the case of containing only $Fe^{3+}$ ions, it is necessary to contain metal ions of the M component element that are divalent or less. The valence of the M component ion in the reaction solution is typically monovalent, divalent, trivalent, tetravalent, pentavalent, or hexavalent, and the ion that is divalent or more and a hexavalent or less is particularly excellent in terms of the homogeneity of the reaction in the reaction solution or the reaction field solution.

As the aqueous solution of the M component chloride (a substance in which the M component is combined with chlorine, which may contain water molecules as a hydrate such as $CrCl_3$), a commercial product that has been previously made into an aqueous solution may be used. When preparing the aqueous solution from a solid or stock solution to obtain the aqueous solution with an arbitrary concentration, it is recommended to perform mixing while cooling the solution with ice cooling or the like because there is a risk of explosive reaction when dissolved in water. Further, it is desirable to handle the aqueous solution in a glove box with a reduced oxygen concentration since the aqueous solution emits hydrogen chloride when exposed to the atmosphere. Further, when the aqueous solution is made acidic with hydrochloric acid or concentrated hydrochloric acid is used, it is possible to obtain transparent aqueous solution although there is some coloring without precipitation of the M component chloride, oxychloride, and the like or remaining of insoluble components.

Examples of the pH adjusting solution include an alkaline solution such as sodium hydroxide, potassium hydroxide, sodium carbonate, sodium hydrogencarbonate, and ammonium hydroxide, an acidic solution such as hydrochloric acid, and combinations thereof. It is also possible to use a pH buffer such as an acetic acid-sodium acetate mixed solution, or to add a chelate compound or the like.

Although the oxidizing agent is not indispensable, it is an essential component when only $Fe^{2+}$ ions are contained as Fe ions in the reaction field solution or the reaction solution. Examples of the oxidizing agent include nitrites, nitrates, hydrogen peroxide, chlorates, perchloric acid, hypochlorous acid, bromates, organic peroxides, dissolved oxygen water, and the like, and combinations thereof. Stirring in air or in an atmosphere having a controlled oxygen concentration is effective in maintaining a situation in which dissolved oxygen acting as an oxidizing agent is continuously supplied to the M-ferrite nanoparticle reaction field, and to control the reaction. Further, by continuously or temporarily introducing an inert gas such as nitrogen gas or argon gas by bubbling into the reaction field, for example, to limit the oxidizing action of oxygen, the reaction can be stably controlled without inhibiting the effect of other oxidizing agents.

In a typical M-ferrite nanopowder production method, formation of the M-ferrite nanoparticles proceeds by the following reaction mechanism. The nuclei of the M-ferrite nanoparticles are produced in the reaction solution directly or via an intermediate product such as green rust. The reaction solution contains $Fe^{2+}$ ions, which are adsorbed on powder nuclei already formed or on OH groups on the powder surface that have grown to a certain extent, thereby releasing $H^+$. Subsequently, when an oxidation reaction is performed by oxygen in the air, an oxidizing agent, an anode current ($e^+$), or the like, a part of the adsorbed $Fe^{2+}$ ions is oxidized to $Fe^{3+}$ ions. While the $Fe^{2+}$ ions, or the $Fe^{2+}$ and the $M^{3+}$ ions (or mixed valence ions including $M^{2+}$ ions, $M^{4+}$ ions, $M^{5+}$ ions, $M^{6+}$ ions, and $M^{3+}$ ions), in the solution are again adsorbed on the already adsorbed metal ions, $H^+$ ions are released in conjunction with hydrolysis, whereby a ferrite phase having a spinel structure is formed. Since OH groups are present on the surface of the ferrite phase, metal ions are again adsorbed and the same process is repeated to thereby grow into M-ferrite nanoparticles.

Among these reaction mechanisms, to directly change from $Fe^{2+}$ and $M^{3+}$ to the ferrite having a spinel structure, the reaction system may be, while adjusting the pH and the redox potential so as to cross the line dividing the $Fe^{2+}$ ions and ferrite on the equilibrium curve in the pH-potential diagram of Fe, (slowly) shifted from the stable region of $Fe^{2+}$ ions to the region where ferrite precipitates. In the case of using $M^{3+}$, for example, except for special cases, a trivalent state is formed from the early stage of the reaction, and there is almost no influence on redox potential change. In many cases, reactions due to a change in the redox potential of Fe (i.e., progress from the mixed solution to the ferrite solid phase) are described. When ions of the M component element of other valences are contained and the oxidation number of those ions changes and participates in the reaction, the same argument can be made by using or predicting a pH-potential diagram corresponding to the composition and the temperature. Therefore, it is desirable to produce a ferrite phase while appropriately adjusting conditions such as the kind, concentration, and addition method of the pH adjusting agent and the oxidizing agent.

In most generally well-known ferrite nanopowder production methods, the reaction solution is adjusted on the acidic side, the alkali solution is added in one go to set the reaction field to a basic region, and fine particles are instantaneously formed by coprecipitation. In the case of producing the M-ferrite nanopowder, it may be thought that consideration is given such that differences in the solubility product between the Fe component and the M component do not cause non-uniformity. Of course, the ferrite nanopowder may be prepared by such a method and very small nanoparticles can be prepared, and hence such a ferrite nanopowder can be used as the ferrite raw material for the magnetic material of the present invention.

On the other hand, in the embodiment of the present invention, a step is designed such that, while dropping the reaction solution and supplying the raw materials for the M-ferrite nanopowder production method to the reaction field, the M component is steadily incorporated into the Fe-ferrite structure by dropping the pH adjusting agent at the same time to gradually change the pH from acidic to basic. According to this step, at the stage of producing the M-ferrite nanoparticles, the $H^+$ released when ferrite is produced by the above-described mechanism is neutralized by the continuous introduction of the pH adjusting solution into the reaction field, and M-ferrite particles are produced and grow one after another. Further, at the early stage of the reaction, there is a period in which green rust is produced and the reaction field becomes green (depending on conditions such as the reaction field and the pH of the reaction solution, a period during which the reaction field becomes yellow and yellow-green appears in the first stage). However, it is important that the M component is mixed into this green rust. When the green rust has finally been converted into ferrite, the M component is incorporated into the lattice, and in the subsequent reduction reaction, in the first phase and the second phase, the M component is incorporated into the α-Fe phase having the bcc structure.

In addition to the above, other factors for controlling the reaction include stirring and reaction temperature.

Dispersion is very important to prevent the fine particles produced by the M-ferrite nanopowder synthesis reaction from agglomerating and inhibiting a homogeneous reaction. To carry out such dispersion, any known method, or a combination thereof, may be used in accordance with the purpose of controlling the reaction, such as a method in which the reaction is subjected to excitation while simultaneously dispersing by ultrasonic waves, a method in which a dispersion solution is conveyed and circulated by a pump, a method of simply stirring by a stirring spring or a rotating drum, and a method of shaking or vibrating with an actuator or the like.

Generally, since the reaction in the M-ferrite nanopowder production method used in the present invention is carried out in the presence of water, as the reaction temperature, a temperature between the freezing point and the boiling point of water under atmospheric pressure, namely, from 0° C. to 100° C., is selected.

In the present invention, a material produced from a method (e.g., a supercritical reaction method) for synthesizing M-ferrite nanopowder in a temperature range exceeding 100° C. by placing the entire system under high pressure may be, as long as M-ferrite nanopowder exhibiting the effects of the present invention can be formed, considered to be the magnetic material of the present invention.

As a method for exciting the reaction, in addition to the above-described temperature and ultrasonic waves, pressure and photo excitation may also be effective.

Further, in the present invention, when applying a M-ferrite nanopowder production method using an aqueous solution containing $Fe^{2+}$ as the reaction solution (particularly when reacting the M-ferrite nanoparticle under conditions in which the Fe is mixed as a divalent ion), if the M component content is less than 40 atom %, it is important that divalent ions of Fe are observed in the finally formed ferrite coating layer of the magnetic material of the present invention. The amount of the divalent ions is, in terms of the ratio of $Fe^{2+}/Fe^{3+}$, preferably 0.001 or more. It is preferable to identify the divalent ions by using an electron beam microanalyzer (EPMA). Specifically, the surface of the M-ferrite nanoparticles is analyzed by the EPMA to obtain an X-ray spectrum of $FeL_\alpha$-$FeL_\beta$, the difference between the two materials is taken, and the amount of $Fe^{2+}$ ions in the M-ferrite nanoparticles can be identified by comparing with the spectrum of a standard sample of an iron oxide containing $Fe^{2+}$ (e.g., magnetite) and an iron oxide containing only $Fe^{3+}$ (e.g., hematite or maghemite).

At this time, the EPMA measurement conditions are an acceleration voltage of 7 kV, a measurement diameter of 50 μm, a beam current of 30 nA, and a measurement time of 1 sec/step.

Examples of representative impurity phases of the M-ferrite nanopowder include oxides such as M-hematite, iron oxide hydroxides such as goethite, acagenite, lepidocrocite, feroxyhyte, ferrihydrite, and green rust, hydroxides such as potassium hydroxide and sodium hydroxide. Among these, particularly when containing a ferrihydrite phase and an M-hematite phase, since these form an α-(Fe,M) phase and other second phases after reduction, it is not always necessary to remove them. These ferrihydrite and M-hematite phases are observed in SEM observation and the like as a sheet-like structures having a thickness of several nm. However, since the particles have a large area relative to their thickness, these phases may promote large improper grain growth in the reduction reaction process, and since they also contain many impurities other than the Fe component, the M component, and oxygen, it is desirable that the volume fraction of these phases is less than that of the M-ferrite nanopowder. In particular, when the atomic ratio of the M-component relative to the Fe component is more than 0.33 and 0.5 or less, the M component ratio of the phases other than the M-ferrite nanopowder centered on ferrihydrite and M-hematite becomes larger than that of the M-ferrite nanopowder, and as a result, the disproportionation that occurs during reduction becomes difficult to control. Therefore, it is desirable to give careful attention to the degree of agglomeration such as a ferrihydrite phase (in particular, to prevent uneven distribution up to several microns). It should be noted that, irrespective of the above, the ferrihydrite phase and M-ferrite phase, which easily incorporate the M component, can be caused to coexist so as to prevent the above-described inappropriate minor phases that do not contain the M component from precipitating by intentionally limiting the content of these phases based on the whole magnetic material to a range from 0.01% by volume to 33% by volume. When doing this, it is not necessary to strictly maintain the control conditions during production of the ferrite nanopowder, and hence the industrial benefits are large.

The average powder particle diameter of the M-ferrite nanopowder used as a raw material of the present invention is preferably 1 nm or more and less than 1 μm (1000 nm). It is more preferably 1 nm or more and 100 nm or less. If this average powder particle diameter is less than 1 nm, the reaction during reduction cannot be sufficiently controlled, resulting in poor reproducibility. If this average powder particle diameter exceeds 100 nm, the improper grain growth of the metal component reduced in the reduction step is substantial, and the coercive force may increase in the case of the soft magnetic material, and thus, the average powder particle diameter is preferably 100 nm or less. Further, if the average powder particle diameter is 1 μm or more, the α-Fe phase separates, M is not incorporated into this phase, and a magnetic material being poor in terms of the excellent electromagnetic properties and oxidation resistance provided by the present invention may be only obtained, and thus, the average powder particle diameter is preferably less than 1 μm.

When the M ferrite nanopowder used in the present invention is produced mainly in an aqueous solution, moisture is removed by decantation, centrifugation, filtration (in particular, suction filtration), membrane separation, distillation, vaporization, organic solvent exchange, solution separation by magnetic field recovery of the powder, or a combination thereof, and so on. The M ferrite nanopowder is then vacuum dried at ordinary temperature or a high temperature of 300° C. or lower, or dried in air. The M ferrite nanopowder may also be hot-air dried in air or dried by heat treating in an inert gas such as argon gas, helium gas, or nitrogen gas (in the present invention, the nitrogen gas may not be an inert gas depending on the temperature range during heat treatment), or a reducing gas such as hydrogen gas, or a mixed thereof. Examples of a drying method that removes unnecessary components in the solution but does not use a heat source at all include a method in which, after the centrifugation, the supernatant is discarded, the M-ferrite nanopowder is further dispersed in purified water, centrifugation is repeated, and finally the solvent is exchanged with a hydrophilic organic solvent having a low boiling point and a high vapor pressure, such as ethanol, and then vacuum-dried under ordinary temperature.

(2) Reduction Step (in the Present Application, Also Referred to as "Step (2)")

This step is a step in which the M-ferrite nanopowder produced by the above method is reduced to produce the magnetic material of the present invention. In this reduction step, the homogeneous cobalt ferrite nanopowder causes the disproportionation reaction, and the magnetic material of the present invention is separated into the first phase and the second phase.

Reducing in a gas phase is the most preferred method. Examples of the reducing atmosphere include hydrogen gas, carbon monoxide gas, ammonia gas, and an organic compound gas such as formic acid gas, a mixed gas of their gases and an inert gas such as argon gas and helium gas, a low-temperature hydrogen plasma, supercooled atomic hydrogen, and the like. Examples of methods for carrying out the reduction step include a method in which these gases can be circulated in a horizontal or vertical tube furnace, a rotary reaction furnace, a closed reaction furnace, or the like, refluxed, hermetically closed, and heated with a heater, and methods in which heating is carried out by infrared rays, microwaves, laser light, and the like. The reaction may also be carried out in a continuous manner using a fluidized bed. Further, the reduction method such as the method for reducing with solid C (carbon) or Ca, the method for mixing with calcium chloride or the like, the method for reducing in an inert gas or a reducing gas, and as an industrial method, the method for reducing with Mg after once chloridizing the M component oxide, may be used. As long as the magnetic material of the present invention is obtained, any method falls within the scope of the production method of the present invention.

However, a preferred method for the production method of the present invention is a method in which the reduction is carried out in hydrogen gas or a mixed gas of hydrogen gas and an inert gas as the reducing gas. To produce the magnetic material of the present invention phase-separated at the nano-scale, the reducing power is too strong by reducing with C or Ca, and it becomes very difficult to control the reaction for forming the soft magnetic material of the present invention. Further, there are problems such as generation of toxic CO after reduction and mixing of calcium oxide, which must be removed by washing with water. However, by reducing in hydrogen gas, the reduction treatment can be carried out under consistently clean conditions.

However, from a thermodynamic point of view, the Fe oxide is reduced in the $H_2$ gas flow assuming from the Ellingham diagram, but it is understood that the M component oxide is not always easily reduced by $H_2$ gas except for Cu. For example, at 1000° C., an $H_2/H_2O$ ratio when reduced from magnetite to metallic iron is almost 1 in the case of Fe, but is about $10^5$ to $10^6$ in the case of $SiO_2$, and it is understood that the Si oxide is unlikely to be almost reduced even if the $H_2$ gas is flowing. Therefore, it should be normally considered that a simple mixture or solid solution of Fe oxide and Si oxide becomes α-Fe and $SiO_2$ by hydrogen reduction.

Accordingly, it is considered that the fact that M ions in the M-ferrite are reduced to the valence of the M-component metal when M-ferrite is reduced in the hydrogen gas excluding Cu was not known until now, and is believed to have been first discovered by the inventor. The reasons for this are, currently, considered to be as follows.

The M-ferrite of the present invention has a diameter of 1 nm or more and less than 1000 nm (1 μm), and the M component is atomically dispersed in a highly active nanopowder, and the affinity between M and Fe is high. As a result, the M-ferrite is alloyed as α-(Fe,M) under a hydrogen gas flow. Since the reactivity of the powder in the nano region is high, and the atmosphere of the redox is the nanoscale, results beyond the common technical knowledge of the metallographic field are obtained contrary to typical thermodynamic expectations that often characterize macroscopic properties. Conventionally, M oxides, such as Si and V, cannot be essentially reduced unless in the presence of Ca, C, or the like, but according to the method of the present invention, a part of the M component is reduced to its metallic state and can be present as an alloy in the first phase or the α-(Fe,M) phase of the first phase and the second phase. At this time, the inventors infer that the facilitation of the reaction is affected by the coexistence of a small amount of an alkali metal such as K.

Further, in general, the solid solution limit of M in the α-(Fe,M) phase increases as the temperature increases in a Fe—M component equilibrium state diagram, but it is difficult to say that the average M component content in the α-(Fe,M) phase always increases as the reduction temperature increases in the production method of the present invention. This depends on the kind and content of the M component in the whole M-ferrite nanopowder, the setting of temperature increase/decrease conditions, and the kind of the coexisting second phase or minor phase. Further, the above-described phenomenon is one of the characteristics of the production method of the present invention, referred to as "build-up type", having a step of reducing the M-ferrite nanopowder to cause grain growth, and subsequently preferably sintering the powder, which is different from an ordinary metallic magnetic material production technique in which the entire alloy is melted once.

The oxygen content in the material of the present invention is generally determined by an inert gas melting method, but when the oxygen content before reduction is known, the oxygen content in the material of the present invention can also be estimated from the weight difference before and after reduction. However, when there is simultaneously a large amount of a halogen element, such as chlorine, whose content tends to change before and after reduction, and an alkali element such as K or Na or a highly volatile component such as water or an organic component contained in the material, the content of each of these elements and components should be individually identified in terms of strictly estimating the oxygen content.

Incidentally, among alkali metals derived from the raw materials, for example, K begins to dissipate from the magnetic material at 450° C. due to vaporization, and most of it is removed at 900° C. or above although being affected by the kind or content of the M component and reduction time. Therefore, in the case of an alkali metal derived from the raw materials for which it is better to keep around in the early stage of the reduction reaction in order to utilize its catalytic action, but depending on the application is preferably not present at the product stage, that alkali metal can be ultimately appropriately removed to an acceptable range by appropriately selecting the reduction conditions. The final content range of the alkali metal such as K that can be easily removed while having a positive effect on reduction is a lower limit value of 0.0001 atom % or more and an upper limit value of 5 atom % or less. This upper limit value can be further controlled to 1 atom % or less, and when most precisely controlled, to 0.01 atom %. Of course, based on the reduction conditions, it is also possible to reduce the alkali metal such as K further below the detection limit. Halogen elements such as Cl (chlorine) remaining in the M-ferrite nanopowder are mainly released outside the material system as hydrogen halides such as HCl under the reducing atmosphere. The amount of remaining Cl and the like starts to substantially decrease at a reduction temperature of 450° C. or higher, and although it depends on contents of the M component and K and the content change thereof during the reduction step, if a reduction temperature of approximately 700° C. or higher is selected, almost all of those halogen elements can be completely removed from inside the material.

The weight reduction before and after the reduction reaction of the present invention, which is mainly due to the O component being converted into $H_2O$ and evaporating depends on the kind and content of the M component, the TM component content, the oxygen amount, the minor phase content, the impurity content, amount of volatilized components such as water, the reducing reaction conditions such as the reducing gas species, and the like, but is usually between 0.1% by mass to 80% by mass based on the weight before the reduction reaction of 100% by mass.

Incidentally, as described in some of the Examples of the present invention, a local oxygen content may be determined based on a photograph from an SEM and the like or by EDX, and a phase identified by XRD or the like may be specified on an image obtained by a microscopic observation such as the SEM. This method is suitable for estimating the oxygen content and its distribution in each phase of the first phase and the second phase.

Hereinafter, a method for producing the magnetic material of the present invention by a heat treatment in a reducing gas is described in detail. The heat treatment in a typical reduction step is carried out by increasing the temperature of the material linearly or exponentially from room temperature to a constant temperature in a reducing gas flow at one or more temperature increasing rates, and then immediately decreasing the temperature linearly or exponentially to room temperature using one or more temperature decreasing rates, or maintaining the temperature for a fixed period (=reduction time) when increasing or decreasing the temperature during the temperature increasing/decreasing process or after the temperature has been increased (hereinafter, referred to as "constant temperature holding process). Unless stated otherwise, the reduction temperature of the present invention refers to the highest temperature among the temperature at the time of switching from the temperature increasing process to the temperature decreasing process and the temperature during the process of maintaining the temperature for a fixed period.

As a method for producing the soft magnetic material of the present invention, when the method of reducing M-ferrite in the hydrogen gas is selected, it is preferable to select a temperature range in which a reduction temperature is generally 400° C. or higher and 1500° C. or lower although being affected by the kind of the M component and the content of the TM component.

However, when performing the reduction at 419° C. or higher, the magnetic material being reduced may be dissolved depending on the content of the M component. In general, if the M component content is in the region of 0.01 atom % or more and 33 atom % or less, the reduction treatment can be performed by freely selecting a temperature from the temperature range of 400° C. or higher and 1500° C. or lower. In general, the temperature of 400° C. or higher is preferable since it is possible to avoid a state where the reduction rate is extremely slow, the reduction time is prolonged, and productivity deteriorates.

In the method for producing the soft magnetic material of the present invention, a preferable range of the reduction temperature is 400° C. or higher and 1500° C. or lower, and a more preferable range of the reduction temperature is 800° C. or higher and 1200° C. or lower. This is because it is possible to avoid coarsening of the structure due to the reduction reaction immediately below the melting point of the magnetic material of the present invention when the M component is reduced to metal, a reaction with a reactor such as a ceramic container, or a decrease in productivity caused by a decrease in reduction reaction speed due to a low temperature.

When reduction is performed at the same temperature, the reduction reaction progresses as the reduction time increases. Therefore, the saturation magnetization increases as the reduction time is longer, but for coercive force, even if the reduction time is increased or the reduction temperature is increased, the coercive force does not necessarily decrease. It is desirable to appropriately select the reduction time according to the desired magnetic properties.

As a method for producing the semi-hard magnetic material of the present invention, when the method of reducing M-ferrite in the hydrogen gas is selected, it is preferable to select a reduction temperature generally in the range of 400° C. or higher and 1500° C. or lower although being affected by the kind and content of the M component. The reason is that the reduction rate is extremely slow, and the reduction time is prolonged, and the productivity becomes poor at the temperature lower than 400° C. Conversely, if the temperature exceeds 1500° C., there is a risk that the melting of Fe starts so that the characteristics of the nanocrystal of the present invention may be hindered, and the coercive force cannot be properly controlled. A more preferable range of the reduction temperature is about 450° C. or higher and 850° C. or lower, and a particularly preferable range is about 500° C. or higher and 700° C. or lower.

As described above, when the soft magnetic or semi-hard magnetic material of the present invention is produced by the method of reducing M-ferrite in the hydrogen gas, the reduction temperature range is preferably 400° C. or higher and 1500° C. or lower.

When the magnetic material of the present invention contains an M component other than Cu, ta reduction rate is extremely slow as compared with Fe-ferrite, for example, an intermediate between magnetite and maghemite (see Patent Document 3 and Non-Patent Document 3). For example, Fe-ferrite, which does not contain an M component having an average powder particle diameter of 100 nm or less, is reduced to α-Fe almost 100% by volume by simply performing reduction in hydrogen at 450° C. for 1 hour. Even under the condition of 425° C. for 4 hours, Fe-ferrite is reduced to such an extent that Fe-ferrite is not observed even by X-ray diffraction. On the other hand, for example, even if Hf is only contained at 10 atom %, the M-ferrite phase does not disappear unless the reduction condition is set to 550° C. for 1 hour, and only the α-(Fe,M) phase is not observed on the XRD.

In the magnetic material of the present invention, due to such a slow reduction rate of the M-ferrite, reduction at a high temperature is permitted. The nano-microstructure still containing M in the α-Fe phase does not become extremely coarse, and can be formed into an aggregate of microcrystalline structures including the first phase and the second phase by a disproportionation reaction.

It is desirable that the magnetic material of the present invention is separated into the first phase and the second phase at the nanoscale in the reduction step during production of the magnetic material. Particularly in the case of the soft magnetic material of the present invention, it is necessary for the phases having the various M component contents and crystal structures to be separated by the disproportionation reaction, and for the orientation of those phases to be random or for the phases to include concentration fluctuations in the M component content at the nanoscale.

Further, it is also necessary for each of the crystalline phases to be ferromagnetically coupled.

The grains of the M-ferrite nanoparticles grow as reduction progresses. However, during that process, the crystal structures and the M component contents of the first phase and the second phase, which are the formed crystalline phases, change in various ways depending on the reduction temperature due to the kind and content of the M component of the original M-ferrite nanoparticles. In the temperature range of 400° C. or higher and 1500° C. or lower, the M component content in the first phase generally increases as the temperature at which the material is reduced to metal phase becomes higher.

Therefore, the composition of the crystalline phases changes depending on the rate of temperature increase during the increasing temperature process and the temperature distribution in the reaction furnace.

Figure 2:
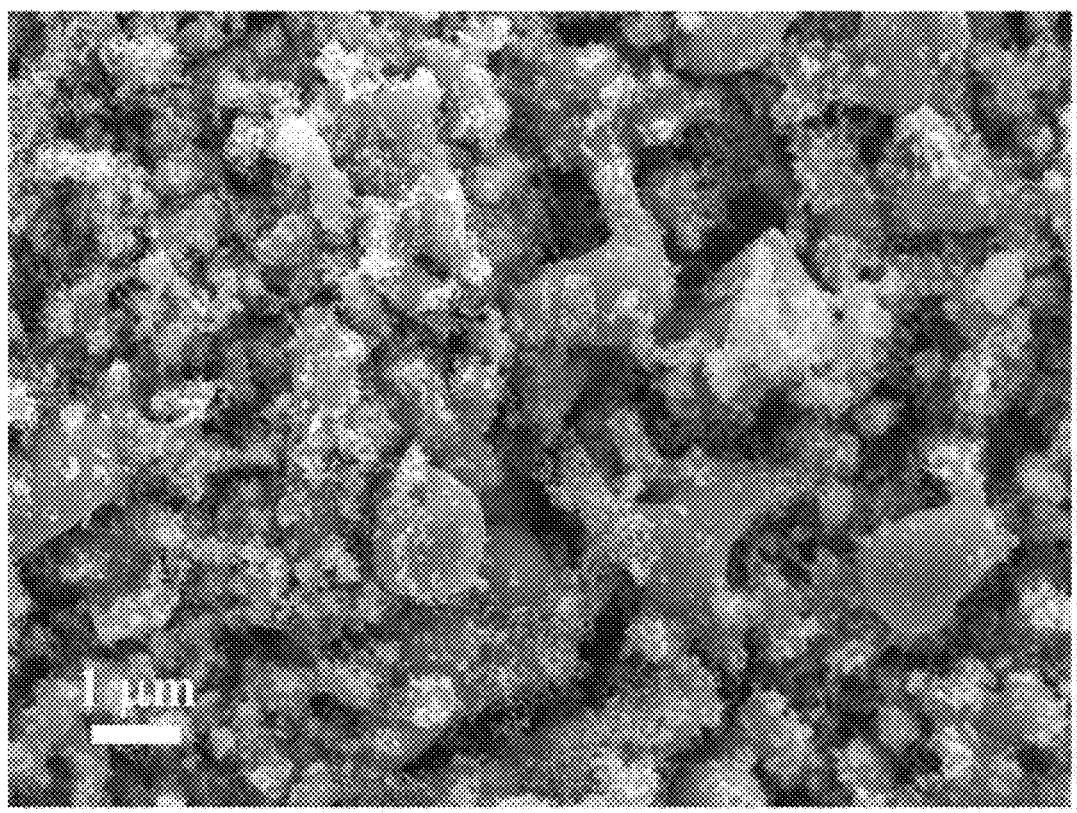
FIG. 2 is an SEM image of a $Fe_{98.8}Hf_{1.2}$ magnetic material (Example 15) (a particle having a size of 10 nm or less in the image is an Hf-enriched spawn phase).

In the initial stage of the reduction reaction, for example, when Hf-ferrite nanopowder having a Hf content of about 10 atom % and an average powder particle diameter of 100 nm or less is reduced in a hydrogen flow at 1100° C. or less for 1 hour, first, an α-(Fe,Hf) phase and a Hf-enriched phase of several nm begin to appear in the Hf-ferrite (this is described when the M component is, for example, Hf, the material, of course, belongs to the category of M-ferrite). Since the Hf-enriched phase is densely present between the α-(Fe,Hf) phase particles like fish eggs, this phase is called a spawn phase (see FIG. 2). An XRD peak corresponding to this phase is not detected, and it is assumed that it is an amorphized phase or a phase in which lattice has considerably collapsed. However, it can be confirmed by EDX that Hf is significantly more enriched compared with the α-(Fe, Hf) phase (e.g., when the Hf content of the raw material Hf-ferrite nanopowder is 12 atom %, this phase is enriched by about 20 atom % of Hf). This is considered to be because not all of Hf could dissolve in solid solution in the α-(Fe,Hf) phase but Hf was precipitated as the Hf-enriched phase during the reduction of that phase to the α-(Fe,Hf) phase due to the Hf content of the Hf-ferrite nanopowder. When the reduction is completed in this state, the second phase of the magnetic material of the present invention is Hf-ferrite and this spawn phase. In regions where the spawn phase is present, the coercive force is high in a powder state, and the material can be suitably used as the semi-hard magnetic material of the present invention. This is not the case when the material is turned into a solid magnetic material by sintering or the like.

Meanwhile, according to a Fe—Hf equilibrium state diagram, Hf can dissolve in solid solution in the α-Fe phase to some extent at around 1100° C., but Hf hardly dissolves in solid solution in the α-Fe phase at room temperature. The Hf content in the α-(Fe,Hf) phase of the magnetic material of the present invention can be present far beyond this solid solution source having the equilibrium composition, but these are naturally non-equilibrium phases. If it were possible to perform the operation of decreasing the temperature from the reduction temperature to room temperature over infinite time (the temperature decrease rate is infinitely slow), almost none of Hf would coexist in the α-Fe phase. Conversely, if it were possible to perform the operation of decreasing the temperature at an infinitely high rate from around 1100° C. (the temperature decrease rate is infinitely fast), α-(Fe,Hf) phases having various Hf contents due to a disproportionation reaction do not separate from the α-(Fe, Hf) phase even if an α-(Fe,Hf) phase having a Hf content of several atom % were present at the reduction temperature. Therefore, it is difficult to form the soft magnetic material of the present invention by the production methods for having any of the above limits. That is, the microstructure of the soft magnetic material of the present invention is controlled by appropriately selecting a temperature decrease rate that is not close to the above limits (is not super gradual cooling or rapid quenching).

However, the magnetic material of the present invention has the microstructure that is completely different from existing materials in bulk, and does not have a composition distribution that follows the equilibrium state diagram at room temperature. However, near the reduction temperature, homogeneous phases in accordance with the equilibrium state diagram spreading across the nano region in the magnetic material of the present invention may occur. In such cases, the control of the temperature increase/decrease rate including the temperature increasing process is important for the microstructure. From this point of view, it is desirable to appropriately select the temperature increase/decrease rate in the reduction step of the present invention generally between 0.1° C./min to 5000° C./min although the optimum conditions differ depending on intended electromagnetic properties and M component content.

In particular, when the M component content is more than 20 atom % in the case of producing the soft magnetic material of the present invention, it is preferable to set the temperature increase/decrease rate to 1° C./min to 500° C./min since the soft magnetic material having the low coercive force can be prepared.

In the reduction reaction using the hydrogen gas as described above, the phase separation process caused by the "disproportionation" reaction is extremely diversified depending on the kind of the M component and the conditions of the reduction step.

Figure 3:
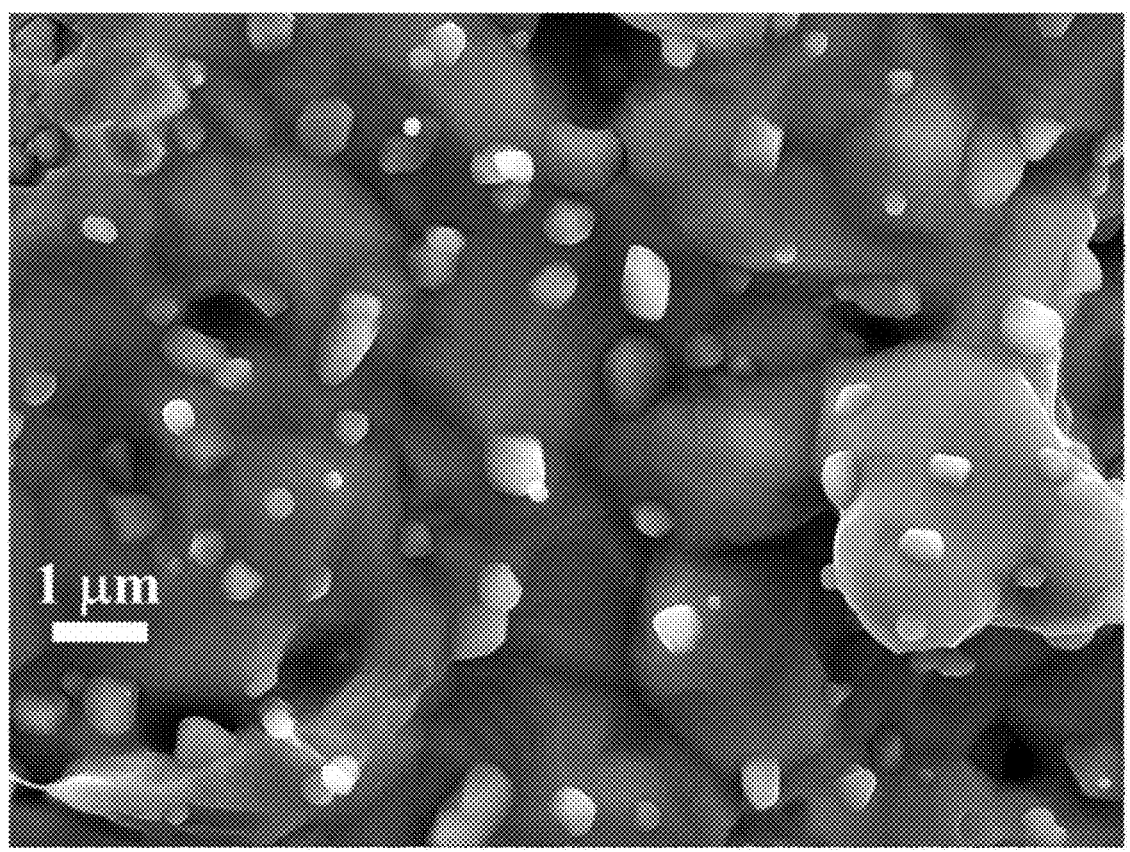
FIG. 3 is an SEM image of a $Fe_{99.0}Nb_{1.0}$ soft magnetic material (Example 25).

A case where the M component is Nb will be described below. FIG. 3 shows an SEM observation image of reduced powders when Nb-ferrite nanopowders with an Nb content of 1 atom % and an average powder particle diameter of 100 nm or less is reduced in a hydrogen flow at 1100° C. or lower for 1 hour. In FIG. 3, it is possible to observe a structure in which a number of phases having an Nb content ranging from 4.0 atom % to 11 atom % are separated from particles having an Nb content of 0.6 atom % or less to protrude like potato eyes. There are also places where about 2 atom % of eyes occur from the potato eyes.

The magnetic material of the present invention may contain the M-component oxide phase as the second phase, and the presence of this phase at the grain boundaries and the powder particle surface exerts a strong oxygen barrier effect, which greatly contributes to the improvement in oxidation resistance of the magnetic material of the present invention. Particularly, in the semi-hard magnetic material of the present invention, not only the effect of the oxidation resistance is remarkable, but also the effect of improving the coercive force is exhibited.

In the present invention, the reason why appropriate grain growth occurs while maintaining a nano-microstructure even in a high temperature region exceeding 800° C., for example, is unknown. However, the raw material is an M-ferrite nanopowder, and even if this is reduced by hydrogen to a metallic state like the first phase, as long as appropriate reduction conditions are selected, the original grain shape and composition distribution are not reflected whatsoever in the microstructure, the structure has a uniform composition distribution, and there is no improper grain growth like a coarsening of the crystal grain size. Since this grain growth occurs together with the reduction reaction, and considering that the volume reduction due to reduction is up to 52% by volume, it can be easily inferred that disproportionation progresses while leaving structures similar to intergrowths and skeleton crystals. Further, it is also thought that, while the difference in reduction rates of the phases separated by disproportionation at the initial stage of the reduction reaction is also involved, nanoscale very fine disproportionated structures are ultimately formed as a whole due to the phase separation caused by the disproportionation reaction during the temperature decreasing process mainly occurring in the α-(Fe,M) phase, causing nanoparticles and nanostructures to precipitate even from the high-temperature phases homogenized to a certain extent, which have a size in the nano region while maintaining their nano-microstructure.

It is known that in the oxide phase containing the M component, such as the M-ferrite phase the reduction rate tends to be slower as the M component content is higher, and hence it is considered that once disproportionation occurs, the fact that the reduction reaction rate becomes uneven within the material acts in a beneficial manner to maintain the nanostructure.

The above series of observations is also supported by the fact that the magnetic material of the present invention generally loses its characteristics if it melts.

(3) Gradual Oxidation Step (in the Present Application, Also Referred to as "Step (3)")

Since the magnetic material of the present invention after the reduction step contains nano metal particles, there is a possibility that the material may spontaneously ignite and combust if directly exposed to the air. Therefore, although it is not an essential step, it is preferable to subject the magnetic material of the present invention to a gradual oxidation treatment immediately after the reduction reaction is finished, as necessary.

The gradual oxidation refers to suppressing rapid oxidation of the main body of the interior magnetic material mainly by oxidizing the surface of the reduced nano metal particles to passivate as wustite, magnetite, M-ferrite, an M-component oxide phase, or the like. According to the production method of the present invention, the M component is included as a metal component in the first phase, or in the first phase and the second phase up to the reduction step.

In the magnetic material of the present invention, this M component is precipitated on the surface of the alloy by the gradual oxidation step to form a passivated film, thereby obtaining the remarkable oxidation resistance as compared with an Fe magnetic material not containing the M component. The gradual oxidation is carried out, for example, in a gas containing an oxygen source, such as oxygen gas, in the vicinity of ordinary temperature to 500° C. or lower, but in many cases a mixed gas containing an inert gas with an oxygen partial pressure lower than atmospheric pressure is used. If the temperature exceeds 500° C., it becomes difficult to control and provide a thin oxide film of a few nm on the surface, no matter which low oxygen partial pressure gas is used. There is also a gradual oxidation method in which a vacuum is produced in a reactor, and then gradually released at ordinary temperature to increase the oxygen concentration so that the reactor is not abruptly brought into contact with the air.

In the present application, a step including the above operations is referred to as the "gradual oxidation step". Through this step, handling in the next step, namely, the molding step, becomes very simple.

Examples of a method for again removing the oxide film after this step include a method in which the molding step is carried out under a reducing atmosphere, such as hydrogen gas. However, since the surface oxidation reaction in the gradual oxidation step is not a completely reversible reaction, it is impossible to remove all of the surface oxide film.

Of course, when the handling from the reduction step to the molding step is carried out by an apparatus devised so that it can be operated in an oxygen-free state like a glove box, this gradual oxidation step is unnecessary.

Further, in the case of the magnetic material powder of the present invention, which has a large M component content, a sufficiently high reduction temperature and sufficiently long reduction time, and has undergone grain growth, even if this magnetic material is exposed to the air without being subjected to this gradual oxidation step, stable passivated films may be formed, and in such a case, a special gradual oxidation step is not required. In that case, exposing the magnetic material to the air can per se be regarded as a gradual oxidation step.

When oxidation resistance and magnetic stability are secured by gradual oxidation, ferromagnetic coupling may be broken by the oxide layer or the layer of the passivated film, and hence it is preferable to perform the gradual oxidation after grain growth has occurred as much as possible. Otherwise, as described above, it is preferable to not carry out the gradual oxidation step, and carry out the next molding step. It is desirable to then continue the reduction step and the molding step by deoxidation or a low oxygen process.

(4) Molding Step (in the Present Application, Also Referred to as "Step (4)")

The magnetic material of the present invention is used as a magnetic material (i.e., a solid magnetic material) in which the first phase and the second phase are continuously bonded to each other directly or via a metal phase or an inorganic phase to form a massive state as a whole. The magnetic material powder of the present invention is used in various applications by solidifying the powder itself or by adding a metal binder, another magnetic material, a resin, or the like and molding. When the magnetic material powder is in the state after step (2), or further after step (3), the first phase and the second phase may have already been continuously bonded directly or via a metal phase or an inorganic phase. In this case, the magnetic material powder in that state functions as a solid magnetic material even without being subjected to the proper molding step.

As a method of solidifying only the magnetic material of the present invention, it is possible to use a method in which the magnetic material powder is placed in a mold, compacted in a cold state, and then used as it is, or the magnetic material powder may also be subjected to further cold rolling, forging, shock wave compression molding, and the like, and then molded. In many cases, the method is carried out by sintering the magnetic material powder while heat treating it at a temperature of 50° C. or higher. A method in which sintering is carried out without pressurization and just by heat treating is called pressureless sintering. The heat treatment atmosphere is preferably a non-oxidizing atmosphere, and it is desirable to perform the heat treatment in an inert gas, such as a rare gas like argon or helium or nitrogen gas, or in a reducing gas including hydrogen gas. The heat treatment can be carried out even in air if the temperature is 500° C. or lower. Further, like pressureless sintering, the sintering may be carried out in a heat treatment atmosphere that is at ordinary pressure, or in a pressurized heat treatment atmosphere of 200 MPa or less, or even in a vacuum.

Regarding the heat treatment temperature, in addition to ordinary temperature molding carried out at less than 50° C., the heat treatment temperature is preferably 50° C. or higher and 1500° C. or lower for pressure molding and 400° C. or higher and 1500° C. or lower for pressureless sintering. In general, the most preferable molding temperature range is 50° C. or higher and 1400° C. or lower since the material may melt at a temperature exceeding 1400° C.

This heat treatment can also be carried out simultaneously with the powder compacting. Further, the magnetic material of the present invention can be molded even by a pressure sintering method, such as hot pressing, HIP (hot isostatic pressing), electric current sintering, and SPS (spark plasma sintering). To make the pressurizing effect remarkable in the present invention, it is preferable that the pressurizing force in the heating and sintering step is within the range of 0.0001 GPa or more and 10 GPa or less. If the pressurizing force is less than 0.0001 GPa, the effect of pressurization is poor and there is no change in the electromagnetic properties from pressureless sintering. In such a case, pressure sintering is disadvantageous due to the resultant drop in productivity. If the pressurizing force exceeds 10 GPa, the beneficial limits of pressurizing are reached, and hence unnecessary pressurizing only results in a drop in productivity.

Further, strong pressurization imparts induced magnetic anisotropy to the magnetic material, and there is a possibility that the permeability and coercive force deviate from the ranges in which they are to be controlled. Therefore, the preferable range of the pressurizing force is 0.001 GPa or more and 2 GPa or less, and more preferably 0.01 GPa or more and 1 GPa or less.

Among hot pressing methods, an ultra-high-pressure HP method, in which a powder compacted molded body is prepared in a capsule that plastically deforms, and then hot pressed by heat treating while applying a strong pressure in one to three axis directions, is capable of inhibiting the entry of unwanted excess oxygen. This is because in such a method, unlike a hot pressing method in which the pressurized heat treatment is performed in a die made of cemented carbide or carbon using a uniaxial compressor, a pressure of 2 GPa or more, which is difficult even when using a tungsten carbide cemented carbide die, can be applied on the material without problems such as breaking the die, and the molding can be carried out without contact with the air because the interior of the capsule is hermetically sealed as a result of the plastic deformation by the pressure.

Prior to molding, to adjust the powder particle diameter, coarse pulverization, fine pulverization, or classification can be carried out by using a known method.

Coarse pulverization is a step carried out before molding when the reduced powder is a massive object of several mm or more, or is a step carried out when again pulverizing after molding. The coarse pulverization is carried out using a jaw crusher, a hammer, a stamp mill, a rotor mill, a pin mill, a coffee mill, and the like.

Further, after coarse pulverization, in order to further adjust the density and molding properties at the time of molding, it is also effective to adjust the particle diameter by using a sieve, a vibration classifier or sound classifier, a cyclone, and the like. Coarse pulverization and classification followed by annealing in an inert gas or hydrogen can eliminate structural defects and distortion, and in some cases may have an effect.

Fine pulverization is carried out when it is necessary to pulverize the reduced magnetic material powder or the molded magnetic material from a submicron size to a size of several tens of µm.

Examples of the fine pulverization method include, in addition to the methods described above for coarse pulverization, using a dry or a wet fine pulverizing apparatus such as a rotary ball mill, a vibration ball mill, a planetary ball mill, a wet mill, a jet mill, a cutter mill, a pin mill, and an automatic mortar, and combination thereof.

A typical example of the method for producing the solid magnetic material of the present invention is to produce an M-ferrite nanopowder by step (1), reduce the M-ferrite nanopowder by step (2), and then carry out step (3) followed by step (4), or perform molding only by step (4). A particularly preferable example of the production method is to prepare the M-ferrite nanopowder by the wet method exemplified in step (1), then reduce the M-ferrite nanopowder by a method including hydrogen gas described in step (2), gradually oxidize the reduced M-ferrite nanopowder to expose to a low oxygen partial pressure described in step (3) at ordinary temperature, mold by the sintering method at ordinary pressure or under pressure described in step (4), in particular remove the oxygen on the powder surface of the material in step (3), and then, as step (4), carry out molding in hydrogen to prevent any further oxygen from entering the material. The present solid magnetic material can be molded to a thickness of 0.5 mm or more, and can be worked into an arbitrary shape by cutting and/or plastic working.

When the magnetic material powder obtained by step (1)→step (2), or by step (1)→step (2)→step (3), or by step (1)→step (2)→step (5) (described later), or by step (1)→step (2)→step (3)→step (5) (described later), or the magnetic material powder obtained by re-pulverizing a magnetic material obtained by molding a magnetic material powder obtained by the above steps by step (4), or the magnetic material powder obtained by annealing a magnetic material powder obtained by the above steps in step (5) (described later), is applied in a composite material with a resin, such as a high frequency magnetic sheet, the magnetic material powder is molded by mixing with a thermosetting resin or a thermoplastic resin and then compression molded, or is kneaded together with a thermoplastic resin and then injection molded, or is extrusion molded, roll molded, calendar molded, or the like.

In the case of applying in an electromagnetic noise absorbing sheet, for example, examples of the type of sheet shape include a batch type sheet obtained by compression molding, various rolled sheets obtained by roll molding, calendar molding, and the like, and cut or molded sheets of various sizes, such as A4 plate, having a thickness of 5 μm or more and 10000 μm or less, a width of 5 mm or more and 5000 mm or less, and a length of 0.005 mm or more and 1000 mm or less.

(5) An Annealing Step.

The magnetic material of the present invention has a first phase and a second phase, and typically one or both of those phases have a crystal grain size in the nano region.

As long as the object of the present invention is not hindered, it may be preferable to carry out annealing for various purposes, such as for crystal distortions and defects that are produced in the various steps, stabilization of non-oxidized active phases, and the like.

For example, after the M-ferrite nanopowder production step (1), to carry out stable reduction simultaneously with drying for the purpose of removing volatile components such as moisture content, a so-called preliminary heat treatment (annealing) in which fine particle components of about several nm are heat treated may be carried out for the purposes of inhibiting improper grain growth and removing lattice defects in subsequent steps. In this case, it is preferable to perform the annealing in air, in an inert gas, or in a vacuum at about 50° C. to 500° C.

Further, the coercive force of the soft magnetic material of the present invention can be decreased by, after the reduction step (2), removing distortions and defects in the crystal lattice and microcrystals caused by the decrease in the volume due to grain growth and reduction. After this step, in applications in which the soft magnetic material of the present invention is used in powder form, for example, in applications such as powder magnetic cores used by hardening a powder with a resin, ceramic, or the like, electromagnetic properties may be improved by carrying out annealing under appropriate conditions after that step or after a pulverization step or the like that is carried out after this step.

Further, in the gradual oxidation step (3), annealing may be useful for removing distortions and defects caused by surface oxidation that are present near the surface, interfaces, and boundaries.

Annealing after the molding step (4) is most effective. The annealing step may be proactively carried out after preliminary molding, compression molding, hot pressing, and the like, or the subsequent cutting and/or plastic working to remove the distortions and defects in the crystal lattices and microstructure caused by those steps. In the annealing step, there is expected to be a dramatic decrease in the distortions, defects, and the like that have accumulated in the steps prior to that. Further, after the above-described cutting and/or plastic working steps, the distortions in steps (1) to (4), steps (2) to (4), steps (3) and (4), or step (4) may be annealed, or the distortions that have accumulated in those steps may be annealed collectively.

The annealing atmosphere may be any one of a vacuum, a reduced pressure, an ordinary pressure, or a pressurized atmosphere of 200 MPa or less. The gas species to be used may be an inert gas, typified by a rare gas such as argon, nitrogen gas, a reducing gas such as hydrogen gas, or an atmosphere containing an oxygen source such as air. The annealing temperature may be from ordinary temperature to 1500° C., and in some cases the treatment may be carried out at a low temperature from a liquid nitrogen temperature to ordinary temperature. The apparatus used in the annealing step is substantially the same as the apparatus used in the reduction step and the molding step, or it may be constructed by combining known apparatuses.

The present invention will now be described in more detail by way of examples, but the present invention is in no way limited to these examples.

The methods for evaluating the present invention are as follows.

EXAMPLES

The present invention will now be described in more detail by way of examples, but the present invention is in no way limited to these examples.

The methods for evaluating the present invention are as follows.

(I) Saturation Magnetization, Coercive Force, and Permeability

In the case of a magnetic powder, the powder was prepared in a cylindrical case made of polypropylene (inner diameter: 2.4 mm, powder layer thickness approximately 1.5 mm). In the case of a disk-shaped molded body, the molded body was molded on a disk having a diameter of 3 mm and a thickness of approximately 1 mm. Then, using a vibrating sample type magnetometer (VSM), a full loop of the magnetic curve in the region where the external magnetic field is −7.2 MA/m to 7.2 MA/m was drawn, and the values of the saturation magnetization (emu/g) and coercive force (A/m) at room temperature were obtained. The saturation magnetization was corrected with a 5N Ni standard sample, and calculated based on the law of approach to saturation. The coercive force was corrected using a paramagnetic Pd standard sample and/or Gd2O3 standard sample to correct the magnetic field shift in the low magnetic field region. The coercive force was also measured by a VSM method using a Helmholtz type coil to confirm the validity of the measured value.

In these measurements, if a smooth step or inflection point is not seen on the magnetic curve up to the zero magnetic field after magnetization up to 7.2 MA/m, it is determined that there is no (i.e. "absent") "inflection point on the ¼ major loop".

In all of the examples shown below, it was confirmed that an "inflection point on the ¼ major loop" was "absent", and ferromagnetic coupling was recognized.

When measuring a disk-shaped molded body, the saturation magnetization was converted into T (tesla) units using the density. The relative permeability of the disk-shaped molded body was estimated by determining a demagnetizing field coefficient from a Ni standard sample having the same shape as the above-described measurement sample and using a magnetic curve corrected for the demagnetizing field based on the determined value.

The direction of the measurement magnetic field is the axial direction in the case of the magnetic powder and the radial direction in the case of the disk-shaped molded body.

The magnetic properties of a cuboid molded body were measured for a solid magnetic material with a sample size of 15 mm×5 mm×1 mm using a direct-current magnetization measuring machine (direct-current BH loop tracer) equipped with a small single-plate measurement jig. For the magnetization measurement of the cuboid molded body, its magnetization in an external magnetic field of 150 Oe was regarded as the saturation magnetization, with a value expressed in T (Tesla) units.

(II) Oxidation Resistance

The saturation magnetization $\sigma_{st}$ (emu/g) of a magnetic powder that had been left in air at an ordinary temperature for a certain period t (days) was measured by the above method, compared with an initial saturation magnetization $\sigma_{s0}$ (emu/g), and the rate of decrease in the saturation magnetization was evaluated based on the expression of $\Delta\sigma_s(\%)=100\times(\sigma_{s0}-\sigma_{st})/\sigma_{s0}$. The oxidation resistance performance can be determined as being higher as the absolute value of $\Delta\sigma_s$ approaches zero. In the present invention, a magnetic powder having an absolute value of $\Delta\sigma_s$ of 1% or less was evaluated as having good oxidation resistance for a period oft days. In the present invention, t (days) is 30 or more.

(III) Electric Resistivity

In the case of a disk-shaped molded body having a sample size of 3 mmϕ×1 mm, the electric resistivity was measured by the van der Pauw method.

In the case of a cuboid molded body having a sample size of 15 mm×5 mm×1 mm, the electric resistivity was measured by the four-terminal method. Further, the electric resistivity was also measured by the van der Pauw method to confirm the validity of the measured value.

(IV) Fe Content, Co Content, Oxygen Content, and Bcc-(Fe,M) Phase Volume Fraction The Fe content and the Co content in the powder and the bulk magnetic material were quantified by X-ray element fluorescence elemental analysis (XRF). The Fe content and the M component content in the first phase and the second phase of the magnetic material were quantified by EDX included in an FE-SEM based on an image observed by the FE-SEM or TEM. When an EDX measurement value of a certain component was 0.00 atom %, the content of that component was set to 0. Further, the volume fraction of the bcc-(Fe,M) phases was quantified by image analysis by combining a method using the above-described FE-SEM or TEM together with the results of the XRD method. Mainly to distinguish whether the observed phase is a bcc-(Fe,M) phase or an oxide phase, an oxygen characteristic X-ray surface distribution map using SEM-EDX or TEM-EDX was used. In addition, the validity of the value of the volume fraction of the bcc-(Fe,M) phases was also confirmed from the value of the saturation magnetization measured in (I).

The oxygen content of the magnetic material after the reduction step was also confirmed based on the decrease in weight after reduction. Further, image analysis by SEM-EDX was used for identification of each phase.

The K content was quantified by X-ray element fluorescence elemental analysis.

(V) Average Powder Particle Diameter

The powder particle diameter was determined by observing the magnetic powder with a scanning electron microscope (SEM) or a transmission electron microscope (TEM). The powder particle diameter was determined to one significant digit by selecting portions representing the whole material, and setting n to be a number of 100 or more.

When using together with a laser diffraction type particle size distribution meter, the volume-equivalent diameter distribution was measured and evaluated in terms of a median diameter (μm) obtained from the distribution curve thereof. However, the value is employed only when the obtained median diameter is 500 nm or more and less than 1 mm. It was confirmed that such a value agrees to one significant digit with the powder particle diameter estimated by a method using the above microscope.

(VI) Average Crystal Grain Size

The magnetic material was observed the with a scanning electron microscope (SEM) or a transmission electron microscope (TEM), and the size of a portion surrounded by a crystal boundary was obtained to one significant digit. The measurement area was determined by selecting portions sufficiently representative of the whole, and setting the number n to 100 or more. The crystal grain size was determined by separately measuring the average value of the whole, and the average value of only the first phase and the second phase. Further, the EDX apparatus attached to the transmission electron microscope (TEM) was used to examine a size of a portion having a difference in the M component content and estimate a crystal grain size of a fine scale. The number of measurement points for the M component content was 65,536.

(VII) Crystallite Size

The crystallite size was determined by applying the Scherrer equation to the line width of the (200) diffraction line of the bcc phases measured by X-ray diffraction, and taking the dimensionless form factor to be 0.9.

Example 1 and Comparative Example 1

Aqueous solutions of $CrCl_3 \cdot 6H_2O$ (chromium (III) chloride hexahydrate) and $FeCl_2 \cdot 4H_2O$ (ferric chloride (II) tetrahydrate) were separately prepared, and then a mixed aqueous solution of $CrCl_3$ and $FeCl_2$, obtained by mixing these solutions and adjusted to 25.1 mM, was prepared in a reactor as a reaction field solution. Next, a 280 mM aqueous potassium hydroxide solution (pH adjusting solution) was added dropwise while vigorously stirring in air, and the pH of the system gradually shifted from the acidic side to the alkaline side within a range of 4.11 to 11.30. At the same time, a mixed aqueous solution of $CrCl_3$ and $FeCl_2$ of 83.8 mM (reaction liquid) was added dropwise and reacted for 15 minutes, then the addition of the pH adjusting solution and the reaction solution was stopped, and the stirring operation was further continued for 15 minutes. Thereafter, the solid component was precipitated by centrifugation, redispersed in purified water and repeatedly subjected to centrifugation to adjust the pH of the supernatant solution to 6.47. Finally, the precipitate was dispersed in ethanol, and then subjected to centrifugation.

Figure 4:
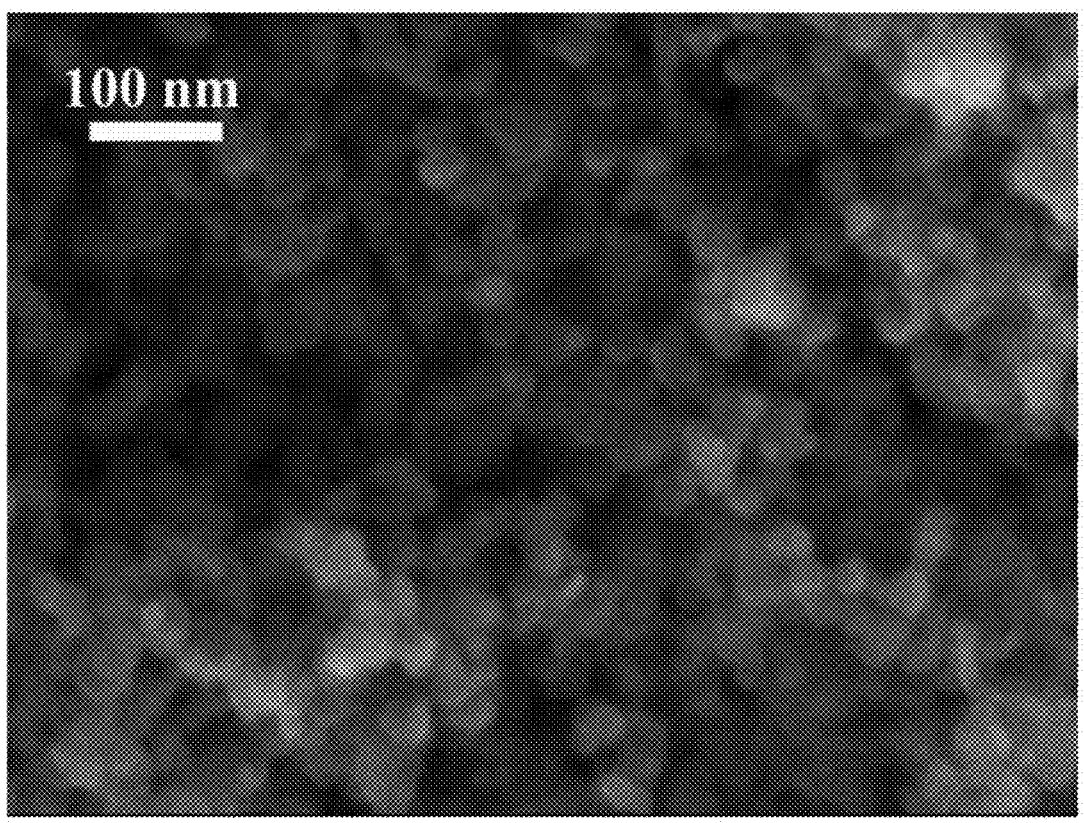
FIG. 4 is an SEM image of a $(Fe_{0.991}Cr_{0.009})_{43}O_{57}$ ferrite nanopowder (Comparative Example 1).

After that, vacuum drying was carried out at ordinary temperature overnight to obtain a Cr-ferrite nanopowder having a $(Fe_{0.991}Cr_{0.0009})_{43}O_{57}$ composition having an average powder particle diameter of 20 nm. An SEM image of this nanopowder is shown in FIG. 4. Further, as a result of analyzing the nanopowder by X-ray diffraction, it was found that the cubic Cr-ferrite phase was the main phase and a rhombohedral ferrihydrite and $Cr_2O_3$ phases were contained as impurity phases. Therefore, this powder did not contain an α-(Fe,Cr) phase, and was hence used as the powder of Comparative Example 1. The particle diameter, magnetic properties, and the like of this powder are shown in Table 1.

The Cr-ferrite nanopowder was prepared in a crucible made of alumina, was increased in temperature at 10° C./min up to 300° C. in hydrogen gas, was left at 300° C. for 15 minutes, was increased in temperature at 10° C./min from 300° C. to 1100° C., and then, was subjected to a reduction treatment at 1100° C. for 1 hour. After that, the temperature was lowered at a rate of 95° C./min to 400° C., and then cooled from 400° C. to room temperature over 40 minutes. Subsequently, at 20° C., a gradual oxidation treatment was performed for 1 hour in an argon atmosphere having an oxygen partial pressure of 1% by volume, thereby obtaining a magnetic material having a $Fe_{99.1}Cr_{0.9}$ composition as a content ratio between chromium and iron (content ratio when the total content of chromium and iron was 100 atom %). The O content relative to the whole magnetic material was 1.7 atom %, and the K content was 0. In addition, the average powder particle diameter of this Fe—Cr magnetic material was 30 μm. Analysis on this magnetic material was carried out by the following method, and this magnetic material was used as Example 1.

As a result of the observation of the obtained magnetic material by X-ray diffraction, it was found that only the α-(Fe,Cr) phase was clearly recognized, and the α-(Fe,Cr) phase as the bcc phase was the main component.

Figure 5:
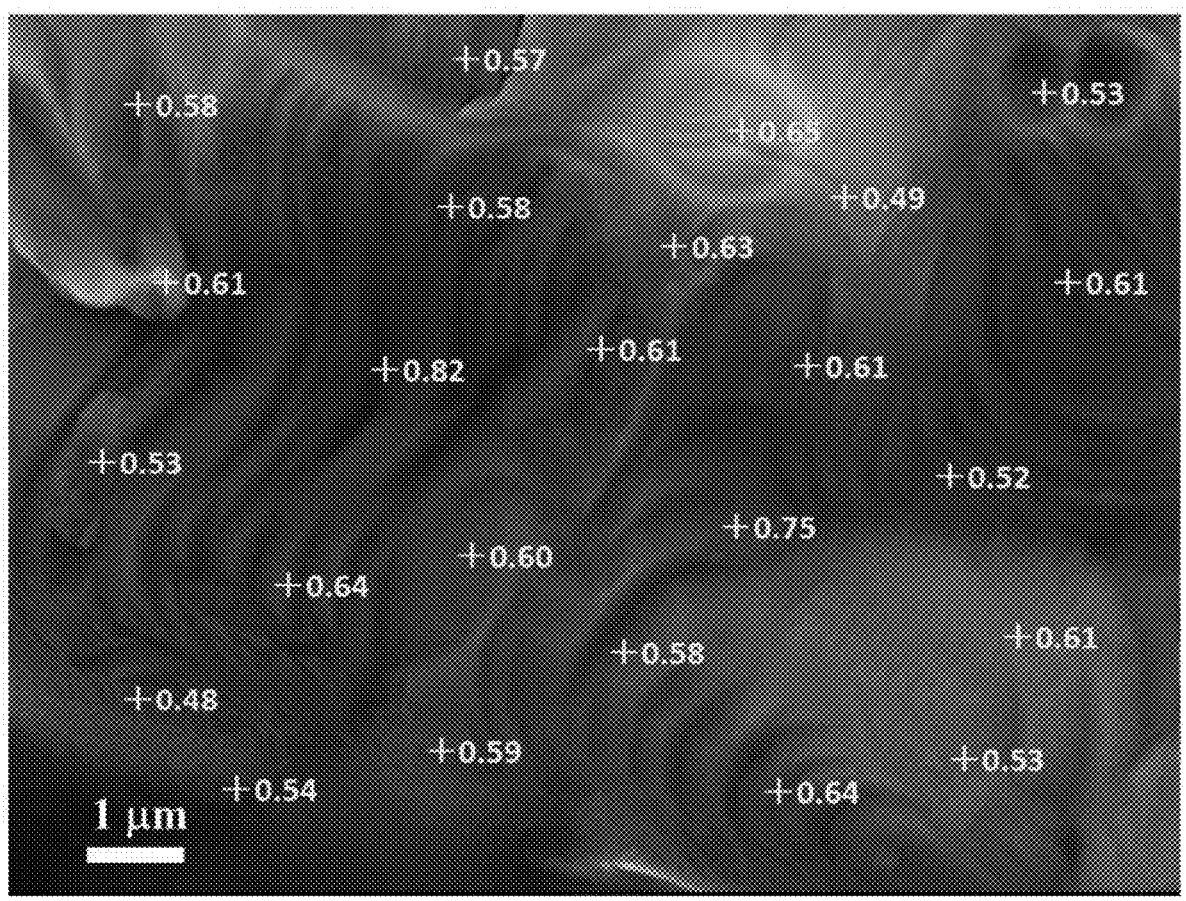
FIG. 5 is an SEM image of $Fe_{99.1}Cr_{0.9}$ soft magnetic material (Example 1) (a numerical value in the image is an average value in a region having a radius of 100 nm to 150 nm in terms of Cr content (atom %) in the cruciform part).

The magnetic material powder was also observed by FE-SEM/EDX, which is suitable for finding the local Cr content of the magnetic material and the presence and extent of disproportionation (magnification was 10,000 times). As a result, as shown in FIG. 5, the content of Cr in each phase of the magnetic material (the numerical values in the diagram are the Cr content in each phase, represented as the percentage value of the atomic ratio of Cr to the total of Cr and Fe in each phase) was found to be distributed in a very disproportionate manner of 0.48 atom % or more and 0.82 atom % or less. In FIG. 5, innumerable curved crystal boundaries curved at the interval of 10 nm order were also observed in a region thought to be one α-(Fe,Cr) phase. Therefore, it has come to be clear from these results that even in the α-(Fe,Cr) phase region, there are phases that can be distinguished based on the Cr content, for example, the α-(Fe,Cr) phase having the Cr content of 0.82 atom % which is 1.7 times within the range of 1.5 times or more and $10^5$ times or less relative to the α-(Fe,Cr) phase having the Cr content of 0.48 atom %, namely, that regarding the α-(Fe,Cr) phases, a phase other than the first phase, which corresponds to the second phase is also present.

Furthermore, when the measurement was performed in the same manner as the measurement in FIG. 5 in three fields of view changed in location from FIG. 5 (accordingly, the measurement was performed at a total of 92 measurement points together with the measurement of FIG. 5), it was confirmed that the Cr content in each phase was distributed in a very disproportionate manner of 0.48 atom % or more and 0.97 atom % or less, and that there is an α-(Fe,Cr) phase having the Cr content of 0.97 atom % which is 2.0 times within the range of 1.5 times or more and $10^5$ times or less relative to the α-(Fe,Cr) phase having the Cr content of 0.48 atom % (not shown).

From the whole results of the respective phases measured at the above 92 points, it can be said that the Cr content is distributed in a very disproportionate manner in the range of 0.48 atom % or more and 0.97 atom % or less in the present example. It should be noted that an average value of the Cr contents of these 92 phases was 0.67 atom %, which is lower than the Cr content of 0.9 atom % which is the measured value by XRF described above. When the field of view is further increased, the presence of many second phases each having a higher Cr content than 0.72 atom % which is 1.5 times of 0.48 atom % is found, and thus it is speculated that even greater disproportionation is highly likely to occur as a whole.

When combining the above results of X-ray diffraction (i.e., where only the α-(Fe,Cr) phase, which is the bcc phase, was clearly observed for the observed magnetic material) and the above results of FE-SEM (i.e., where the observed magnetic material has a crystalline phase with a Cr content of 0.48 atom % to 0.97 atom %), it is understood that the α-(Fe,Cr) phase and the α-(Fe,Cr) phase having a high Cr content were formed in the observed magnetic material. When this is applied to the above-described definitions of the first phase and the second phase, the former phase corresponds to the first phase, and the latter corresponds to the second phase.

The volume fraction of the bcc phase was estimated to be 98% by volume based on these image analysis, X-ray diffraction, and oxygen content. It should be noted that the crystal grain sizes of the first phase and the second phase can be determined from the SEM image by determining the second phase as described above, those values were all 200 nm as a result of the image analysis.

Further, the crystallite size of the present example was 80 nm (76 nm in two significant digits).

It was confirmed that the saturation magnetization of this magnetic material was 220.4 emu/g exceeding the magnetization of 218 emu/g of α-Fe. Further, the coercive force was 450 A/m, and there was no inflection point on the ¼ major loop.

Therefore, since the magnetic material of Example 1 has a coercive force of 800 A/m or less, it was also confirmed that the magnetic material of the present example is the soft magnetic material.

The average crystal grain size of the whole magnetic material was 200 nm. The crystal grain sizes of the first phase and the second phase were almost the same as the average crystal grain size of the whole. Further, observation of the crystal boundary vicinity at a magnification of 750,000 times confirmed that no heterogenous phases existed near these crystal boundaries.

Table 1 summarizes measurement results of the phases, compositions, particle sizes, and magnetic properties of the present example.

Comparative Examples 2 to 4

Ferrite nanopowders were prepared in the same manner as in Example 1, except that the Cr component was not added.

Fe metal powders were prepared in the same manner as in Example 1, except that the above ferrite nanopowders were used and the reduction conditions were 425° C. for 1 hour (Comparative Example 2), the same temperature for 4 hours (Comparative Example 3), and 450° C. for 1 hour (Comparative Example 4). The measurement was performed in the same manner.

The measurement results of the grain sizes, the magnetic properties, and the like of these samples are shown in Table 1.

It should be noted that these metal powders have the property that the magnetic properties are suddenly reduced only by being left in the air at room temperature. Table 2 shows saturation magnetization change rates as $\Delta\sigma_s$ (%) of Comparative Examples 2 to 4 when t=60.

Table 2 also shows $\Delta\sigma_s$ in Example 1.

It was found that the magnetic material of Example 1 was excellent in oxidation resistance.

Examples 2 to 5

Fe—Cr magnetic materials were produced in the same manner as in Example 1, except that the M component content (Cr) was changed to the content shown in Table 1.

Table 1 shows measurement results of the phases, compositions, particle sizes, and magnetic properties of the present example.

The "M component content of second phase/component content of first phase" in the table means a "ratio of M component in the second phase when the total of Fe and the M component in the second phase is 100 atom % relative to the M component content in the first phase when the total of Fe and the M component in the first phase is 100 atom %". Specifically, when an arbitrary part of the magnetic powder was photographed by SEM at a magnification of 10,000 times, and an area of about 12 μm×about 9 μm was set as a target to perform EDX measurement using an electron beam having a beam diameter of 150 to 200 nm in radius at a plurality of points, a measurement point having the minimum M component content was determined as the first phase, and a measurement point having the maximum M component content was determined as the second phase. Then, a case where the ratio was 1.5 times or more and less than 2 times was expressed as "≥1.5", and a case where the ratio was 2 times or more and $10^5$ times or less was expressed as "≥2". As shown in the table, it was confirmed that the ratio was 1.5 times or more in all the examples.

It should be noted that in each of the examples, the average crystal grain size of the first phase and the second phase agreed to the average crystal grain size of the whole. Further, observation of the crystal boundary vicinity at a magnification of 750,000 times confirmed that no heterogenous phases existed near these crystal boundaries.

Examples 6 and 7

Fe—Cr magnetic material powders were produced in the same manner as in Example 1, except that the M component content (Cr) and the TM component (Mn) were changed to the contents shown in Table 1.

Table 1 shows measurement results of the phases, compositions, particle sizes, and magnetic properties of the present example.

It should be noted that the average crystal grain size of the first phase and the second phase agreed to the average crystal grain size of the whole in both the examples.

Examples 8 to 48 and Comparative Examples 5 to 12

Fe-M magnetic material powders were produced in the same manner as in Example 1, except that the kind and content of the M component were changed as shown in Table 4.

Although the M component is added as an aqueous solution of chloride or a hydrochloric acid solution, a method for preparing a reaction field solution and a reaction solution, a method for adding the reaction solution, and a concentration of a pH adjusting solution differ depending on the M component as follows.

When the M component was Nb or Ta, a reaction field solution and a reaction solution were acidified with hydrochloric acid, and a KOH concentration of a pH adjusting solution was used to be adjusted to 560 mM to 1 M according to the charged concentration. Further, the reaction field solution and the reaction solution were degassed water, and the reaction field solution was introduced into a reaction field from an Ar inert gas atmosphere. A wet reaction was performed in the presence of oxygen.

When the M component was W, three solutions including a reaction solution containing Fe ions, a pH adjusting solution, and a tungsten chloride solution dissolved in concentrated hydrochloric acid were separately and simultaneously dropped into a reaction field. A KOH concentration of the pH adjusting solution was 700 mM.

When the M component was Si, the M component was added as a silica fine powder during the reduction step.

Tables 3 to 6 show measurement results of the phases, compositions, particle sizes, and magnetic properties of the present example. It should be noted that measurement results of the phases, compositions, particle sizes, and magnetic properties of some of ferrite raw material powders before reduction (Comparative Examples 5 to 12) are also described. It should be noted that in each of the examples, the average crystal grain size of the first phase and the second phase agreed to the average crystal grain size of the whole.

Further, Table 2 shows $\Delta\sigma_s$ (t=60) of Examples 40 and 47. It was found that these magnetic materials were excellent in oxidation resistance.

Figure 6:
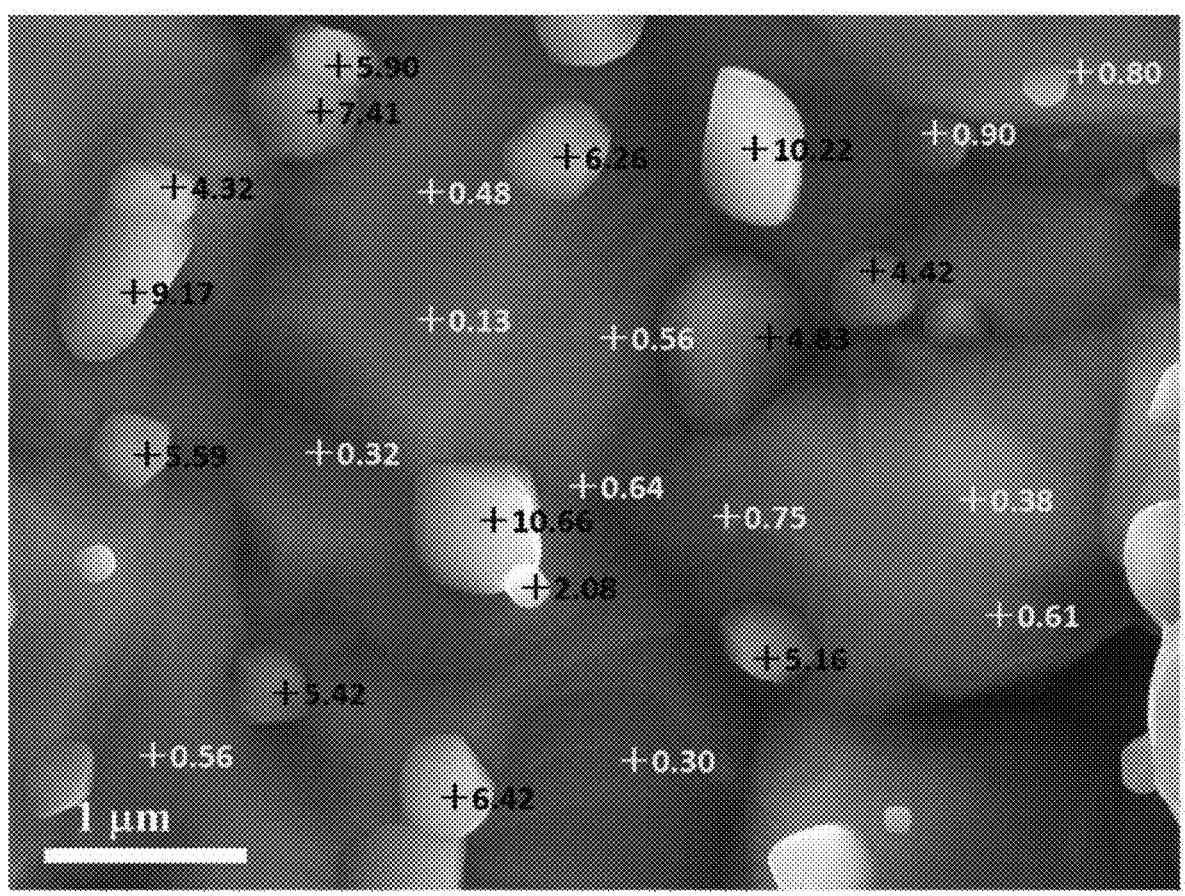
FIG. 6 is an SEM image of $Fe_{99.0}Nb_{1.0}$ soft magnetic material (Example 25) (a numerical value in the image is an average value in a region having a radius of 100 nm to 150 nm in terms of Nb content (atom %) in the cruciform part).

FIG. 6 shows a result of observation of Example 25 by the FE-SEM/EDX method, which is suitable for finding the local Nb content of the magnetic material and the presence and extent of disproportionation. The content of Nb in each phase of the magnetic material (the numerical values in the diagram are the Nb content in each phase, represented as the percentage value of the atomic ratio of Nb to the total of Nb and Fe in each phase) was found to be distributed in a very disproportionate manner of 0.13 atom % or more and 10.66 atom % or less. In addition, in FIG. 6, innumerable curved crystal boundaries curved at the interval of 10 nm order were also observed in a region thought to be one α-(Fe,Nb) phase. Therefore, it has come to be clear from these results that even in the α-(Fe,Nb) phase region, there is a phase that can be distinguished based on the Nb content, for example, an α-(Fe,Nb) phase having the Nb content of 10.66 atom % which is 1.5 times or more and $10^5$ times or less relative to the α-(Fe,Nb) phase having the Nb content of 0.13 atom %, namely, that regarding the α-(Fe,Nb) phases, a phase other than the first phase, which corresponds to the second phase is also present.

Figure 7:
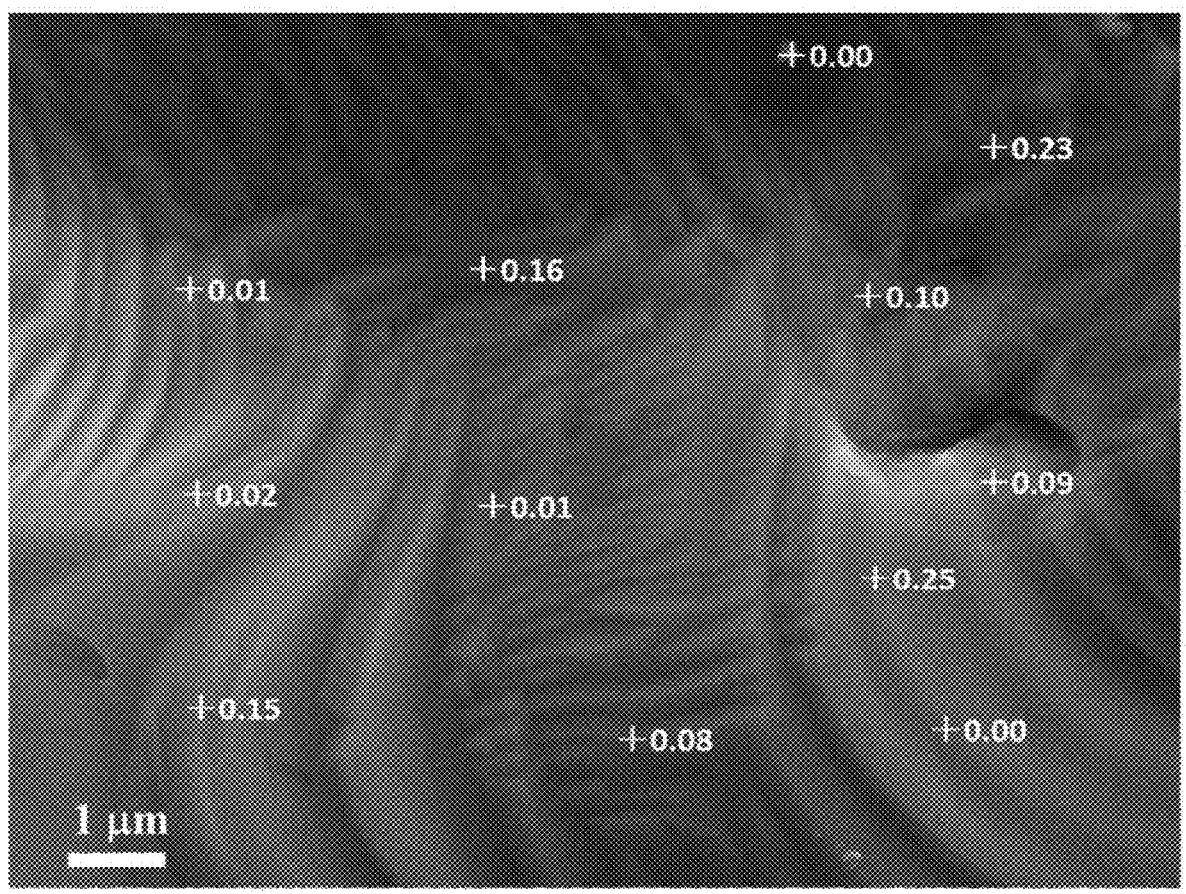
FIG. 7 is an SEM image of $Fe_{99.9}Zn_{0.1}$ soft magnetic material (Example 46) (a numerical value in the image is an average value in a region having a radius of 100 nm to 150 nm in terms of Zn content (atom %) in the cruciform part).

FIG. 7 shows a result of observation of Example 46 by the FE-SEM/EDX method, which is suitable for finding the local Zn content of the magnetic material and the presence and extent of disproportionation. The content of Zn in each phase of the magnetic material (the numerical values in the diagram are the Zn content in each phase, represented as the percentage value of the atomic ratio of Zn to the total of Zn and Fe in each phase) was found to be distributed in a very disproportionate manner of 0.01 atom % or more and 0.25 atom % or less. In addition, in FIG. 7, innumerable curved crystal boundaries curved at the interval of 10 nm order were also observed in a region thought to be one α-(Fe,Zn) phase. Therefore, it has come to be clear from these results that even in the α-(Fe,Zn) phase region, there is a phase that can be distinguished based on Zn content, for example, an α-(Fe,Zn) phase having a Zn content of 0.25 atom % which is 1.5 times or more and $10^5$ times or less relative to the α-(Fe,Zn) phase having the Zn content of 0.01 atom %, namely, that regarding the α-(Fe,Zn) phases, a phase other than the first phase, which corresponds to the second phase is also present. It should be noted that the portion where the Zn content was observed as 0.00 in the drawing means that Zn exists only in an amount below a detection limit, and thus, is regarded as the α-Fe minor phase, and the first phase having the minimum Zn content was set as the phase at 0.01 atom %.

Example 49

Aqueous solutions of $ZrCl_4$ (zirconium chloride (IV)), $NiCl_2 \cdot 6H_2O$ (nickel chloride (II) hexahydrate), and $FeCl_2 \cdot 4H_2O$ (iron chloride (II) tetrahydrate) were separately prepared, and then a mixed aqueous solution of $ZrCl_4$, $NiCl_2$, and $FeCl_2$, obtained by mixing these solutions and adjusted to 25.1 mM, was prepared in a reactor as a reaction field solution. Next, a 560 mM aqueous potassium hydroxide solution (pH adjusting solution) was added dropwise while vigorously stirring in air, and the pH of the system gradually shifted from the acidic side to the alkaline side within a range of 4.18 to 12.75. At the same time, a mixed aqueous solution of $ZrCl_4$, $NiCl_2$, and $FeCl_2$ of 83.8 mM (reaction liquid) was added dropwise and reacted for 15 minutes, then the addition of the pH adjusting solution and the reaction solution was stopped, and the stirring operation was further continued for 15 minutes. Thereafter, the solid component was precipitated by centrifugation, redispersed in purified water and repeatedly subjected to centrifugation to adjust the pH of the supernatant solution to 9.86. Finally, the precipitate was dispersed in ethanol, and then subjected to centrifugation.

After that, vacuum drying was carried out at ordinary temperature overnight to obtain a Zr-ferrite nanopowder having a $(Fe_{0.9959}Ni_{0.004}Zr_{0.001})_{43}O_{57}$ composition having an average powder particle diameter of 20 nm. Further, as a result of analyzing the nanopowder by X-ray diffraction, it was found that the cubic Zr-ferrite phase was the main phase and a rhombohedral ferrihydrite phase was contained as an impurity phase.

The Zr-ferrite nanopowder was prepared in a crucible made of alumina, was increased in temperature at 10° C./min up to 300° C. in a hydrogen flow, was left at 300° C. for 15 minutes, was increased in temperature at 10° C./min from 300° C. to 1100° C., and then, was subjected to a reduction treatment at 1100° C. for 1 hour. After that, the temperature was lowered at a rate of 95° C./min to 400° C., and then cooled from 400° C. to room temperature over 40 minutes. Subsequently, at 20° C., a gradual oxidation treatment was performed for 1 hour in an argon atmosphere having an oxygen partial pressure of 1% by volume, thereby obtaining a magnetic material having a $Fe_{95.6}Ni_{4.3}Zr_{0.1}$ composition as a content ratio among zirconium, nickel, and iron (content ratio when the total content of zirconium, nickel, and iron was 100 atom %). The O content relative to the whole magnetic material was 0.9 atom %, and the K content was 0. In addition, the average powder particle diameter of this Fe—Zr magnetic material was 20 μm. Analysis on this magnetic material was carried out by the following method, and this magnetic material was used as Example 49.

As a result of the observation of the obtained magnetic material by X-ray diffraction, it was found that only the α-(Fe,Zr) phase was clearly recognized, and the α-(Fe,Zr) phase as the bcc phase was the main component. According to the SEM-EDX analysis, "M component content of second phase/M component content of first phase" (the definition thereof is the same as in Table 1) was "≥2" (12 times).

The average crystal grain size of the whole magnetic material was 200 nm. Further, observation of the crystal boundary vicinity at a magnification of 750,000 times confirmed that no heterogenous phases existed near these crystal boundaries.

When combining the above results of X-ray diffraction (i.e., where only the α-(Fe,Zr) phase, which is the bcc phase, was clearly observed for the observed magnetic material) and the above results of FE-SEM, it is understood that the α-(Fe,Zr) phase and the α-(Fe,Zr) phase having a high Zr content were formed in the observed magnetic material. When this is applied to the above-described definitions of the first phase and the second phase, the former phase corresponds to the first phase, and the latter corresponds to the second phase.

The volume fraction of the bcc phase was estimated to be 99% by volume based on these image analysis, X-ray diffraction, and oxygen content. It should be noted that the crystal grain sizes of the first phase and the second phase can be determined from the SEM image by determining the second phase as described above, those values were all 200 nm as a result of the image analysis. Further, the crystallite size of the present example was 100 nm (95 nm in two significant digits).

Further, as a result of measuring the magnetic properties, the saturation magnetization was 209.9 emu/g, the coercive force was 430 A/m, and there was no inflection point on the ¼ major loop. (Not shown in the table)

Example 50

A magnetic material having a content ratio of iron, cobalt, and copper of $Fe_{94.6}Co_{5.3}Cu_{0.1}$ composition was obtained in the same manner as in Example 49. The O content relative to the whole magnetic material was 0.1 atom % or less, and the K content was 0 atom %.

As a result of the observation of the obtained magnetic material by X-ray diffraction, it was found that only the α-(Fe,Cu) phase was clearly recognized, and the α-(Fe,Cu) phase as the bcc phase was the main component. According to the SEM-EDX analysis, "M component content of second phase/M component content of first phase" (the definition thereof is the same as in Table 1) was "≥2" (10 times).

The average crystal grain size of the whole magnetic material was 200 nm. Further, observation of the crystal boundary vicinity at a magnification of 750,000 times confirmed that no heterogenous phases existed near these crystal boundaries.

When combining the above results of X-ray diffraction (i.e., where only the α-(Fe,Cu) phase, which is the bcc phase, was clearly observed for the observed magnetic material) and the above results of FE-SEM, it is understood that the α-(Fe,Cu) phase and the α-(Fe,Cu) phase having a high Cu content were formed in the observed magnetic material. When this is applied to the above-described definitions of the first phase and the second phase, the former phase corresponds to the first phase, and the latter corresponds to the second phase.

The volume fraction of the bcc phase was estimated to be 99% by volume based on these image analysis, X-ray diffraction, and oxygen content. It should be noted that the crystal grain sizes of the first phase and the second phase can be determined from the SEM image by determining the second phase as described above, those values were all 200 nm as a result of the image analysis. Further, the crystallite size of the present example was 90 nm (87 nm in two significant digits).

Further, as a result of measuring the magnetic properties, the saturation magnetization was 217.2 emu/g, the coercive force was 340 A/m, and there was no inflection point on the ¼ major loop. (Not shown in the table)

Example 51

The magnetic material powder of Example 50 was prepared in a 3 mm cemented carbide die made of tungsten carbide, and then subjected to cold compression molding in air at room temperature under 1 GPa.

Next, under an argon flow, the temperature was increased at 10° C./min to 300° C., held at 300° C. for 15 minutes, then increased from 300° C. to 900° C. at 10° C./min, after which the temperature was immediately lowered to 400° C. at 75° C./min, and the cold compression molded body was cooled from 400° C. to room temperature over 40 minutes. A 3 mm 4×1 mm disk-shaped solid magnetic material of the present invention was obtained by performing the normal-pressure sintering.

The density of this solid magnetic material was 7.37 g/cm$^3$, the saturation magnetization and the coercive force were 1.93 T and 87.55 A/m, and there was no inflection point on the ¼ major loop.

Therefore, since the solid magnetic material of Example 51 has a coercive force of 800 A/m or less, it was confirmed to be the soft magnetic material of the present invention.

Further, the permeability of the solid magnetic material was about 10$^3$, which was an extremely high value. Moreover, it is known that the permeability can be controlled in a wide range from 101 to 10$^4$ depending on the addition amount of Cu (0.001 atom % or more and 33 atom % or less) and the addition amount of Co (0.001 atom % or more and less than 50 atom %).

Further, the electric resistivity of this solid magnetic material was 1.7 µΩm. From this example, it can be seen that the solid magnetic material of the present invention has an electric resistivity, which is a characteristic of the present invention, that is higher than 1.5 µΩm, and compared with the 0.1 µΩm of pure iron by one order of magnitude, the electric resistivity which is 3 to 4 times of the 0.5 µΩm of an electromagnetic steel sheet, for example, which are existing materials.

Example 52

A ferrite nanopowder $(Fe_{0.959}Ni_{0.0040}Mn_{0.0001})_3O_4$ was prepared in the same manner as Comparative Example 1. Then, a silica powder was added to this, and a reduction reaction was carried out in the same manner as in Example 1 to obtain a $Fe_{92.0}Ni_{3.9}Si_{4.0}Mn_{0.1}$ magnetic material powder having a powder particle diameter of 0.3 µm.

The crystal grain sizes of the first phase, the second phase, and the whole were 100 nm, and the crystallite sizes were 30 nm. Further, the bcc phase volume fraction was 98% or more, and the O content relative to the whole magnetic material was 1.6 atom %, and the K content was 0.

This magnetic material powder was evaluated in the same manner as in Example 1 by an FE-SEM/EDX method, which is suitable to know a local Si content and the presence and degree of disproportionation of the magnetic material. As a result, it has come to be clear that there is a phase that can be distinguished based on the Si content from the α-(Fe,Si) phase which is the first phase, even in the region of the α-(Fe,Si) phases, for example, an α-(Fe,Si) phase having the Si content which is 1.5 times or more and 10$^5$ times or less relative to the α-(Fe,Si) phase of the first phase and which is 2 atom % or more and 100 atom % or less, namely, that regarding the α-(Fe, Si) phases, a phase other than the first phase, which corresponds to the second phase is also present. As a result of the evaluation in the same manner as in Example 1, it was found that the fluctuation of the Si composition was 1.5 times or more.

The saturation magnetization of this magnetic material was 208.6 emu/g, the coercive force was 810 A/m, and there was no inflection point on the ¼ major loop.

Therefore, the magnetic material of Example 52 was confirmed to be a semi-hard magnetic material since the coercive force was more than 800 A/m and 40 kA/m or less.

It should be noted that the properties of the above-described solid magnetic materials of Examples 51 and 52 are not shown in the table.

Example 53

The magnetic material powder of Example 52 was prepared into a 15 mm×5 mm cemented carbide die made of tungsten carbide, and a 15 mm×5 mm×1 mm rectangular solid magnetic material of the present invention was obtained in the same manner as in Example 51.

This solid magnetic material was evaluated in the same manner as in Example 1 by an FE-SEM/EDX method, which is suitable to know a local Si content and the presence and degree of disproportionation of the magnetic material. As a result, it has come to be clear that there is a phase that can be distinguished based on the Si content from the α-(Fe,Si) phase of the first phase, even in the region of the α-(Fe,Si) phases, for example, an α-(Fe,Si) phase having the Si content which is 1.5 times or more and 10$^5$ times or less relative to the α-(Fe,Si) phase of the first phase and which is 2 atom % or more and 100 atom % or less, namely, that regarding the α-(Fe,Si) phases, a phase other than the first phase, which corresponds to the second phase is also present. As a result of the evaluation in the same manner as in Example 1, it was found that the fluctuation of the Si composition was 1.5 times or more.

The density of this solid magnetic material was 6.05 g/cm$^3$. The saturation magnetization and coercive force obtained by the direct current magnetization measurement apparatus were 1.30 T and 180 A/m, and there was no inflection point on the ¼ major loop. Further, the electric resistance of this solid magnetic material was 32 μΩm.

From this example, it can be seen that the solid magnetic material of the present invention has an electric resistivity, which is a characteristic of the present invention, that is higher than 1.5 μΩm, and compared with the 0.1 μΩm of pure iron and the 0.5 μΩm of an electromagnetic steel sheet, for example, which are existing materials, an electric resistivity higher by about two orders of magnitude.

It is noted that the above characteristics of the present embodiment are not shown in the tables.

Example 54

A Fe$_{98.9}$Si$_{1.0}$Mn$_{0.1}$ magnetic material powder was produced in the same manner as in Examples 8 to 48, except that the kind and content of the M component were changed.

As a result of observation of the obtained magnetic material by X-ray diffraction, only the α-(Fe,Si,Mn) phase was clearly recognized. Since Si is the M component in the present application and Mn corresponds to the TM component, it was confirmed from these results that the α-(Fe,M,TM) phase, which is the bcc phase, was the main component.

The magnetic material powder was also observed by TEM/EDX, which is suitable for finding the local Si content of the magnetic material and the presence and extent of disproportionation. As a result, it was found that the content of Si in each phase of the present magnetic material in the absence of oxygen was distributed in a very disproportionate manner of 0.01 atom % or more and 1.99 atom % or less. Therefore, it is clear from these results that there are not only the α-(Fe,Si) phase having the Si content of 0.01 atom % but also the α-(Fe,Si,Mn) phase having the Si content that is 199 times (i.e., 1.99 atom %) in the range of 1.5 times or more and 10$^5$ times or less relative to the α-(Fe,Si,Mn) phase having the Si content of 0.01 atom %, namely, that regarding the α-(Fe,Si,Mn) phases, a phase other than the first phase, which corresponds to the second phase is also present The volume fraction of the bcc phase was estimated to be 99% by volume or more based on these image analysis, X-ray diffraction, and oxygen content (0.6 at %). It should be noted that the crystal grain sizes of the first phase and the second phase can be determined from the characteristic X-ray image obtained by TEM-EDX by determining the second phase as described above, those values were all 20 to 100 nm as a result of the image analysis.

Further, the crystallite size in the present example was 30 nm.

It was confirmed that the saturation magnetization of this magnetic material was 219.4 emu/g exceeding the magnetization of 218 emu/g of α-Fe. Further, the coercive force was 8 A/m, and there was no inflection point on the ¼ major loop.

Therefore, since the magnetic material of Example 54 has a coercive force of 800 A/m or less, it was also confirmed that the magnetic material of the present example is the soft magnetic material.

In addition, in view of the results of Examples 1 to 54 and Comparative Examples 1 to 12, the electric resistivity of the present magnetic material can be estimated as being 1.5 μΩm or more, which is higher than that of existing general metallic magnetic materials, and therefore it was found that the present magnetic powder can solve problems such as the eddy current loss.

Incidentally, based on the observation results from FE-SEM/EDX, which is suitable for finding the presence and extent of disproportionation in the Examples, it was found that the first phase and the second phase in the present magnetic powder of Examples 1 to 53 were not derived respectively from the main raw material phase and the auxiliary raw material phase of the raw material ferrite powder, but were phases that separated in the disproportionation reaction caused by the reduction reaction of the homogeneous raw material ferrite phase.

TABLE 1

| Example | Reduction Temperature (° C.) | Reduction Time (hours) | Content of M Component (Cr) in Magnetic Material Powder (atom %) | Content of TM Component (Mn) in Magnetic Material Powder (atom %) | First Phase | Second Phase | bcc Phase Volume Fraction (volume %) |
|---|---|---|---|---|---|---|---|
| Example 1 | 1100 | 1 | 0.9 | — | α-(Fe, Cr) phase | α-(Fe, Cr) phase | 98 |
| Comparative Example 1 | — | — | 0.9 | — | — | — | 0 |
| Example 2 | 1100 | 1 | 0.08 | — | α-(Fe, Cr) phase | α-(Fe, Cr) phase | 99 |
| Example 3 | 1100 | 1 | 2.1 | — | α-(Fe, Cr) phase | α-(Fe, Cr) phase | 97 |
| Example 4 | 1100 | 1 | 4.0 | — | α-(Fe, Cr) phase | α-(Fe, Cr) phase | 98 |
| Example 5 | 1100 | 1 | 10.7 | — | α-(Fe, Cr) phase | α-(Fe, Cr) phase, M-component oxide phase (Cr$_2$O$_3$) | 89 |
| Example 6 | 1100 | 1 | 0.1 | 0.1 | α-(Fe, Cr) phase | α-(Fe, Cr) phase | 99 |
| Example 7 | 1100 | 1 | 4.7 | 0.1 | α-(Fe, Cr) phase | α-(Fe, Cr) phase | 96 |
| Comparative Example 2 | 425 | 1 | 0.0 | — | — | — | 29 |
| Comparative Example 3 | 425 | 4 | 0.0 | — | — | — | 97 |
| Comparative Example 4 | 450 | 1 | 0.0 | — | — | — | 99 |

TABLE 1-continued

| Example | O Content (atom %) | Average Powder Particle Diameter (nm) | Average Crystal Grain Size of Whole (nm) | Crystallite Size (nm) | Saturation Magnetization (emu/g) | Coercive Force (A/m) | M Component Content of Second Phase/Component Content of First Phase |
|---|---|---|---|---|---|---|---|
| Example 1 | 1.7 | 30000 | 200 | 80 | 220.4 | 450 | ≥1.5 |
| Comparative Example 1 | 57 | 20 | 20 | 20 | 65.4 | 4900 | — |
| Example 2 | 0.8 | 50000 | 300 | 80 | 219.7 | 400 | ≥2 |
| Example 3 | 2.4 | 20000 | 200 | 90 | 213.0 | 530 | ≥2 |
| Example 4 | 1.9 | 10000 | 100 | 100 | 215.6 | 630 | ≥2 |
| Example 5 | 9.2 | 5000 | 90 | 100 | 196.7 | 1670 | ≥2 |
| Example 6 | 0.9 | 40000 | 200 | 80 | 218.0 | 470 | ≥2 |
| Example 7 | 3.1 | 10000 | 100 | 100 | 211.6 | 580 | ≥2 |
| Comparative Example 2 | 41 | 100 | 100 | 100 | 85.9 | 12000 | — |
| Comparative Example 3 | 1.6 | 2000 | 2000 | >300 | 214.6 | 3700 | — |
| Comparative Example 4 | 0.7 | 2000 | 2000 | >300 | 216.6 | 3200 | — |

TABLE 2

| Example | Kind and Content (atom %) of M Component in Magnetic Material Powder | Kind and Content (atom %) of TM Component in Magnetic Material Powder | bcc Phase Volume Fraction (volume %) | Average Powder Particle Diameter (nm) | Average Crystal Grain Style (nm) | Saturation Magnetization (emu/g) | Δσ$_s$ (%) |
|---|---|---|---|---|---|---|---|
| Example 1 | Cr 0.9 | — | 97 | 30000 | 200 | 220.4 | 1.3 |
| Example 40 | Cu 0.1 | — | 99 | 60000 | 200 | 219.7 | 2.8 |
| Example 47 | Si 2.2 | Mn 0.1 | 95 | 2000 | 100 | 213.5 | −0.1 |
| Comparative Example 2 | 0 | 0 | 29 | 100 | 100 | 85.9 | 5.4 |
| Comparative Example 3 | 0 | 0 | 97 | 2000 | 2000 | 214.6 | 19.0 |
| Comparative Example 4 | 0 | 0 | 99 | 2000 | 2000 | 216.6 | 21.3 |

TABLE 3

| Example | Reduction Temperature (° C.) | Reduction Time (hours) | Kind of M Component in Magnetic Material Powder | Content of M Component in Magnetic Material Powder (atom %) | Content of TM Component (Mn) in Magnetic Material Powder (atom %) | First Phase | Second Phase | bcc Phase Volume Fraction (volume %) |
|---|---|---|---|---|---|---|---|---|
| Example 8 | 1100 | 1 | Zr | 0.1 | — | α-(Fe, Zr) phase | α-(Fe, Zr) phase | 99 |
| Example 9 | 1100 | 1 | Zr | 1.1 | — | α-(Fe, Zr) phase | α-(Fe, Zr) phase, M-component oxide phase (ZrO$_2$) | 94 |
| Example 10 | 1100 | 1 | Zr | 12.3 | — | α-(Fe, Zr) phase | α-(Fe, Zr) phase, M-component oxide phase (ZrO$_2$) | 75 |
| Example 11 | 550 | 1 | Zr | 11.6 | — | α-(Fe, Zr) phase | α-(Fe, Zr) phase, Zr-ferrite | 59 |
| Comparative Example 5 | — | 1 | Zr | 12.5 | — | — | — | 0 |
| Example 12 | 1100 | 1 | Zr | 0.1 | 0.1 | α-(Fe, Zr) phase | α-(Fe, Zr) phase | 98 |
| Example 13 | 1100 | 1 | Zr | 32.2 | — | α-(Fe, Zr) phase | α-(Fe, Zr) phase, M-component oxide phase (ZrO$_2$) | 46 |

TABLE 3-continued

| | | | | | | | | |
|---|---|---|---|---|---|---|---|---|
| Example 14 | 1100 | 1 | Hf | 0.1 | — | α-(Fe, Hf) phase | α-(Fe, Hf) phase | 99 |
| Example 15 | 1100 | 1 | Hf | 1.2 | — | α-(Fe, Hf) phase | α-(Fe, Hf) phase, M-component oxide phase ($HfO_2$) | 98 |
| Example 16 | 1100 | 1 | Hf | 12.8 | — | α-(Fe, Hf) phase | α-(Fe, Hf) phase, M-component oxide phase ($HfO_2$), spawn phase | 75 |
| Example 17 | 550 | 1 | Hf | 11.1 | — | α-(Fe, Hf) phase | α-(Fe, Hf) phase, Hf-ferrite | 44 |
| Comparative Example 6 | — | — | Hf | 12.7 | — | — | — | 0 |

| Example | O content (atom %) | Average Powder Particle Diameter (nm) | Average Crystal Gram Size of Whole (nm) | Cystallite Size (nm) | Saturation Magnetization (emu/g) | Coercive Force (A/m) | M Component Content of Second Phase/M Component Content of First Phase |
|---|---|---|---|---|---|---|---|
| Example 8 | 0.9 | 60000 | 300 | 100 | 218.7 | 460 | ≥2 |
| Example 9 | 4.8 | 50000 | 200 | 100 | 209.0 | 940 | ≥2 |
| Example 10 | 19 | 50000 | 200 | 100 | 165.0 | 1800 | ≥2 |
| Example 11 | 29 | 100 | 50 | 40 | 130.4 | 6500 | ≥2 |
| Comparative Example 5 | 57 | 20 | 20 | 10 | 45.6 | 1700 | — |
| Example 12 | 1.5 | 20000 | 200 | 100 | 211.4 | 470 | ≥2 |
| Example 13 | 36 | 200 | 50 | 30 | 99.3 | 3300 | ≥2 |
| Example 14 | 0.8 | 100000 | 200 | 200 | 216.3 | 520 | ≥2 |
| Example 15 | 1.8 | 50000 | 80 | 70 | 213.7 | 1100 | ≥2 |
| Example 16 | 19 | 30000 | 40 | 30 | 193.7 | 2100 | ≥2 |
| Example 17 | 37 | 100 | 40 | 40 | 96.4 | 10000 | ≥2 |
| Comparative Example 6 | 59 | 20 | 20 | 20 | 46.1 | 3500 | — |

TABLE 4

| Example | Reduction Temperature (° C.) | Reduction Time (hours) | Kind of M Component in Magnetic Material Powder | Content of M Component in Magnetic Material Powder (atom %) | Content of TM Component (Mn) in Magnetic Material Powder (atom %) | First Phase | Second Phase | bcc Phase Volume Fraction (volume %) |
|---|---|---|---|---|---|---|---|---|
| Example 18 | 1100 | 1 | V | 0.1 | — | α-(Fe, V) phase | α-(Fe, V) phase | 99 |
| Example 19 | 1100 | 1 | V | 1.0 | — | α-(Fe, V) phase | α-(Fe, V) phase | 94 |
| Example 20 | 1100 | 1 | V | 2.0 | — | α-(Fe, V) phase | α-(Fe, V) phase | 90 |
| Example 21 | 1100 | 1 | V | 10.0 | — | α-(Fe, V) phase | α-(Fe, V) phase, wusite | 87 |
| Example 22 | 550 | 1 | V | 10.0 | — | α-(Fe, V) phase | α-(Fe, V) phase, wusite, ferrite | 91 |
| Comparative Example 7 | — | — | V | 9.4 | — | — | — | 0 |
| Example 23 | 1100 | 1 | V | 25.2 | — | α-(Fe, V) phase | α-(Fe, V) phase, wusite, M-component oxide phase ($V_2O_5$) | 64 |
| Example 24 | 1100 | 1 | Nb | 0.1 | — | α-(Fe, Nb) phase | α-(Fe, Nb) phase | 99 |
| Example 25 | 1100 | 1 | Nb | 1.0 | — | α-(Fe, Nb) phase | α-(Fe, Nb) phase, M-component oxide phase ($NbO_2$) | 97 |
| Example 26 | 1100 | 1 | Nb | 9.00 | — | α-(Fe, Nb) phase | α-(Fe, Nb) phase, M-component oxide phase ($NbO_2$) | 81 |
| Example 27 | 550 | 1 | Nb | 9.00 | — | α-(Fe, Nb) phase | α-(Fe, Nb) phase, wusite, ferrite, hematite | 23 |
| Comparative Example 8 | — | — | Nb | 9.4 | — | — | — | 0 |

TABLE 4-continued

| Example | O content (atom %) | Average Powder Particle Diameter (nm) | Average Crystal Gram Size of Whole (nm) | Cystallite Size (nm) | Saturation Magnetization (emu/g) | Coercive Force (A/m) | M-Component Content of Second Phase/M Component Content of First Phase |
|---|---|---|---|---|---|---|---|
| Example 18 | 0.8 | 70000 | 100 | 80 | 221.3 | 480 | ≥2 |
| Example 19 | 4.8 | 60000 | 200 | 100 | 208.7 | 630 | ≥2 |
| Example 20 | 7.9 | 30000 | 90 | 60 | 202.0 | 670 | ≥2 |
| Example 21 | 10 | 20000 | 100 | 70 | 194.4 | 2100 | ≥2 |
| Example 22 | 43 | 200 | 100 | 70 | 69.7 | 10000 | ≥2 |
| Comparative Example 7 | 60 | 20 | 20 | 20 | 41.1 | 8600 | — |
| Example 23 | 26 | 8000 | 50 | 40 | 142.1 | 1700 | ≥2 |
| Example 24 | 0.7 | 60000 | 300 | 100 | 220.0 | 520 | ≥2 |
| Example 25 | 2.5 | 50000 | 200 | 100 | 214.6 | 720 | ≥2 |
| Example 26 | 15 | 40000 | 100 | 70 | 178.8 | 1000 | ≥2 |
| Example 27 | 47 | 100 | 50 | 30 | 50.1 | 1700 | ≥2 |
| Comparative Example 8 | 59 | 30 | 30 | 30 | 24.7 | 6000 | — |

TABLE 5

| Example | Reduction Temperature (° C.) | Reduction Time (hours) | Kind of M Component in Magnetic Material Powder | Content of M Component in Magnetic Material Powder (atom %) | Content of TM Component (Mn) in Magnetic Material Powder (atom %) | First Phase | Second Phase | bcc Phase Volume Fraction (volume %) |
|---|---|---|---|---|---|---|---|---|
| Example 28 | 1100 | 1 | Ta | 0.1 | — | α-(Fe, Ta) phase | α-(Fe, Ta) phase | 99 |
| Example 29 | 1100 | 1 | Ta | 0.8 | — | α-(Fe, Ta) phase | α-(Fe, Ta) phase, M-component oxide phase (Ta$_2$O$_5$) | 96 |
| Example 30 | 1100 | 1 | Ta | 11.5 | — | α-(Fe, Ta) phase | α-(Fe, Ta) phase, wusite M-component oxide phase (Ta$_2$O$_5$) | 69 |
| Example 31 | 550 | 1 | Ta | 10.8 | — | α-(Fe, Ta) phase | α-(Fe, Ta) phase, wusite, ferrite, hematite | 22 |
| Comparative Example 9 | — | — | Ta | 10.9 | — | — | — | 0 |
| Example 32 | 1100 | 1 | Mo | 0.02 | — | α-(Fe, Mo) phase | α-(Fe, Mo) phase | 99 |
| Example 33 | 1100 | 1 | Mo | 0.2 | — | α-(Fe, Mo) phase | α-(Fe, Mo) phase | 99 |
| Example 34 | 1100 | 1 | Mo | 0.8 | — | α-(Fe, Mo) phase | α-(Fe, Mo) phase, wusite | 97 |
| Example 35 | 550 | 1 | Mo | 0.8 | — | α-(Fe, Mo) phase | α-(Fe, Mo) phase, wusite ferrite, hematite | 35 |
| Comparative Example 10 | — | — | Mo | 0.8 | — | — | — | 0 |
| Example 36 | 1100 | 1 | W | 0.1 | — | α-(Fe, W) phase | α-(Fe, W) phase | 99 |
| Example 37 | 1100 | 1 | W | 0.8 | — | α-(Fe, W) phase | α-(Fe, W) phase wusite | 98 |
| Example 38 | 550 | 1 | W | 0.6 | — | α-(Fe, W) phase | α-(Fe, W) phase wusite, ferrite, hematite | 37 |
| Example 39 | 1100 | 1 | W | 10.6 | — | α-(Fe, W) phase | α-(Fe, W) phase wusite | 64 |
| Comparative Example 11 | — | — | W | 10.5 | — | — | — | 0 |

TABLE 5-continued

| Example | O content (atom %) | Average Powder Particle Diameter (nm) | Average Crystal Grain Size of Whole (nm) | Cystallite Size (nm) | Saturation Magnetization (emu/g) | Coercive Force (A/m) | M Component Content of Second Phase/M Component Content of First Phase |
|---|---|---|---|---|---|---|---|
| Example 28 | 0.9 | 70000 | 200 | 80 | 219.6 | 560 | ≥2 |
| Example 29 | 3.3 | 80000 | 100 | 70 | 211.8 | 880 | ≥2 |
| Example 30 | 23 | 80000 | 100 | 70 | 151.5 | 320 | ≥2 |
| Example 31 | 46 | 90 | 50 | 20 | 48.7 | 21000 | ≥2 |
| Comparative Example 9 | 61 | 50 | 30 | 30 | 21.8 | 6200 | — |
| Example 32 | 0.7 | 50000 | 200 | 80 | 218.1 | 430 | ≥2 |
| Example 33 | 0.6 | 50000 | 200 | 70 | 220.7 | 490 | ≥2 |
| Example 34 | 2.6 | 50000 | 200 | 70 | 213.8 | 540 | ≥2 |
| Example 35 | 41 | 80 | 40 | 20 | 77.8 | 33000 | ≥2 |
| Comparative Example 10 | 62 | 20 | 20 | 10 | 70.2 | 3100 | — |
| Example 36 | 0.8 | 40000 | 200 | 80 | 219.2 | 440 | ≥2 |
| Example 37 | 1.6 | 30000 | 100 | 50 | 214.9 | 470 | ≥2 |
| Example 38 | 40 | 200 | 90 | 50 | 81.5 | 23500 | ≥2 |
| Example 39 | 25 | 50000 | 100 | 80 | 140.6 | 1290 | ≥2 |
| Comparative Example 11 | 62 | 10 | 10 | 8 | 0.3 | 7700 | — |

TABLE 6

| Example | Reduction Temperature (° C.) | Reduction Time (hours) | Kind of M Component in Magnetic Material Powder | Content of M Component in Magnetic Material Powder (atom %) | Content of TM Component (Mn) in Magnetic Material Powder (atom %) | First Phase | Second Phase | bcc Phase Volume Fraction (volume %) |
|---|---|---|---|---|---|---|---|---|
| Example 40 | 1100 | 1 | Cu | 0.1 | — | α-(Fe, Cu) phase | α-(Fe, Cu) phase | 99 |
| Example 41 | 1100 | 1 | Cu | 0.9 | — | α-(Fe, Cu) phase | α-(Fe, Cu) phase | 97 |
| Example 42 | 1100 | 1 | Cu | 9.6 | — | α-(Fe, Cu) phase | α-(Fe, Cu) phase, wusite, ferrite | 87 |
| Example 43 | 550 | 1 | Cu | 7.3 | — | α-(Fe, Cu) phase | α-(Fe, Cu) phase, wusite, ferrite, hematite | 78 |
| Comparative Example 12 | — | — | Cu | 10.3 | — | — | — | 0 |
| Example 44 | 1100 | 1 | Cu | 24.9 | — | α-(Fe, Cu) phase | α-(Fe, Cu) phase, Cu phase | 43 |
| Example 45 | 1100 | 1 | Zn | 0.05 | — | α-(Fe, Zn) phase | α-(Fe, Zn) phase | 99 |
| Example 46 | 1100 | 1 | Zn | 0.1 | — | α-(Fe, Zn) phase | α-(Fe, Zn) phase | 97 |
| Example 47 | 1100 | 1 | Si | 2.2 | 0.1 | α-(Fe, Si) phase | α-(Fe, Si) phase, M-component oxide phase (SiO$_2$) | 95 |
| Example 48 | 550 | 1 | Si | 2.2 | 0.1 | α-(Fe, Si) phase | α-(Fe, Si) phase | 81 |

| Example | O content (atom %) | Average Powder Particle Diameter (nm) | Average Crystal Grain Size of Whole (nm) | Cystallite Size (nm) | Saturation Magnetization (emu/g) | Coercive force (A/m) | M Component Content of Second Phase/M Component Content of First Phase |
|---|---|---|---|---|---|---|---|
| Example 40 | 0.8 | 60000 | 200 | 70 | 219.2 | 350 | ≥2 |
| Example 41 | 2.6 | 50000 | 100 | 40 | 214.0 | 290 | ≥2 |
| Example 42 | 11 | 30000 | 100 | 40 | 192.1 | 975 | ≥2 |
| Example 43 | 17 | 5000 | 300 | 200 | 170.9 | 2600 | ≥2 |
| Comparative Example 12 | 57 | 10 | 10 | 10 | 48.8 | 890 | — |
| Example 44 | 37 | 200000 | 80 | 40 | 95.3 | 2500 | ≥2 |
| Example 45 | 0.2 | 30000 | 100 | 70 | 219.6 | 390 | ≥2 |

TABLE 6-continued

| Example 46 | 2.3 | 30000 | 100 | 70 | 213.6 | 350 | ≥2 |
| --- | --- | --- | --- | --- | --- | --- | --- |
| Example 47 | 4.0 | 2000 | 100 | 40 | 213.5 | 180 | ≥2 |
| Example 48 | 15 | 100 | 80 | 60 | 183.0 | 17000 | ≥2 |

INDUSTRIAL APPLICABILITY

According to the magnetic material of the present invention, it is possible to provide the magnetic material that has a high saturation magnetization and solves the problem of eddy current loss due to a high electric resistivity, which are contradictory characteristics for conventional magnetic materials, and yet has excellent electromagnetic properties that combine the merits of both metallic materials and oxide without requiring complicated steps such as lamination, as well as has stable magnetic properties even in air.

The present invention relates to a soft magnetic material used in transformers, heads, inductors, reactors, cores (magnetic cores), yokes, magnet switches, choke coils, noise filters, ballast, and the like mainly used for power devices, transformers, and information communication related devices, as well as a motor or a linear motor for a rotary machines such as various actuators, voice coil motors, induction motors, reactance motors and the like, and in particular, a soft magnetic material used for a rotor, a stator, and the like, for automotive drive motors exceeding 400 rpm, motors for industrial machines such as power generators, machine tools, various generators, and various pumps, and motors for domestic electric appliances such as air conditioners, refrigerators, and vacuum cleaners.

Further, the present invention relates to a soft magnetic material used in antennas, microwave elements, magnetostrictive elements, magnetic acoustic elements, and the like, as well as in sensors that employ a magnetic field, such as Hall elements, magnetic sensors, current sensors, rotation sensors, and electronic compasses.

Further, the present invention relates to a semi-hard magnetic material used in relays such as monostable and bistable electromagnetic relays, switches such as torque limiters, relay switches, and solenoid valves, rotating machines such as hysteresis motors, hysteresis coupling having a brake functions and the like, sensors for detecting a magnetic field, a rotation speed, and the like, a bias of a magnetic tag, a spin valve element, and the like, a magnetic recording medium or element such as a tape recorder, a VTR, a hard disk, and the like.

Further, the present invention is used for high frequency soft magnetic and semi-hard magnetic materials for high frequency transformers and reactors, as well as magnetic materials suppressing obstacles due to unnecessary electromagnetic interference, such as electromagnetic noise absorbing materials, electromagnetic wave absorbing materials, and magnetic shielding materials, materials for inductor elements such as noise removing inductors, RFID (Radio Frequency Identification) tag materials, noise filter materials, and the like.

The invention claimed is:

1. A soft magnetic or semi-hard magnetic material, the magnetic material being comprising:
    a first phase having crystals with a bcc structure containing Fe and an M component, in which M is one or more selected from the group consisting of Zr, Hf, V, Nb, Ta, Cr, Mo, W, Cu, Zn, and Si; and
    a second phase having crystals with a bcc structure containing Fe and the M component,
    wherein the first phase and the second phase do not contain Al, Mg and B,
    wherein a content of the M component when a total of Fe and the M component contained in the second phase is 100 atom % is an amount of 1.5 times or more and $10^5$ times or less relative to a content of the M component when a total of Fe and the M component contained in the first phase is 100 atom % and/or is 2 atom % or more and 100 atom % or less, the magnetic material being a form of a powder,
    wherein at least one of the first phase and the second phase is ferromagnetically coupled with an adjacent phase, and
    wherein an average powder particle diameter when the magnetic material is soft magnetic is 10 nm or more and 5 mm or less, and an average powder particle diameter when the magnetic material is semi-hard magnetic is 10 nm or more and 10 μm or less.

2. The magnetic material according to claim 1, which is soft magnetic.

3. The magnetic material according to claim 1, wherein 0.001 atom % or more and less than 50 atom % of Fe in the first phase is substituted with Co or Ni.

4. The magnetic material according to claim 1, wherein the first phase has a composition represented by a composition formula $Fe_{100-x}M_x$ (where x is $0.001 \leq x \leq 33$ in terms of atomic percentage and M is one or more of Zr, Hf, V, Nb, Ta, Cr, Mo, W, Cu, Zn, and Si).

5. The magnetic material according to claim 1 wherein the first phase has a composition represented by a composition formula $Fe_{100-x}(M_{100-y}TM_y)_{x/100}$ (where x and y are $0.001 \leq x \leq 33$ and $0.001 \leq y < 50$ in terms of atomic percentage, M is one or more of Zr, Hf, V, Nb, Ta, Cr, Mo, W, Cu, Zn, and Si, and TM is at least one of Ti and Mn).

6. The magnetic material according to claim 1, wherein the second phase comprises an M-component oxide phase.

7. The magnetic material according to claim 1, wherein the second phase comprises at least any one of an M-ferrite phase and a wustite phase.

8. The magnetic material according to claim 1, wherein a phase having crystals with a bcc structure containing Fe and the M component has a volume fraction of 5% by volume or more based on the whole magnetic material.

9. The magnetic material according to claim 6, comprising a composition in a range where Fe is 20 atom % or more and 99.998 atom % or less, an M component is 0.001 atom % or more and 50 atom % or less, and O is 0.001 atom % or more and 55 atom % or less, based on a composition of the whole magnetic material.

10. The magnetic material according to claim 1, wherein an average crystal grain size of the first phase, the second phase, or the whole magnetic material is 1 nm or more and less than 10 μm.

11. The magnetic material according to claim 1, wherein at least the first phase has a bcc phase represented using a composition represented by a composition formula $Fe_{100-x}M_x$ (where x is $0.001 \leq X \leq 1$ in terms of atomic percentage), and the bcc phase has a crystallite size of 1 nm or more and 200 nm or less.

12. The magnetic material according to claim 1, wherein at least the first phase has a bcc phase represented using a composition represented by a composition formula $Fe_{100-x}M_x$ (where x is $0.001 \leq X \leq 33$ in terms of atomic percentage and M is one or more of Zr, Hf, V, Nb, Ta, Cr, Mo, W, Cu, Zn, and Si), and a crystallite size of the bcc phase is 1 nm or more and 200 nm or less.

13. The magnetic material according to claim 1 wherein M is one or more selected from the group consisting of Zr, Hf, V, Nb, Ta, Mo, W, Cu, and Zn.

14. The magnetic material according to claim 1 wherein the first phase and the second phase are continuously bonded to each other directly or via a metal phase or an inorganic phase to form a massive state as the whole magnetic material.

15. A method for producing the magnetic material according to claim 1 by reducing a M-ferrite powder having an average powder particle diameter of 1 nm or more and less than 1 μm in a reducing gas containing hydrogen gas at a reduction temperature of 400° C. or higher and 1500° C. or lower.

16. A method for producing the magnetic material according to claim 1 by reducing an M-ferrite powder having an average powder particle diameter of 1 nm or more and less than 1 μm in a reducing gas containing hydrogen gas, and forming the first phase and the second phase by a disproportionation reaction.

17. A method for producing the magnetic material according to claim 1 by sintering the magnetic material produced by a method comprising reducing a M-ferrite powder having an average powder particle diameter of 1 nm or more and less than 1 μm in a reducing gas containing hydrogen gas at a reduction temperature of 400° C. or higher and 1500° C. or lower.

18. A method for producing the magnetic material according to claim 1 by sintering the magnetic material produced by a method comprising reducing an M-ferrite powder having an average powder particle diameter of 1 nm or more and less than 1 μm in a reducing gas containing hydrogen gas, and forming the first phase and the second phase by a disproportionation reaction.

19. A method for producing the magnetic material according to claim 1, comprising performing annealing at least once after reducing a M-ferrite powder having an average powder particle diameter of 1 nm or more and less than 1 μm in a reducing gas containing hydrogen gas at a reduction temperature of 400° C. or higher and 1500° C. or lower, or after reducing an M-ferrite powder having an average powder particle diameter of 1 nm or more and less than 1 μm in a reducing gas containing hydrogen gas, and forming the first phase and the second phase by a disproportionation reaction.

20. A method for producing a soft magnetic or semi-hard magnetic material, comprising performing annealing at least once after the sintering step in the method according to claim 18.

* * * * *